United States Patent
Shauh et al.

(10) Patent No.: US 10,111,049 B2
(45) Date of Patent: Oct. 23, 2018

(54) MULTIBAND EMBMS ENHANCEMENT USING CARRIER AGGREGATION

(71) Applicant: QUALCOMM Incorporated, San Diego, CA (US)

(72) Inventors: Jack Shyh-Hurng Shauh, San Diego, CA (US); Srinivasan Balasubramanian, San Diego, CA (US); Kuo-Chun Lee, San Diego, CA (US); Sivaramakrishna Veerepalli, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/937,126

(22) Filed: Jul. 8, 2013

(65) Prior Publication Data
US 2014/0119265 A1    May 1, 2014

Related U.S. Application Data

(60) Provisional application No. 61/719,318, filed on Oct. 26, 2012, provisional application No. 61/719,300, filed on Oct. 26, 2012.

(51) Int. Cl.
H04W 4/06    (2009.01)

(52) U.S. Cl.
CPC .................. H04W 4/06 (2013.01)

(58) Field of Classification Search
CPC ....... H04W 72/005; H04W 4/06; H04W 8/26; H04L 12/185; H04L 12/189
(Continued)

(56) References Cited

U.S. PATENT DOCUMENTS 4,858,115 A * 8/1989 Rusterholz .............. G06F 9/325
    712/4
4,875,161 A * 10/1989 Lahti ................... G06F 15/8061
    708/520
(Continued)

FOREIGN PATENT DOCUMENTS

CN    101771951 A    7/2010
CN    101800942 A    8/2010
(Continued)

OTHER PUBLICATIONS

Co-pending U.S. Appl. No. 61/473,157, filed Apr. 8, 2011.
(Continued)

*Primary Examiner* — Mark Rinehart
*Assistant Examiner* — Sanjay K Dewan
(74) *Attorney, Agent, or Firm* — Arent Fox LLP

(57) ABSTRACT

A method, an apparatus, and a computer program product for wireless communication are provided. The apparatus may be a UE. The UE receives at least one of a unicast or a broadcast/multicast communication on a first frequency from a first cell of a serving eNB through a first receive chain. In addition, the UE receives at least one of broadcast/multicast signal, synchronization signal, or reference signal communication on a second frequency from a second cell of the serving eNB through a second receive chain without having received instruction from the serving eNB to receive the at least one of the broadcast/multicast signal, the synchronization signal, or the reference signal communication.

22 Claims, 46 Drawing Sheets

(58) Field of Classification Search
USPC .................................................. 370/312
See application file for complete search history.

(56) References Cited

U.S. PATENT DOCUMENTS

| | | | |
|---|---|---|---|
| 5,652,042 | A | 7/1997 | Kawakita et al. |
| 6,646,886 | B1 | 11/2003 | Popovich et al. |
| 7,545,272 | B2 | 6/2009 | Goodnow |
| 8,254,932 | B2 | 8/2012 | Hsu |
| 8,660,559 | B2* | 2/2014 | Tamura et al. ............... 455/436 |
| 8,830,895 | B2* | 9/2014 | Wang .................... H04W 4/06 370/312 |
| 8,837,433 | B2* | 9/2014 | Amerga ................. H04W 4/06 370/332 |
| 2006/0166677 | A1* | 7/2006 | Derakshan et al. .......... 455/453 |
| 2008/0101376 | A1* | 5/2008 | Do ....................... H04L 12/185 370/395.21 |
| 2008/0170378 | A1 | 7/2008 | Ou-Yang |
| 2009/0274086 | A1* | 11/2009 | Petrovic et al. ............. 370/312 |
| 2009/0290555 | A1* | 11/2009 | Alpert .................... H04W 4/20 370/331 |
| 2011/0170438 | A1 | 7/2011 | Kishiyama et al. |
| 2011/0222457 | A1* | 9/2011 | Lee et al. ................... 370/312 |
| 2011/0235565 | A1 | 9/2011 | Wu |
| 2011/0243056 | A1* | 10/2011 | Jen ............................. 370/312 |
| 2011/0243066 | A1 | 10/2011 | Nayeb et al. |
| 2011/0280223 | A1 | 11/2011 | Maeda et al. |
| 2011/0305183 | A1* | 12/2011 | Hsu ..................... H04W 72/005 370/312 |
| 2011/0305184 | A1 | 12/2011 | Hsu |
| 2012/0004010 | A1* | 1/2012 | Tamura et al. ............... 455/525 |
| 2012/0014264 | A1 | 1/2012 | Wang |
| 2012/0020231 | A1* | 1/2012 | Chen .................... H04W 36/08 370/252 |
| 2012/0063093 | A1 | 3/2012 | Meinel et al. |
| 2012/0099504 | A1* | 4/2012 | Hyun et al. .................. 370/312 |
| 2012/0213130 | A1 | 8/2012 | Zhang et al. |
| 2012/0213141 | A1* | 8/2012 | Damnjanovic ..... H04W 72/005 370/312 |
| 2012/0214541 | A1 | 8/2012 | Narasimha et al. |
| 2012/0263043 | A1 | 10/2012 | Xu |
| 2012/0278849 | A1 | 11/2012 | Gholmieh et al. |
| 2012/0281653 | A1* | 11/2012 | Park ....................... H04L 5/0098 370/329 |
| 2013/0003668 | A1* | 1/2013 | Xiao ........................ H04L 5/001 370/329 |
| 2013/0044668 | A1* | 2/2013 | Purnadi ............. H04W 36/0055 370/312 |
| 2013/0044670 | A1* | 2/2013 | Jang ........................ H04W 4/06 370/312 |
| 2013/0051261 | A1* | 2/2013 | Kazmi ................. H04B 7/0693 370/252 |
| 2013/0051306 | A1* | 2/2013 | Gou ..................... H04W 72/005 370/312 |
| 2013/0064162 | A1* | 3/2013 | Phan .................... H04W 72/005 370/312 |
| 2013/0077554 | A1* | 3/2013 | Gauvreau et al. ............. 370/312 |
| 2013/0083715 | A1* | 4/2013 | Etemad ................ H04W 52/04 370/312 |
| 2013/0094428 | A1* | 4/2013 | Lee ....................... H04L 12/189 370/312 |
| 2013/0128796 | A1* | 5/2013 | Newberg ............. H04L 1/0003 370/312 |
| 2013/0128797 | A1* | 5/2013 | Newberg ............ H04L 12/1868 370/312 |
| 2013/0130616 | A1* | 5/2013 | Lee et al. ..................... 455/3.01 |
| 2013/0142072 | A1 | 6/2013 | Xu et al. |
| 2013/0170421 | A1 | 7/2013 | Wang et al. |
| 2013/0294315 | A2* | 11/2013 | Gou ..................... H04L 12/189 370/312 |
| 2013/0308519 | A1* | 11/2013 | Gou et al. .................... 370/312 |
| 2013/0324129 | A1 | 12/2013 | Lee et al. |
| 2014/0016488 | A1* | 1/2014 | Xu ....................... H04W 72/005 370/252 |
| 2014/0036822 | A1* | 2/2014 | Maeda et al. ................. 370/329 |
| 2014/0050113 | A1* | 2/2014 | Rosa ................. H04W 52/0229 370/252 |
| 2014/0050127 | A1* | 2/2014 | Wang et al. .................. 370/280 |
| 2014/0050139 | A1* | 2/2014 | Piggin et al. ................. 370/312 |
| 2014/0051426 | A1* | 2/2014 | Siomina et al. ........... 455/422.1 |
| 2014/0119263 | A1 | 5/2014 | Shauh et al. |
| 2014/0119264 | A1 | 5/2014 | Shauh et al. |
| 2014/0169253 | A1* | 6/2014 | Chun et al. ................... 370/312 |
| 2014/0192703 | A1* | 7/2014 | Chun ..................... H04W 48/20 370/312 |
| 2014/0286225 | A1* | 9/2014 | Yu .......................... H04W 4/08 370/312 |
| 2014/0293863 | A1* | 10/2014 | Cai ........................ H04L 12/18 370/312 |
| 2015/0023197 | A1* | 1/2015 | Iraji ...................... H04W 48/16 370/252 |

FOREIGN PATENT DOCUMENTS

| | | | | |
|---|---|---|---|---|
| CN | 102195921 | A | 9/2011 | |
| CN | 102264033 | A | 11/2011 | |
| EP | 2469952 | A2 | 6/2012 | |
| EP | 2654325 | A1 | 10/2013 | |
| GB | 2488533 | A | 9/2012 | |
| JP | 2010016494 | A | 1/2010 | |
| JP | WO2010106735 | A1 * | 9/2010 | ............ H04W 36/30 |
| WO | 2011097930 | A1 | 8/2011 | |
| WO | 2011157216 | A1 | 12/2011 | |
| WO | 2012097689 | A1 | 7/2012 | |
| WO | 2012110829 | A1 | 8/2012 | |
| WO | 2012110830 | A1 | 8/2012 | |
| WO | 2012110831 | A1 | 8/2012 | |
| WO | 2012115726 | A1 | 8/2012 | |
| WO | 2012116219 | A1 | 8/2012 | |
| WO | 2012118740 | A1 | 9/2012 | |
| WO | 2012137078 | A2 | 10/2012 | |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11 )", 3GPP Standard; 3GPP TS 36.300, 3rd Generation Partnership Project (3GPP), Mobile Competence Centre ; 650, Route Des Lucioles; F-06921 Sophia-Antipolis Cedex ; France, vol. RAN WG2, No. V11.2.0, Jun. 27, 2012 (Jun. 27, 2012), pp. 1-201 , XP050581140, (retrieved on Jun. 27, 2012).

"3rd Generation Partnership Project; Technical Specification Group Radio Access Network; Evolved Universal Terrestrial Radio Access (E-UTRA); Radio Resource Control (RRC); Protocol specification (Release 11 )", 3GPP Standard; 3GPP TS 36.331 , 3rd Generation Partnership Project (3GPP), Mobile Competence Centre; 650, Route Des Lucioles ; F-06921 Sophia-Antipolis Cedex; France, vol. RAN WG2, No. V11.1.0, Sep. 24, 2012 (Sep. 24, 2012), pp. 1-325, XP050649953, [retrieved on Sep. 24, 2012].

Samsung: "Introducing MBMS enhancements for REL-11", 3GPP TSG-RAN WG2#79 R2-124261, Aug. 17, 2012, pp. 1-19, URL:http://www.3gpp.org/ftp/tsg_ran/WG2_RL2/TSGR2_79/Docs/R2-124261.zip.

Alcatel-Lucent Shanghai Bell, Alcatel-Lucent, "Select and Receive MBMS With Location Information," 3GPP TSG-RAN WG2 Meeting #75, R2-114277, Aug. 26, 2011, pp. 1-4. URL:http://www.3gpp.org/ftp/tsg_ran/WG2_RL2/TSGR2_75/Docs/R2-114277.zip.

\* cited by examiner

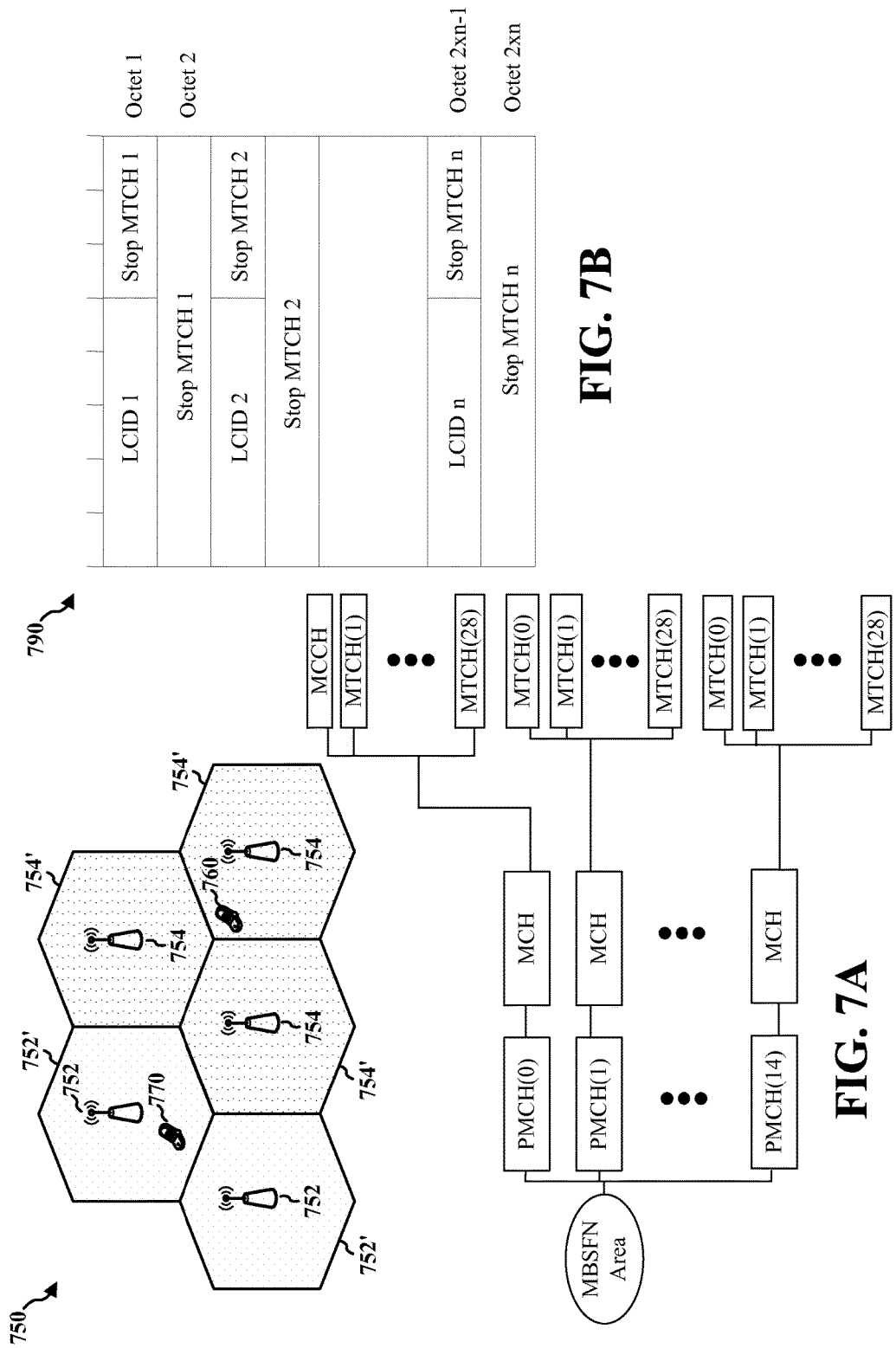

MULTIBAND EMBMS ENHANCEMENT USING CARRIER AGGREGATION

CROSS-REFERENCE TO RELATED APPLICATION(S)

This application claims the benefit of U.S. Provisional Application Ser. No. 61/719,318, entitled "Multiband eMBMS Enhancement Using Carrier Aggregation" and filed on Oct. 26, 2012 and U.S. Provisional Application Ser. No. 61/719,300, entitled "Primary Cell Signaling for eMBMS in Carrier Aggregation" and filed on Oct. 26, 2012, all of which are expressly incorporated by reference herein in their entirety.

BACKGROUND

Field

The present disclosure relates generally to communication systems, and more particularly, to multiband evolved Multimedia Broadcast Multicast Service (eMBMS) enhancement using carrier aggregation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The UE receives at least one of a unicast or a broadcast/multicast communication on a first frequency from a first cell of a serving evolved Node B (eNB) through a first receive chain. In addition, the UE receives at least one of broadcast/multicast signal, synchronization signal, or reference signal communication on a second frequency from a second cell of the serving eNB through a second receive chain without having received instruction from the serving eNB to receive the at least one of the broadcast/multicast signal, the synchronization signal, or the reference signal communication.

BRIEF DESCRIPTION OF THE DRAWINGS

FIG. 7A is a diagram illustrating an example of an evolved Multimedia Broadcast Multicast Service channel configuration in a Multicast Broadcast Single Frequency Network.

FIG. 7B is a diagram illustrating a format of a Multicast Channel Scheduling Information Media Access Control control element.

DETAILED DESCRIPTION

Figure 1:
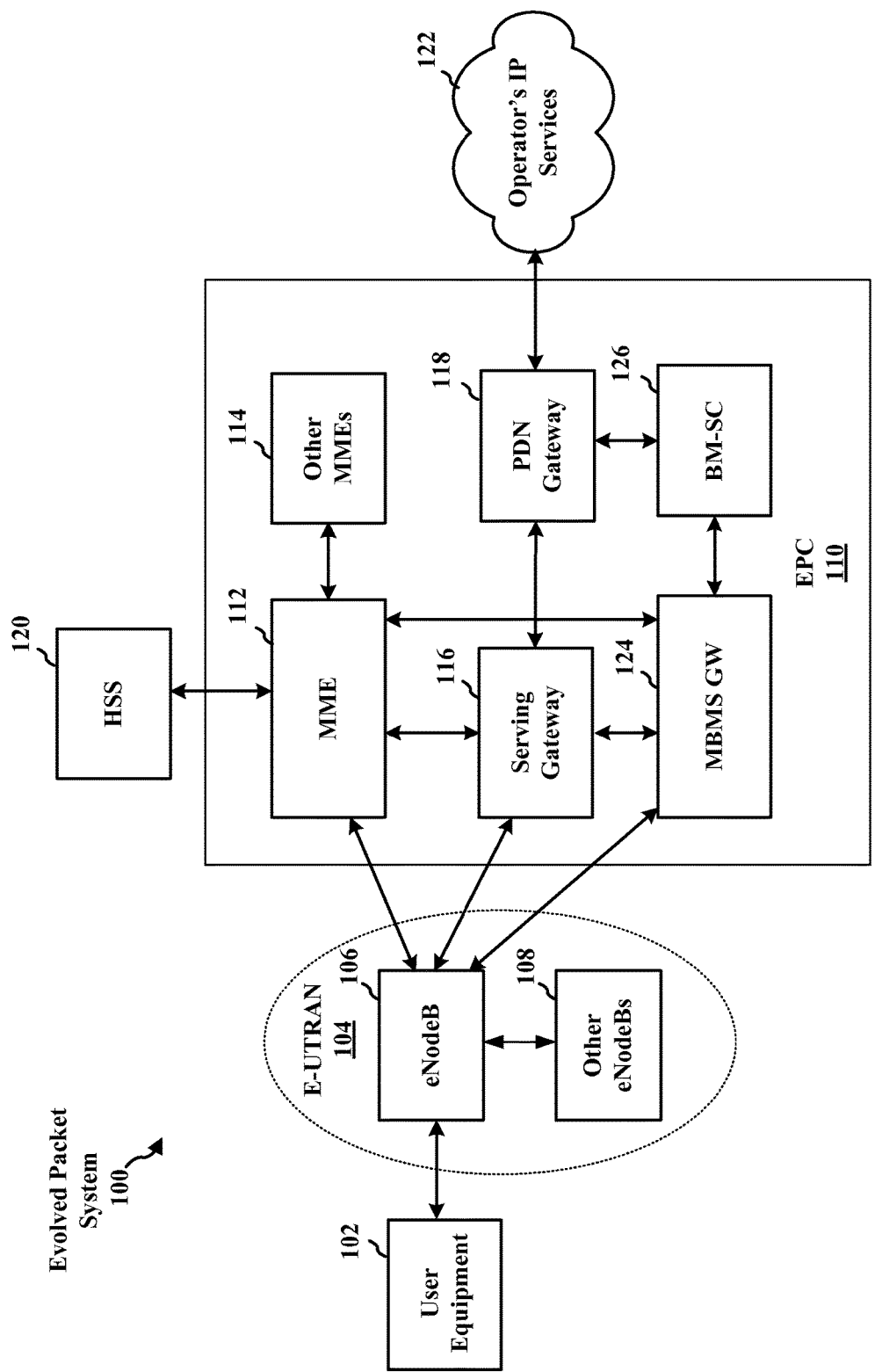
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
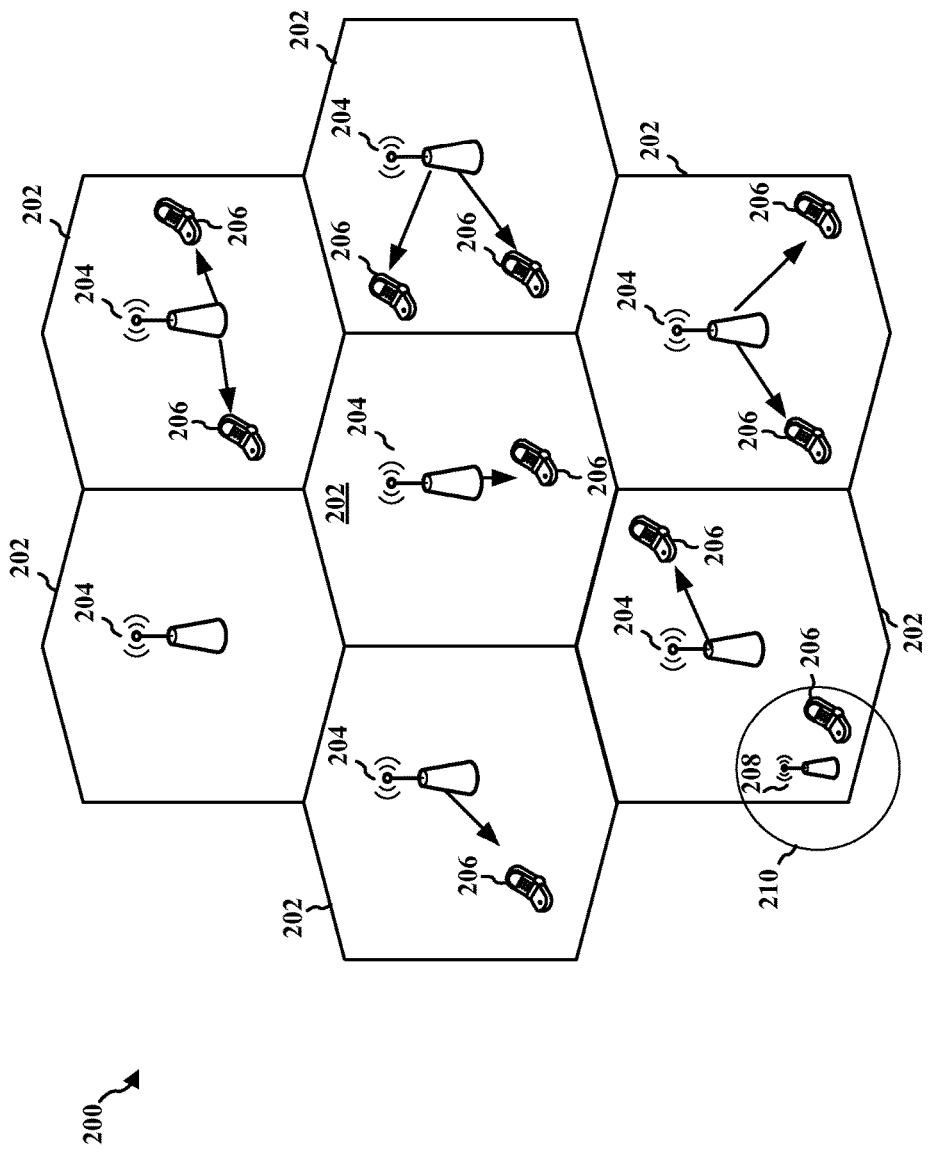
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
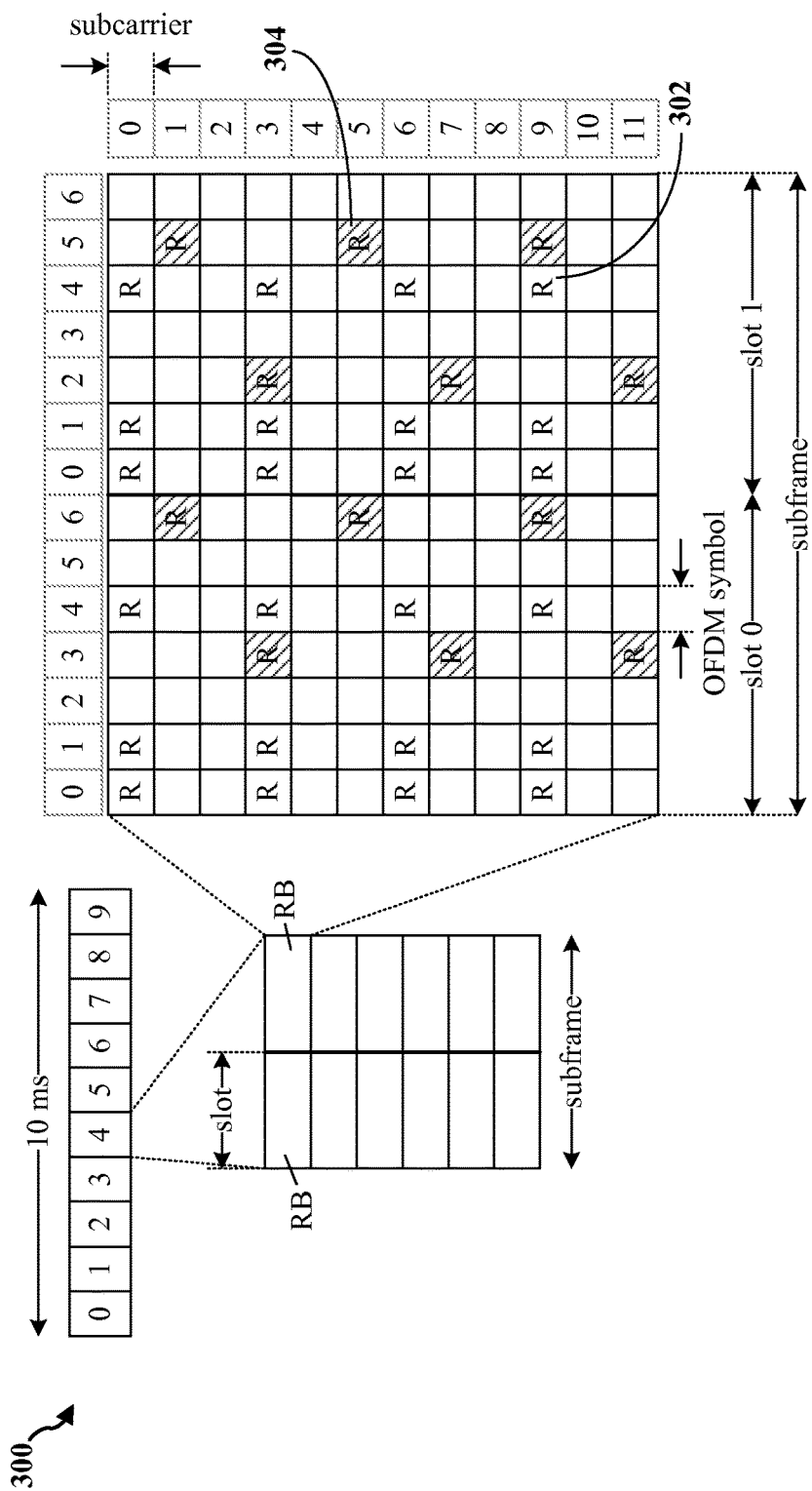
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
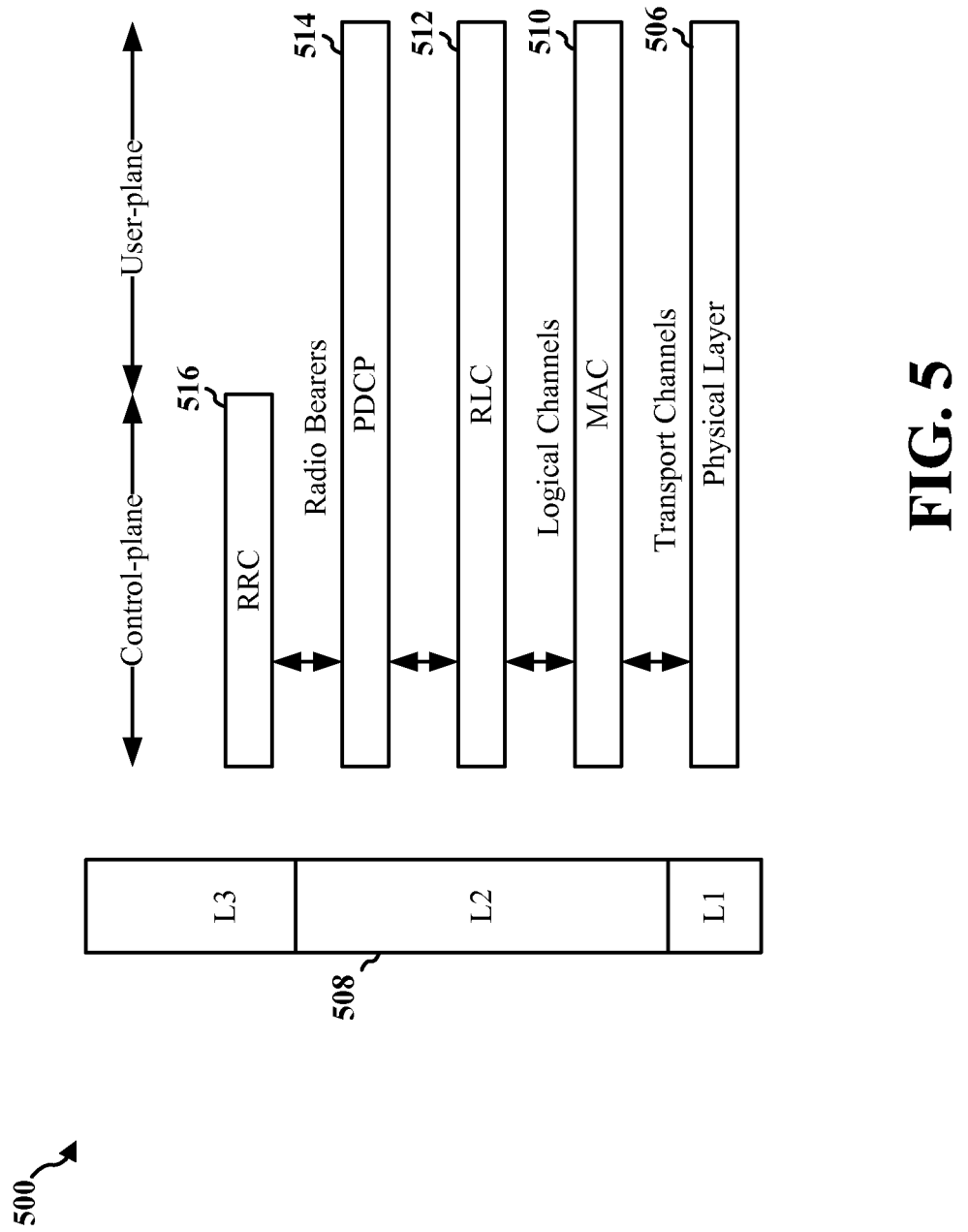
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
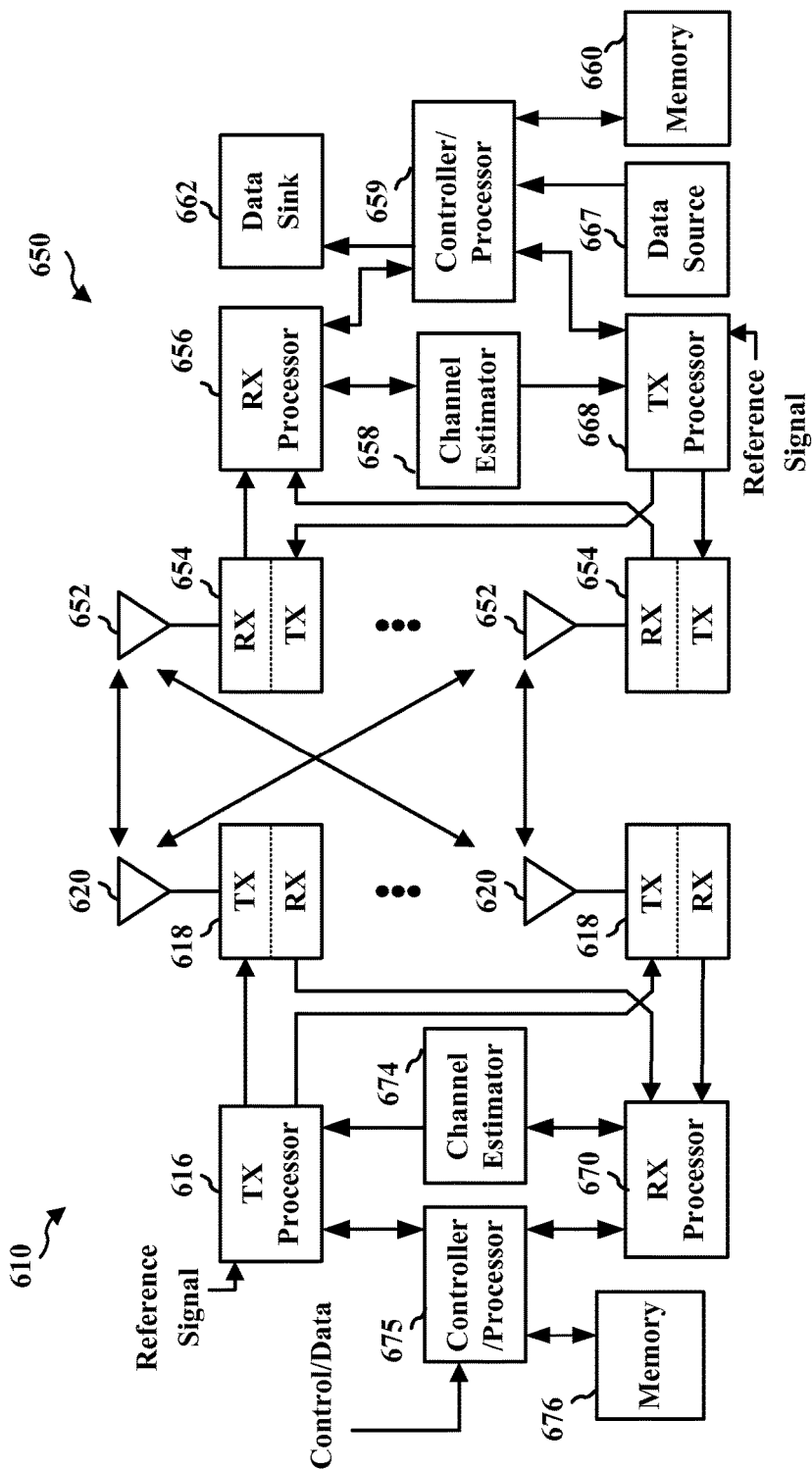
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates both (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Figures 8A, 8B, 8C:
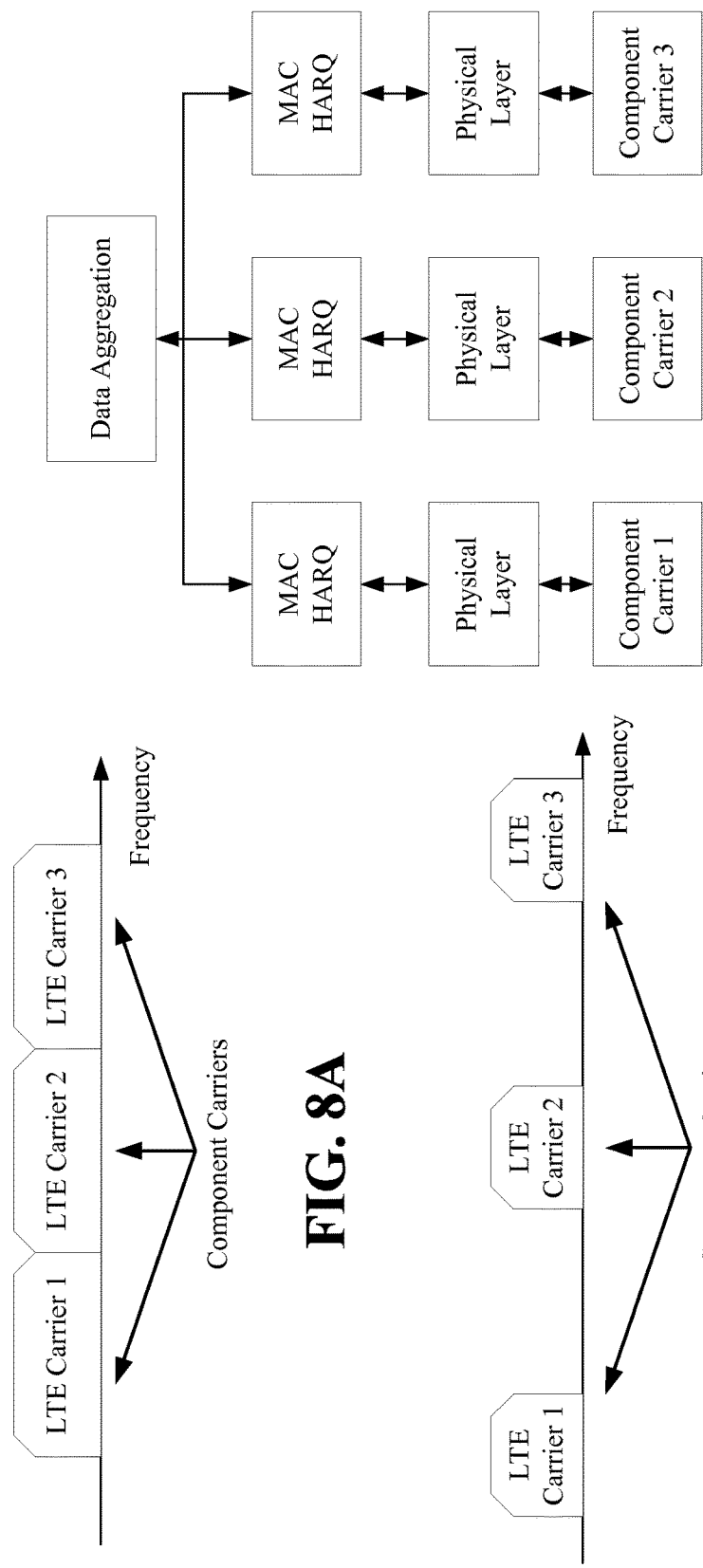
FIG. 8A discloses a continuous carrier aggregation type.
FIG. 8B discloses a non-continuous carrier aggregation type.
FIG. 8C discloses media access control layer data aggregation.

For the LTE-Advanced mobile systems, two types of carrier aggregation methods have been proposed, continuous carrier aggregation and non-continuous carrier aggregation. Continuous carrier aggregation is illustrated in FIG. 8A and non-continuous carrier aggregation is illustrated in FIG. 8B. Non-continuous carrier aggregation occurs when multiple available component carriers are separated along the frequency band. Continuous carrier aggregation occurs when multiple available component carriers are adjacent to each other. In both non-continuous and continuous carrier aggregation multiple LTE/component carriers are aggregated to serve a single unit of LTE Advanced UE.

Multiple RF receiving units and multiple FFTs may be deployed with non-continuous carrier aggregation in LTE-Advanced UE because the carriers are separated along the frequency band. Because non-continuous carrier aggregation supports data transmissions over multiple separated carriers across a large frequency range, propagation path loss, Doppler shift, and other radio channel characteristics may vary a lot at different frequency bands. To support broadband data transmission under the non-continuous carrier aggregation approach, methods may be used to adaptively adjust coding, modulation and transmission power for different component carriers. For example, in an LTE-Advanced system where the eNB has fixed transmitting power on each component carrier, the effective coverage or supportable modulation and coding of each component carrier may be different.

FIG. 8C illustrates aggregating transmission blocks from different component carriers at the MAC layer for an International Mobile Telecommunication (IMT) Advanced system. With MAC layer data aggregation, each component carrier has its own independent HARQ entity in the MAC layer and its own transmission configuration parameters (e.g., transmitting power, modulation and coding schemes, and multiple antenna configuration) in the physical layer. Similarly, in the physical layer, one HARQ entity is provided for each component carrier. In general, there are three different approaches for deploying control channel signaling for multiple component carriers. The first involves a minor modification of the control structure in LTE systems where each component carrier is given its own coded control channel. The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the carrier aggregation is reduced. Multiple control channels for different component carriers are jointly coded and then transmitted over the entire frequency band formed by a third carrier aggregation method. This approach offers low signaling overhead and high decoding performance in control channels, at the expense of high power consumption at the UE side. However, this method is not compatible with LTE systems.

According to various embodiments, the UE operating in a multicarrier system (also referred to as carrier aggregation) is configured to aggregate certain functions of multiple carriers, such as control and feedback functions, on the same carrier, which may be referred to as a primary carrier or a primary component carrier. The remaining carriers that depend on the primary carrier for support are referred to as associated secondary carriers or secondary component carriers. The primary carrier is transmitted by a primary cell. Secondary carriers are transmitted by secondary cells. The UE may aggregate control functions such as those provided by the optional dedicated channel (DCH), the nonscheduled grants, a PUCCH, and/or a physical downlink control channel (PDCCH). Signaling and payload may be transmitted both on the downlink by the eNB to the UE, and on the uplink by the UE to the eNB.

In some embodiments, there may be multiple primary carriers. In addition, secondary carriers may be added or removed without affecting the basic operation of the UE. In carrier aggregation, control functions may be aggregated from at least two carriers onto one carrier to form a primary carrier and one or more associated secondary carriers. Communication links may be established for the primary carrier and each secondary carrier. Subsequently, communication may be controlled based on the primary carrier.

In carrier aggregation, the UE sends a UE capability information message to the serving eNB to indicate supported bands and a carrier aggregation bandwidth class. According to the UE capability, the serving eNB can configure the UE using an RRC connection reconfiguration process. The RRC connection reconfiguration process allows the serving eNB to add and to remove secondary cells (currently up to four secondary cells) of the serving eNB that transmit on secondary carriers and to modify the primary cell of the serving eNB that transmits on the primary carrier.

In a handover, the serving eNB may use the RRC connection reconfiguration process to add and to remove secondary cells at the target primary cell. The serving eNB can activate or deactivate the data transmission of a secondary cell using an activation/deactivation MAC control element. Currently, the UE monitors the master information block (MIB) and SIBs from the primary cell. The primary cell is responsible for sending the MIB and some SIBs of the secondary cell to the UE. The primary cell sends the MIB and some SIBs of the secondary cell through a radio resource configuration common secondary cell (RadioResourceConfigCommonS-Cell) information element and a radio resource dedicated secondary cell (RadioResourceDedicatedSCell) information element. The primary cell currently does not signal eMBMS related information such as the SIB13 for aggregated secondary carriers. As such, methods are needed for conveying the SIB13 for aggregated secondary carriers from primary carriers. Furthermore, methods are needed for allowing a carrier aggregation capable UE to enhance multiband eMBMS operation and/or other operations through the use of a second receive chain. For a carrier aggregation capable UE, the UE may be equipped with two transceiver chains. An apparatus and methods are proposed to utilize two receive chains. Use of two receive chains may speed up the acquisition of a desired eMBMS service or minimize an interruption of an existing eMBMS/unicast service.

Figure 9:
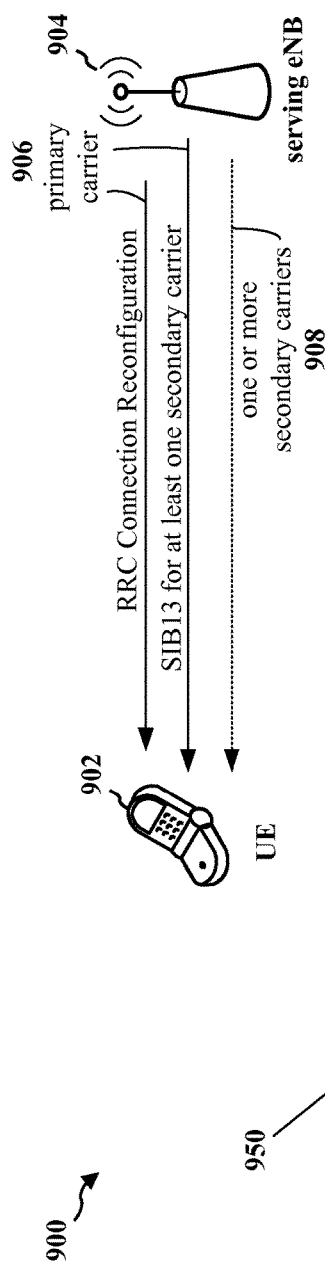
FIG. 9 is a diagram for illustrating a first exemplary method.

FIG. 9 is a diagram 900 illustrating a first set of exemplary methods. As shown in FIG. 9, the serving eNB 904 may send an RRC connection reconfiguration message (also referred to as an RRCConnectionReconfiguration message) to the UE 902 to configure the UE with aggregated carriers including a primary carrier 906 from a primary cell and one or more secondary carriers 908 from one or more secondary cells. In addition, the serving eNB 904 may send, with the RRC connection reconfiguration message, SIB13 information from the primary cell for at least one secondary carrier of the one or more secondary carriers 908. At least one secondary cell of one or more secondary cells of the serving eNB 904 transmits on the at least one secondary carrier.

The RRC connection reconfiguration message is sent on the PDSCH while the UE 902 is in an RRC connected mode. The SIB13 information may be sent in an RRC configuration common secondary cell information element 950 (also referred to as RadioResourceConfigCommonSCell information element) within the RRC connection reconfiguration message. The SIB13 information may include MBSFN area configuration information, which includes an MBSFN area information list and an eMBMS notification configuration (e.g., an MCCH change notification configuration). The MBSFN area information list includes information for acquiring eMBMS control information associated with one or more MBSFN areas. The eMBMS notification configuration includes eMBMS notification related configuration parameters applicable for all MBSFN areas. The expression "r10" stands for LTE Rel-10 and the expression "r9" stands for LTE Rel-9. The information element for a particular LTE release may differ from that shown in the information element 950.

Accordingly, if the UE 902 is configured with aggregated carriers and is in an RRC connected mode, the UE 902 may receive SIB13 information (e.g., MBSFN area configuration information and an eMBMS notification configuration) for at least one secondary carrier of one or more secondary carriers 908 on the primary carrier 906. For example, assume the UE 902 is configured with a primary carrier $CC_1$ (may also be referred to as primary component carrier) and two secondary carriers $CC_2$ and $CC_3$ (may also be referred to as secondary component carriers). The UE 902 may receive SIB13 information for the secondary carrier $CC_2$ or the secondary carrier $CC_3$ on the primary carrier $CC_1$. The UE 902 receives the SIB13 information on the primary carrier in an RRC configuration common secondary cell information element, which may be received in an RRC connection reconfiguration message on a received PDSCH on the primary carrier from the primary cell of the serving eNB 904.

In one configuration, for LTE Rel. 11 and later releases, the UE 902 may send an MBMS interest indication message (also referred to as an MBMSInterestIndication message) that specifies one or more frequencies of interest of the UE 902. The one or more frequencies of interest are associated with MBMS services of interest to the UE 902. The serving eNB 904 receives the MBMS interest indication message and determines frequencies of interest to the UE 902. The eNB 904 may then send the SIB13 information for those determined frequencies of interest. For example, the UE 902 may send an MBMS interest indication message indicating an interest in a second frequency $f_2$ corresponding to the secondary carrier $CC_2$. The serving eNB 904 may then provide the SIB13 information for the secondary carrier $CC_2$ on the primary carrier $CC_1$.

Figure 10:
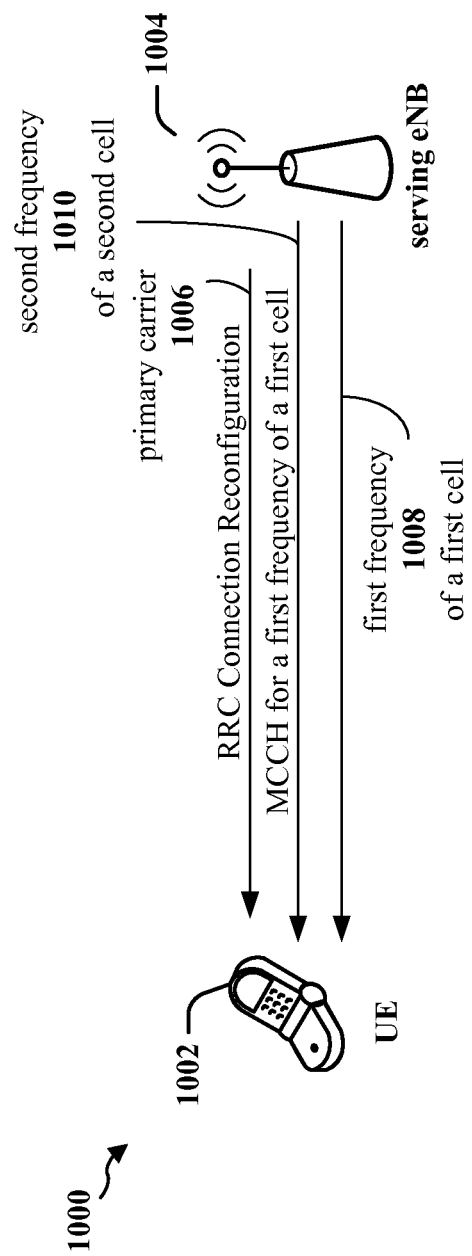
FIG. 10 is a diagram for illustrating a second exemplary method.

FIG. 10 is a diagram 1000 for illustrating a second exemplary method. As shown in FIG. 10, the UE 1002 receives a configuration with aggregated carriers including a primary carrier 1006 from a primary cell and one or more secondary carriers from one or more corresponding secondary cells of the serving eNB 1004. The configuration is received in an RRC connection reconfiguration message from the serving eNB 1004. In addition, the UE 1002 receives an MCCH change notification for a first frequency 1008 of a first cell on a second frequency 1010 of a second cell. The MCCH change notification may include one bit for each MBSFN area (e.g., eight bits for eight MBSFN areas), to indicate MCCH changes such as a new eMBMS session in one or more MBSFN areas. In the example provided in FIG. 10, the MCCH change notification for the first frequency 1008 of the first cell provides a notification that the MCCH information has changed for the first frequency 1008. The MCCH change notification is received on the second frequency 1010 of the second cell. In a first configuration, the first cell is a primary cell and the second cell is a secondary cell. In such a configuration, the MCCH change notification is for the primary cell and is received from a secondary cell. In a second configuration, the first cell is a secondary cell and the second cell is the primary cell. In such a configuration, the MCCH change notification is for a secondary cell and is received from the primary cell. In a third configuration, the first cell is a first secondary cell and the second cell is a second secondary cell different than the first secondary cell. In such a configuration, the MCCH change notification is for a first secondary cell and is received from a second secondary cell different than the first secondary cell.

The UE 1002 may receive the MCCH change notification in a downlink control information (DCI) format 1C message on a PDCCH. The PDCCH DCI format 1C message is scrambled based on an MBMS radio network temporary identifier (M-RNTI) associated with a UE. The UE uses its M-RNTI to decode the received PDCCH DCI format 1C message. The PDCCH DCI format 1C message may further include a carrier frequency index (CFI) that specifies for which carrier the MCCH change notification applies. Because a UE may be configured with up to five carriers (one primary carrier and up to four secondary carriers), the CFI may be three bits for identifying which of the five carriers the MCCH change notification applies. For example, a primary carrier may have a CFI=0, a first secondary carrier may have a CFI=1, and a second secondary carrier may have a CFI=2. A PDCCH DCI format 1C message that includes an MCCH change notification for the second secondary carrier may be sent from the primary cell on the primary carrier with a CFI=2 in order to indicate to the UE 1002 that the received MCCH change notification applies to the second secondary carrier. The serving eNB 1004 may send the same MCCH change notification on each of the aggregated carriers or on a subset of the aggregated carriers. For example, the serving eNB 1004 may also send the MCCH change notification for the second secondary carrier from the secondary cell associated with the second secondary carrier. Both of the MCCH change notification messages may be received concurrently on the primary carrier and the second secondary carrier.

For LTE Rel. 11 and later releases, the UE 1002 may generate and send an MBMS interest indication message specifying frequencies of interest. The serving eNB 1004 may receive MBMS interest indication messages from a plurality of UEs, including the UE 1002. If one of the specified frequencies of interest is the first frequency of the first cell, the serving eNB 1004 may determine to send the MCCH change notification for the first frequency to each of the UEs served by the serving eNB 1004. As such, even if the UE 1002 did not specify the first frequency as a frequency of interest, the UE 1002 may receive the MCCH change notification for the first frequency. The serving eNB 1004 may refrain from sending MCCH change notification messages for frequencies not specified as frequencies of interest in the received MBMS interest indication messages. As such, the serving eNB 1004 may send MCCH change notification messages only for frequencies of interest specified in the received MBMS interest indication messages. The serving eNB 1004 may send the MCCH change notification messages from cells through which the UEs served by the serving eNB 1004 may receive the MCCH change notification messages. For example, if no UEs are able to receive a communication on a first secondary carrier, but UEs can receive a communication on the primary carrier and a second secondary carrier, the serving eNB 1004 may send MCCH change notification messages from the primary carrier and the second secondary carrier only. The serving eNB 1004 may determine on which carriers UEs can receive messages based on whether communication has been received from the UEs on the carriers. In another configuration, the serving eNB 1004 is not selective on which cells transmit MCCH change notification messages, and sends MCCH change notification messages on each frequency transmitted by the serving eNB 1004.

Figure 11:
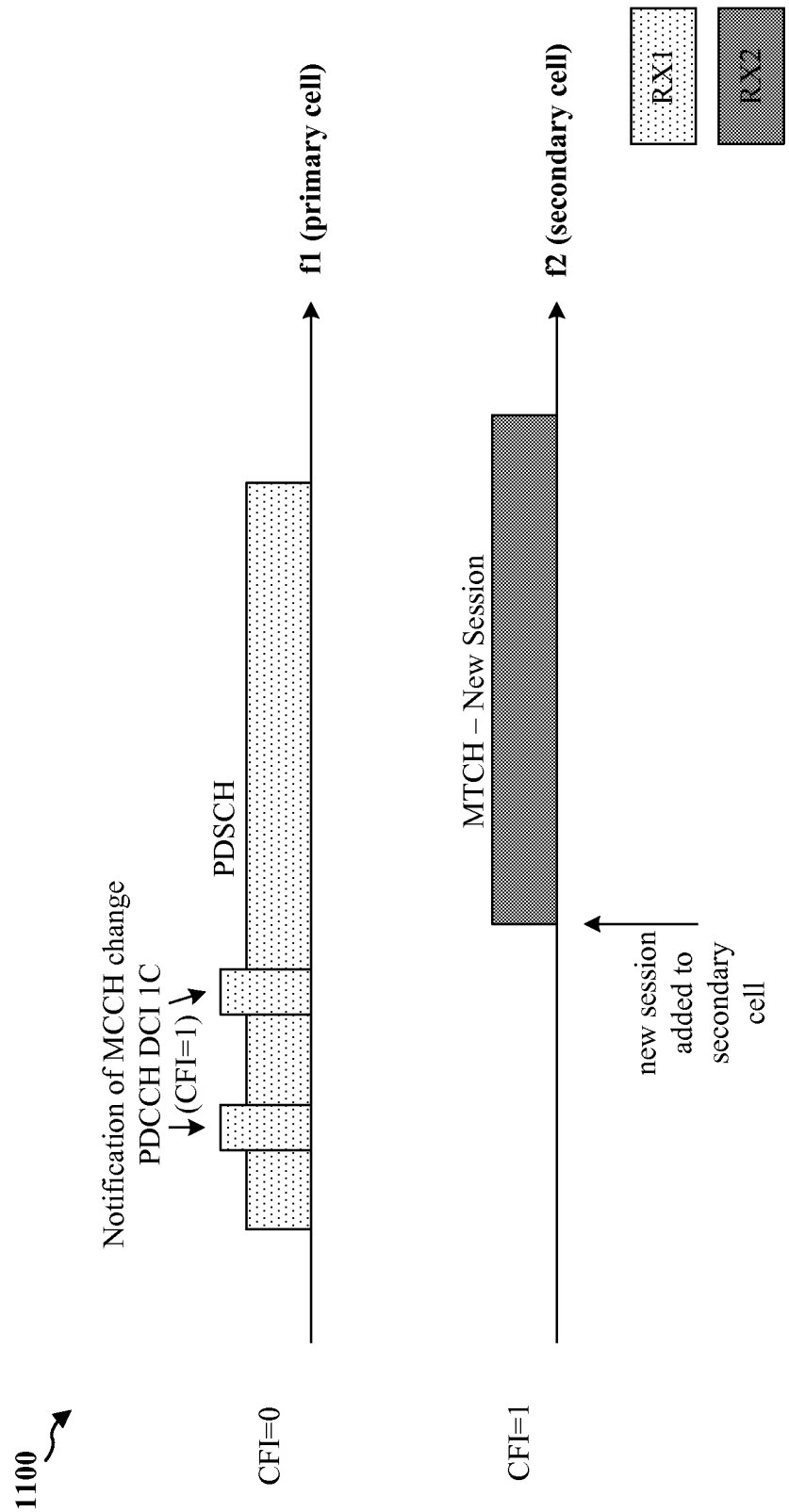
FIG. 11 is a first diagram for further illustrating the second exemplary method.

FIG. 11 is a first diagram 1100 for further illustrating the second exemplary method. As shown in FIG. 11, a UE in an RRC connected mode, may receive a PDSCH on a first frequency $f_1$ from a primary cell. In addition, the UE may receive on the first frequency $f_1$ PDCCH DCI format 1C messages including a notification of MCCH change for a second frequency $f_2$ of a secondary cell. The first frequency $f_1$ may be associated with a CFI of 0 and the second frequency $f_2$ may be associated with a CFI of 1. To indicate to the UE which frequency the notification of MCCH change applies, the PDCCH DCI format 1C message may include a CFI set to 1 indicating that the notification of MCCH change applies to the second frequency $f_2$. Based on the received notification of MCCH change, the UE may determine that a new session has been added to the secondary cell on the second frequency $f_2$, and may subsequently receive the new session on the respective MTCH. While FIG. 11 shows a notification of MCCH change for a secondary cell being received from the primary cell, as discussed supra, the notification of MCCH change may be for the primary cell and received from a secondary cell, or may be for a first secondary cell and received from a second secondary cell different than the first secondary cell. The first frequency $f_1$ may be received through a first receive chain $RX_1$ and the second frequency $f_2$ may be received through a second receive chain $RX_2$.

Figure 12:
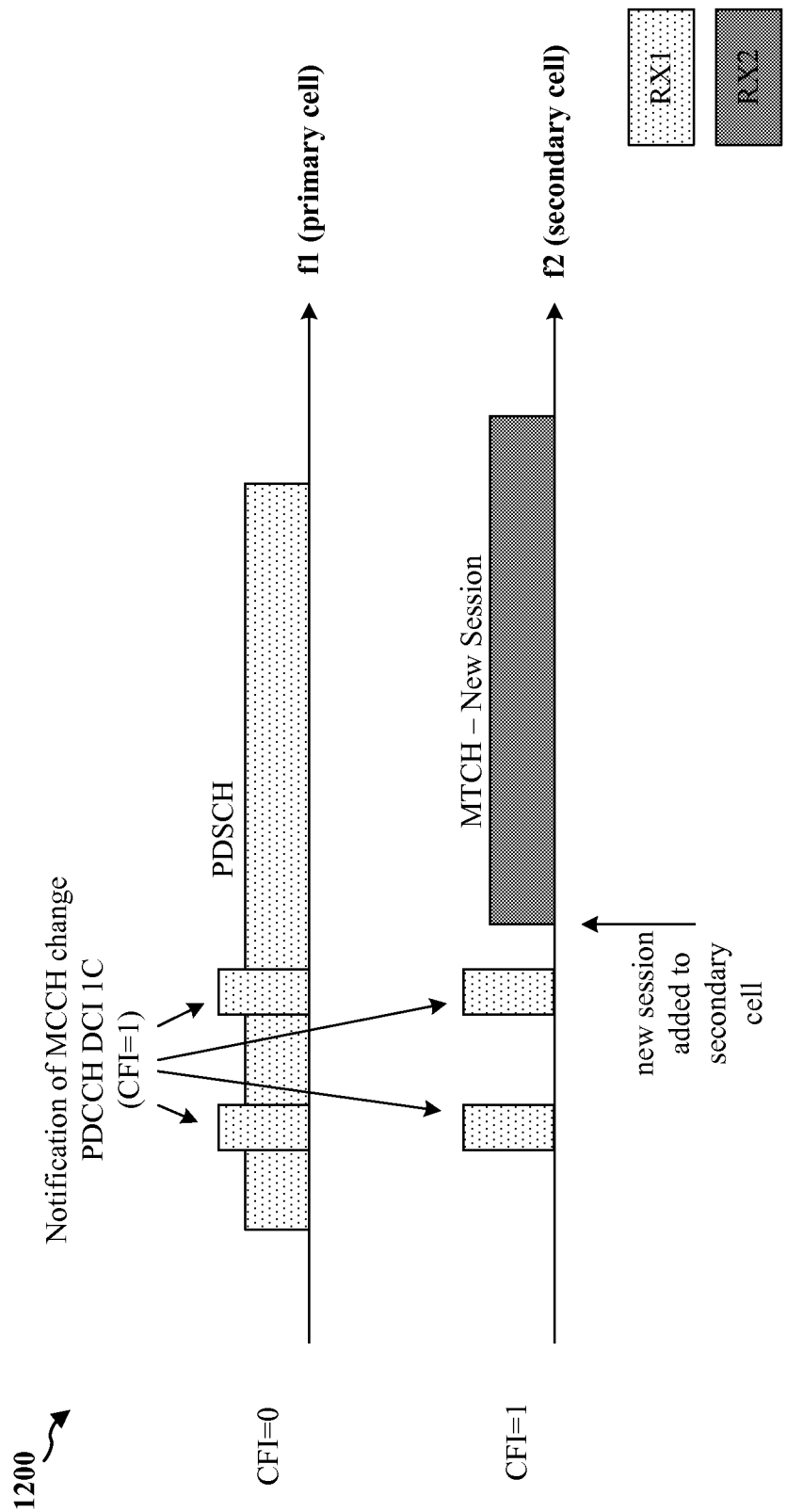
FIG. 12 is a second diagram for further illustrating the second exemplary method.

FIG. 12 is a second diagram 1200 for further illustrating the second exemplary method. As shown in FIG. 12, a UE in an RRC connected mode, may receive a PDSCH on a first frequency $f_1$ from the primary cell. In addition, the UE may receive on the first frequency $f_1$ PDCCH DCI format 1C messages including a notification of MCCH change for a second frequency $f_2$ of a secondary cell. The UE may also receive the same notification of MCCH change for the second frequency $f_2$ on the second frequency $f_2$. The notification of MCCH change may be received concurrently on both the first frequency $f_1$ and the second frequency $f_2$. The notification of MCCH change messages may each specify a CFI of 1 to indicate that the notification of MCCH change is for the second frequency $f_2$. Based on the received notification of MCCH change, the UE may determine that a new session has been added to the secondary cell on the second frequency $f_2$, and may subsequently receive the new session on the respective MTCH transmitted on the second frequency $f_2$. The first frequency $f_1$ may be received through a first receive chain $RX_1$ and the second frequency $f_2$ may be received through a second receive chain $RX_2$.

Figure 13:
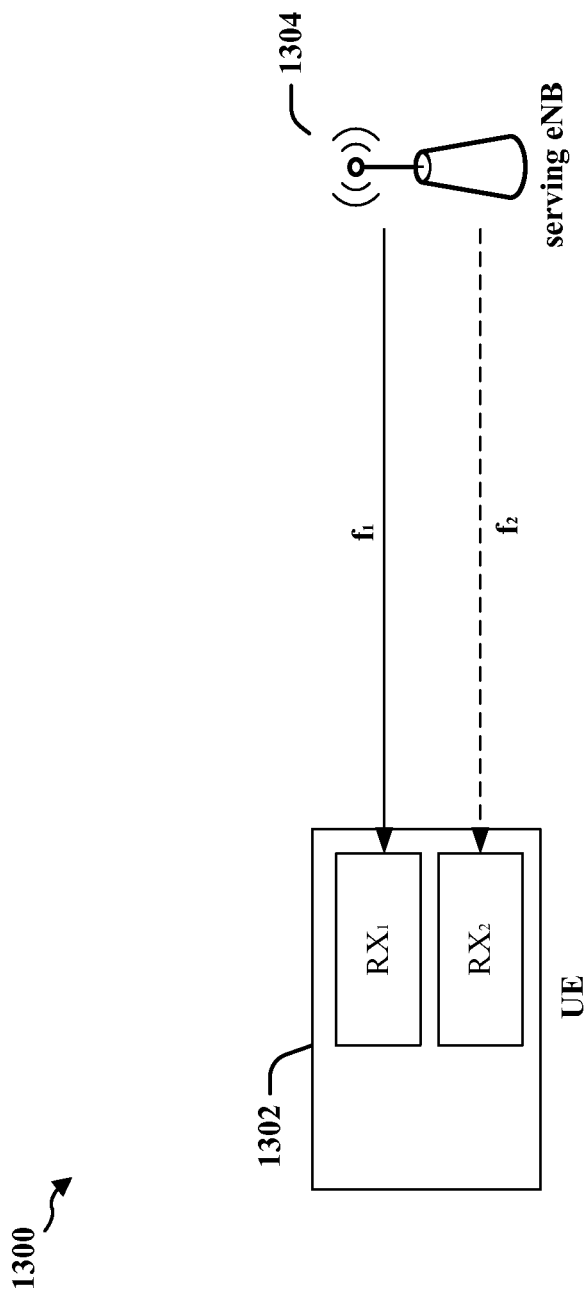
FIG. 13 is a diagram for illustrating a third exemplary method.

FIG. 13 is a diagram 1300 for illustrating a third exemplary method. As shown in FIG. 13, the UE 1302 receives through a first receive chain $RX_1$ a unicast communication and/or a broadcast/multicast communication on frequency $f_1$ from a first cell of the serving eNB 1304. Without receiving specific instruction from the serving eNB 1304, the UE 1302 determines to receive and receives autonomously through a second receive chain $RX_2$ at least one of broadcast/multicast signal communication, synchronization signal communication, or reference signal communication on a second frequency $f_2$ from a second cell of the serving eNB 1304. The UE 1302 may concurrently receive the unicast communication and/or a broadcast/multicast communication on the frequency $f_1$ from the first cell of the serving eNB 1304 and the at least one of the broadcast/multicast signal, the synchronization signal, or the reference signal communication on the second frequency $f_2$ from the second cell of the serving eNB 1304. The UE 1302 is shown with two receive chains $RX_1$, $RX_2$. However, the UE 1302 may have additional receive chains. For example, the UE 1302 may have five receive chains for receiving a primary carrier and up to four secondary carriers. In the third exemplary method, the UE 1302 autonomously, without receiving any instruction from the serving eNB 1304, uses the second receive chain $RX_2$ for enhancing operations (e.g., multiband eMBMS operation).

In a first configuration, the UE is not configured with carrier aggregation, and therefore the UE may autonomously use the second receive chain $RX_2$ for enhancing operations. In a second configuration, the UE is configured with carrier aggregation, but has a receive chain that is not configured for carrier aggregation (e.g., the UE has a receive chain not configured for carrier aggregation), and therefore can autonomously use such receive chain for enhancing operations. In a third configuration (see FIG. 20 and FIG. 21), the UE is configured with carrier aggregation, and each receive chain is configured for carrier aggregation. In each of the configurations, the UE may concurrently utilize a plurality of available receive chains.

Figure 14:
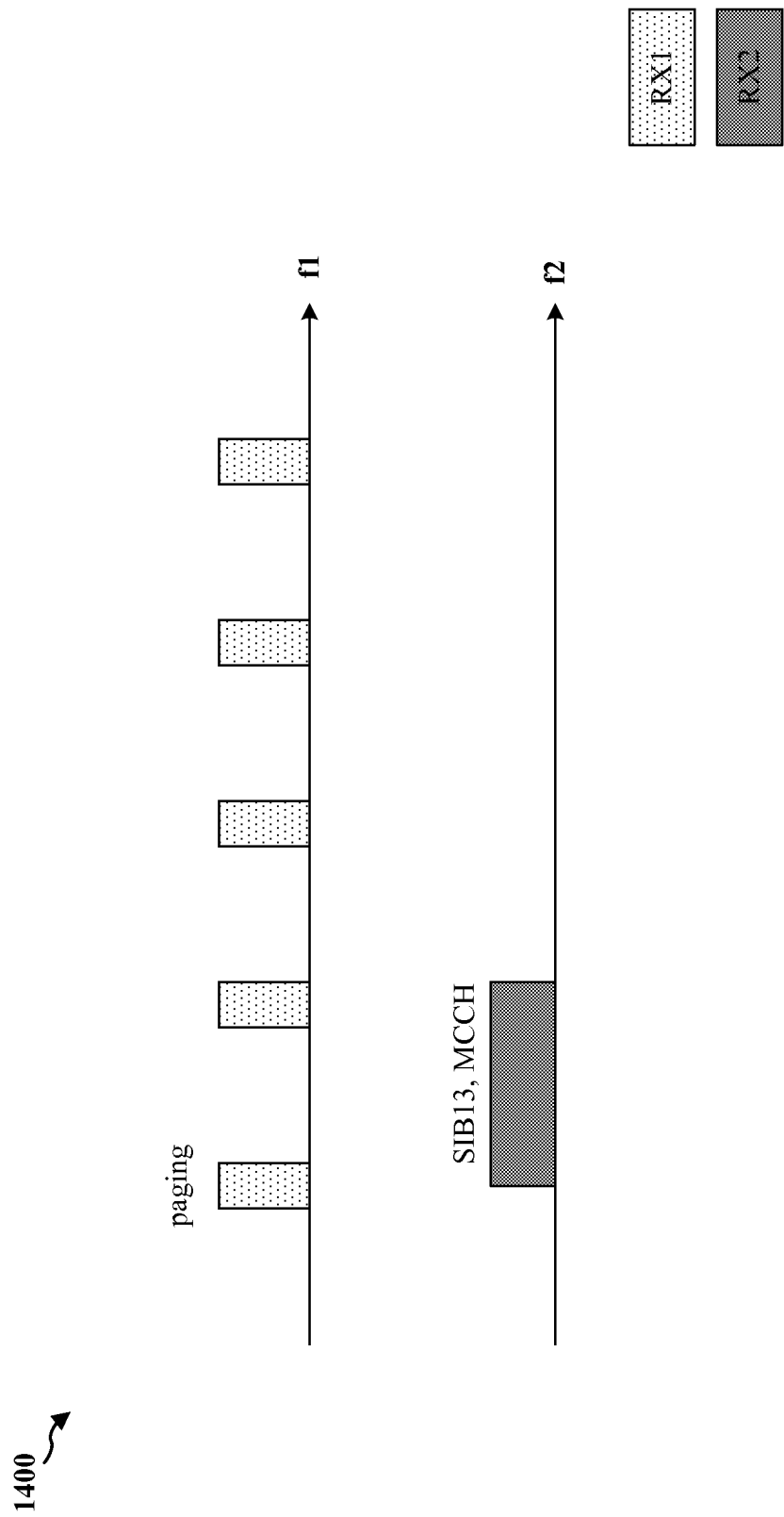
FIG. 14 is a diagram illustrating a first configuration of the third exemplary method.

FIG. 14 is a diagram 1400 illustrating a first configuration of the third exemplary method. As shown in FIG. 14, a UE in an RRC idle mode and not receiving an eMBMS service, may receive paging signals on a first frequency $f_1$ through the first receive chain $RX_1$. If the UE would like to determine available eMBMS services (e.g., obtain a temporary mobile group identifier (TMGI) list) on a second frequency $f_2$ and the second receive chain $RX_2$ is not configured for carrier aggregation, the UE may autonomously use the second receive chain $RX_2$ to receive SIB13 information (e.g., a SIB13) and an MCCH on the second frequency $f_2$. Based on the SIB13 information, the UE obtains information for acquiring the MCCH. In one configuration, the UE may obtain the SIB13 information on the first frequency $f_1$ while previously configured for carrier aggregation with the aggregated carriers corresponding to the frequencies $f_1$, $f_2$ and while in an RRC connected mode (see FIG. 9). In such a configuration, the UE may cache the received SIB13 information, and then when in an RRC idle mode while no longer configured for carrier aggregation, use the second receive chain $RX_2$ to obtain the MCCH and to determine the available eMBMS services based on the cached SIB13 information.

Figure 15:
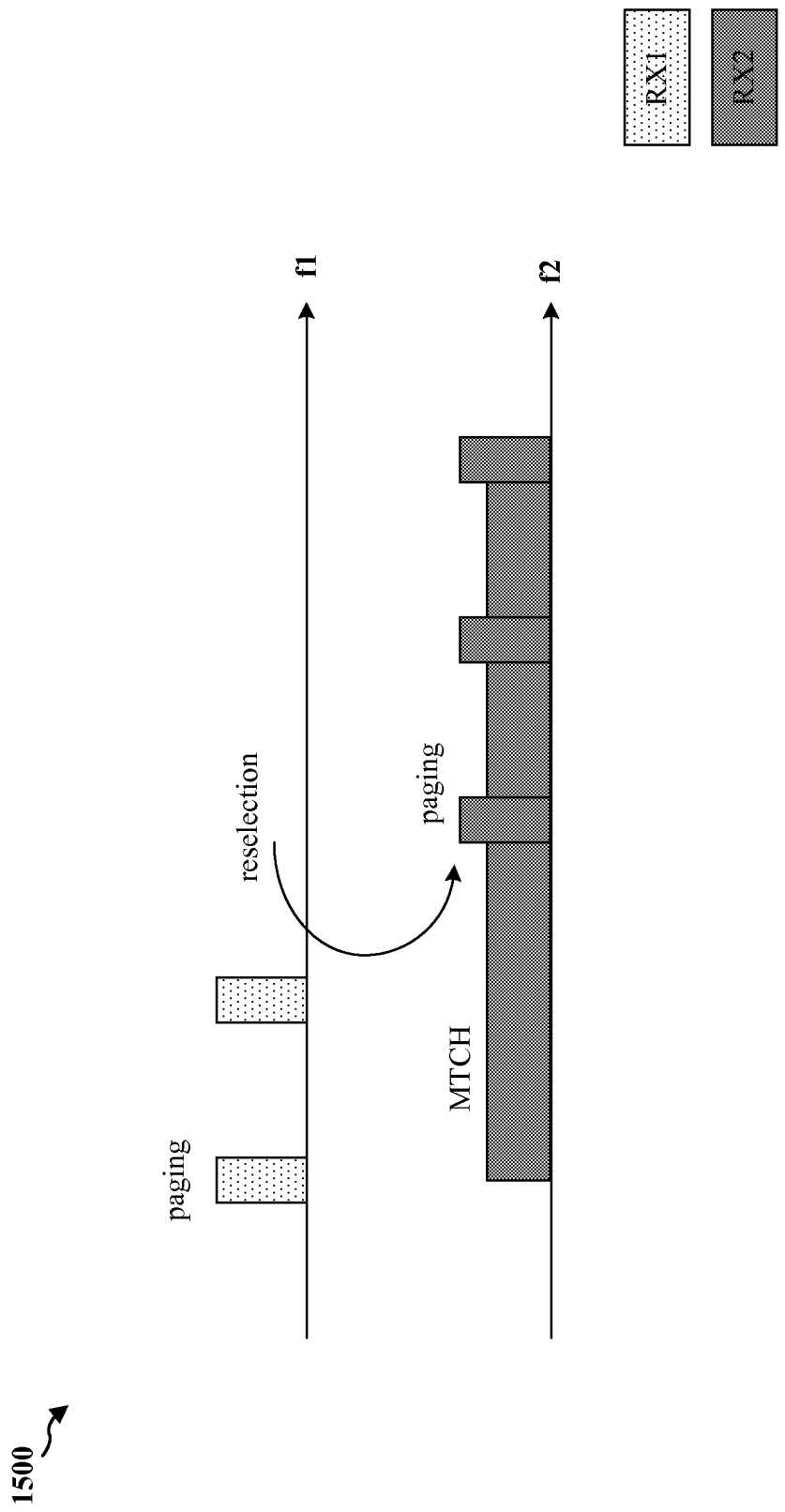
FIG. 15 is a diagram illustrating a second configuration of the third exemplary method.

FIG. 15 is a diagram 1500 illustrating a second configuration of the third exemplary method. After obtaining the SIB13 and the MCCH for the second frequency $f_2$ as described supra in relation to FIG. 14, the UE may determine to receive an eMBMS service on the second frequency $f_2$ through the second receive chain $RX_2$ based on the received SIB13 and the MCCH. Subsequently, the UE may receive the eMBMS service on the second frequency $f_2$ through the second receive chain $RX_2$ without having previously performed an inter-frequency cell reselection to the second cell. Subsequently, the UE may set the second frequency $f_2$ to a highest priority and perform an inter-frequency cell reselection to the second cell. Upon the inter-frequency cell reselection to the second cell, the UE may then receive paging signals on the second frequency $f_2$ from the second cell through the second receive chain $RX_2$ rather than on the first frequency $f_1$ from the first cell through the first receive chain $RX_1$. As the UE is no longer using the first receive chain $RX_1$, the UE may then turn off the first receive chain $RX_1$ to save battery power.

Figure 16:
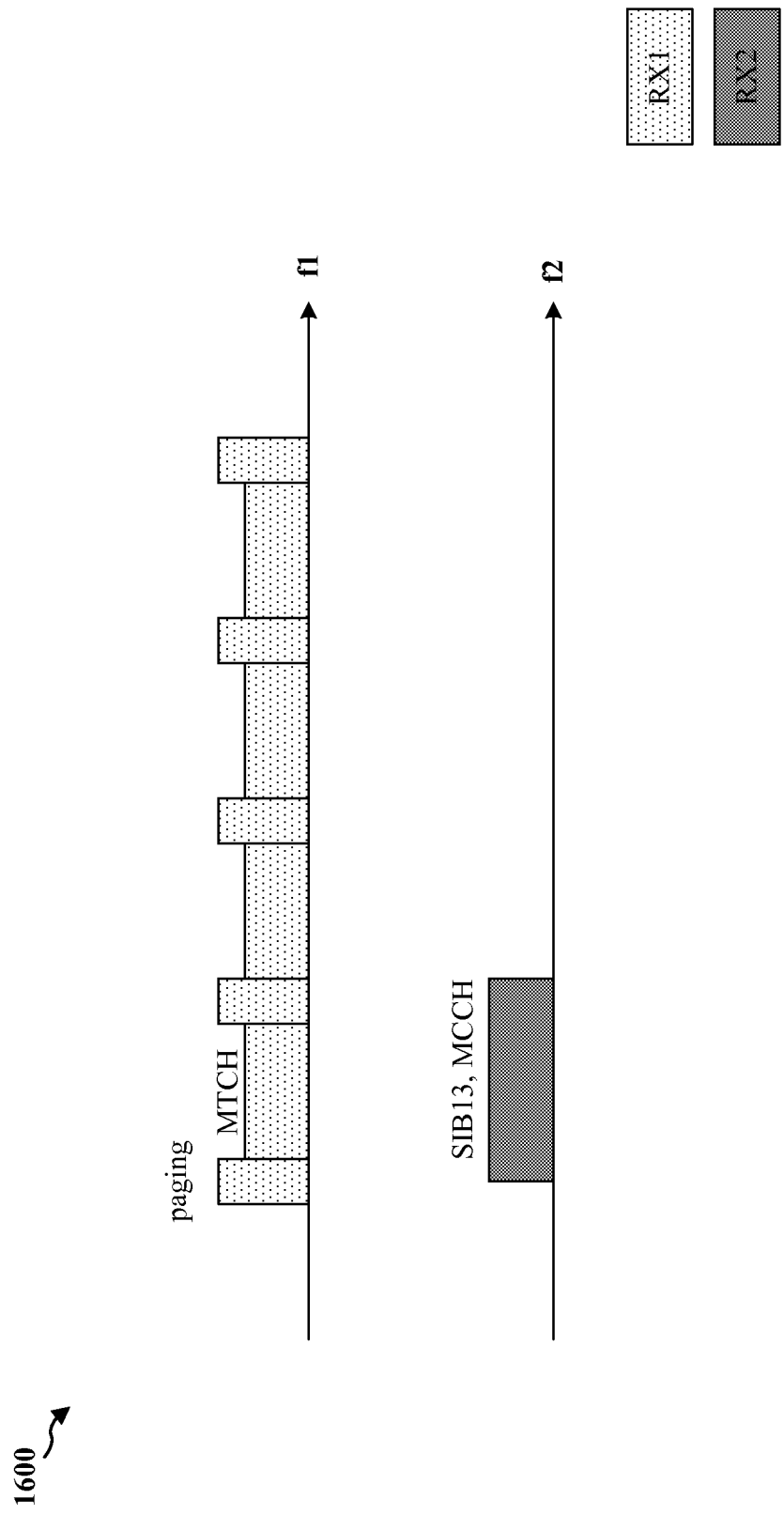
FIG. 16 is a diagram illustrating a third configuration of the third exemplary method.

FIG. 16 is a diagram 1600 illustrating a third configuration of the third exemplary method. As shown in FIG. 16, a UE in an RRC idle mode and receiving an eMBMS service, may receive paging signals on a first frequency $f_1$ through the first receive chain $RX_1$. If the UE would like to determine available eMBMS services (e.g., obtain a TMGI list) on a second frequency $f_2$ and the second receive chain $RX_2$ is not configured for carrier aggregation, the UE may autonomously use the second receive chain $RX_2$ to receive SIB13 information (e.g., a SIB13) and an MCCH on the second frequency $f_2$. Based on the SIB13 information, the UE obtains information for acquiring the MCCH. In one configuration, the UE may obtain the SIB13 information on the first frequency $f_1$ while previously configured for carrier aggregation with the aggregated carriers corresponding to the frequencies $f_1$, $f_2$ and while in an RRC connected mode (see FIG. 9). In such a configuration, the UE may cache the received SIB13 information, and then when in an RRC idle mode while no longer configured for carrier aggregation, use the second receive chain $RX_2$ to obtain the MCCH and to determine the available eMBMS services using the cached SIB13 information.

Figure 17:
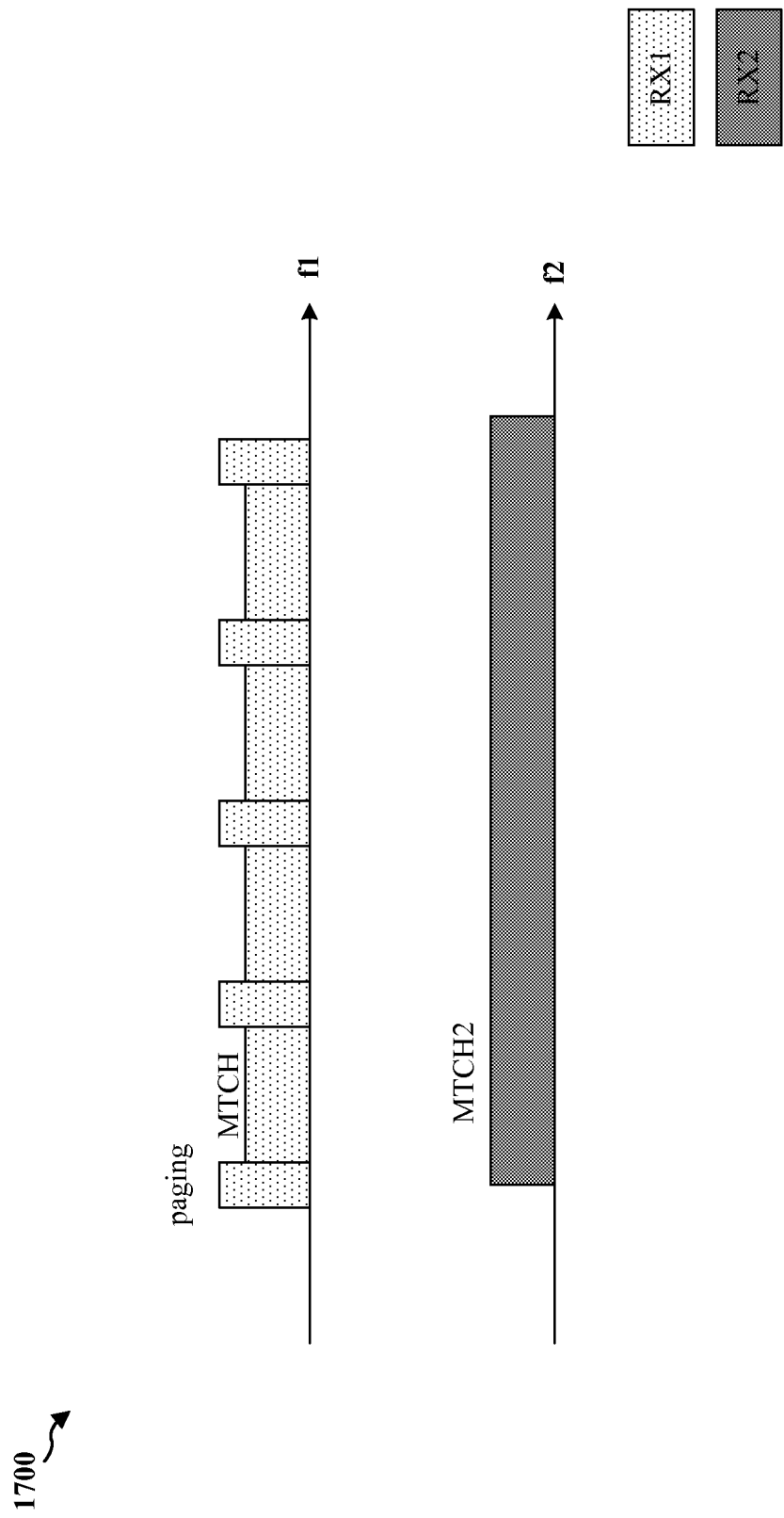
FIG. 17 is a diagram illustrating a fourth configuration of the third exemplary method.

FIG. 17 is a diagram 1700 illustrating a fourth configuration of the third exemplary method. After obtaining the SIB13 and the MCCH for the second frequency $f_2$ as described supra in relation to FIG. 16, the UE may determine to receive an eMBMS service on the second frequency $f_2$ through the second receive chain $RX_2$ based on the received SIB13 and the MCCH. Subsequently, the UE may receive the eMBMS service on the second frequency $f_2$ through the second receive chain $RX_2$. The UE then monitors for paging signals, a MIB, a SIB 1 (SIB1), and the SIB13 on the second frequency $f_2$ through the second receive chain $RX_2$. The MIB provides information for acquiring the SIB1. The SIB1 provides information on the scheduling of the SIB13 so that the UE knows how to obtain the SIB13.

Figure 18:
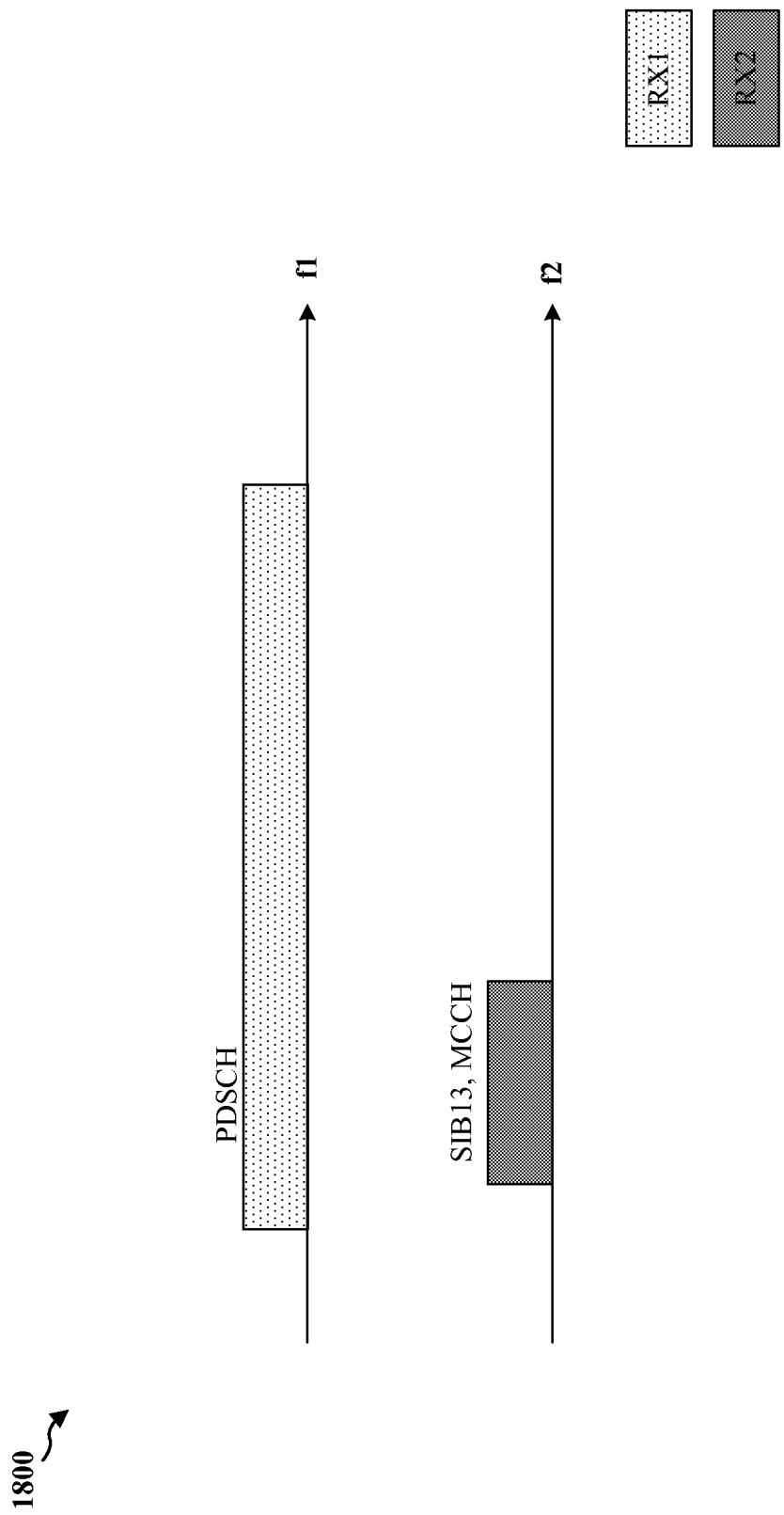
FIG. 18 is a diagram illustrating a fifth configuration of the third exemplary method.

FIG. 18 is a diagram 1800 illustrating a fifth configuration of the third exemplary method. As shown in FIG. 18, a UE in an RRC connected mode may receive unicast signals in a PDSCH on a first frequency $f_1$ through the first receive chain $RX_1$. If the UE would like to determine available eMBMS services (e.g., obtain a TMGI list) on a second frequency $f_2$ and the second receive chain $RX_2$ is not configured for carrier aggregation, the UE may autonomously use the second receive chain $RX_2$ to receive SIB13 information (e.g., a SIB13) and an MCCH on the second frequency $f_2$. Based on the SIB13 information, the UE obtains information for acquiring the MCCH. In one configuration, the UE may obtain the SIB13 information on the first frequency $f_1$ while previously configured for carrier aggregation with the aggregated carriers corresponding to the frequencies $f_1$, $f_2$ and while in an RRC connected mode (see FIG. 9). In such a configuration, the UE may cache the received SIB13 information, and then when in an RRC idle mode while no longer configured for carrier aggregation, use the second receive chain $RX_2$ to obtain the MCCH and to determine the available eMBMS services.

Figure 19:
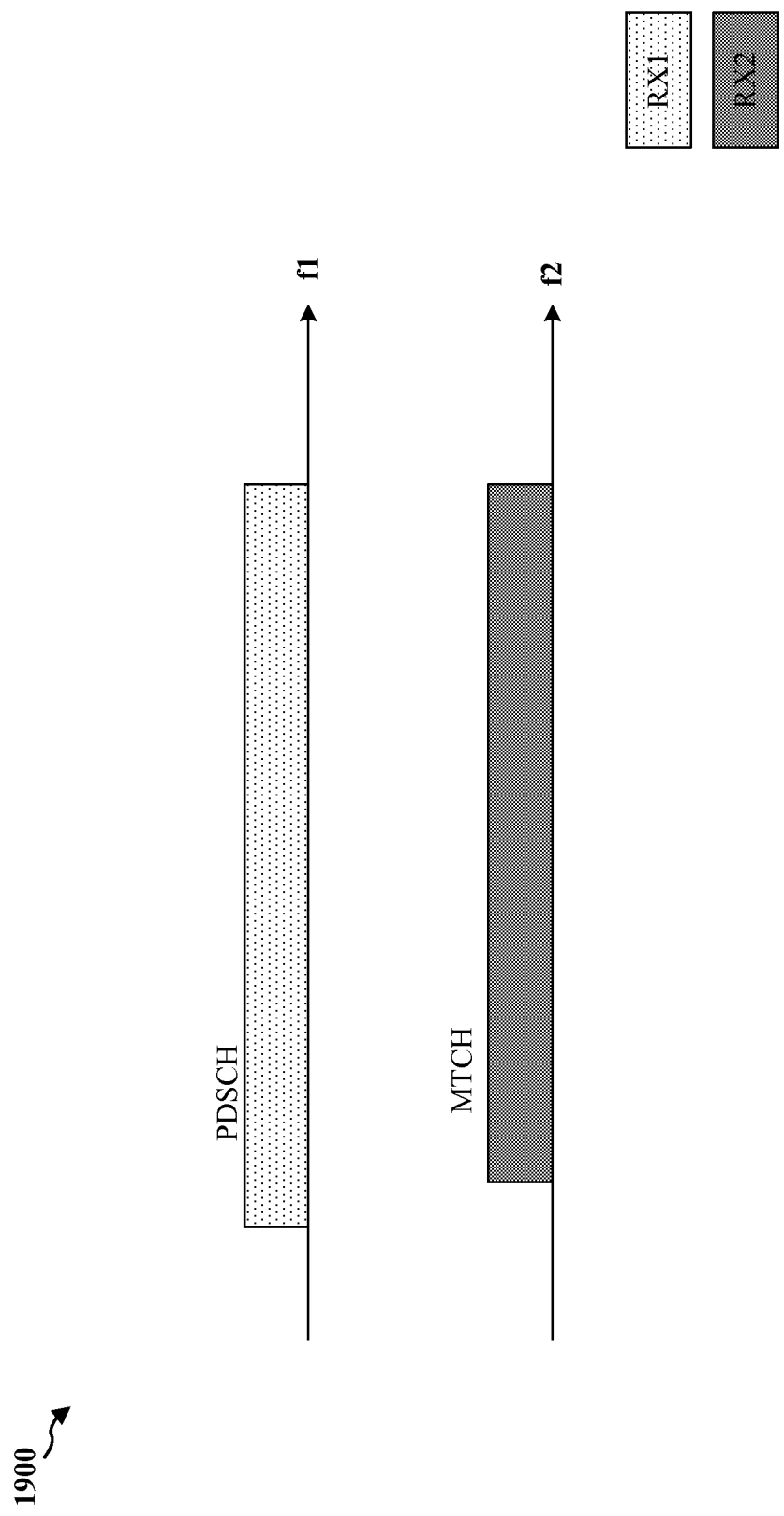
FIG. 19 is a diagram illustrating a sixth configuration of the third exemplary method.

FIG. 19 is a diagram 1900 illustrating a sixth configuration of the third exemplary method. After obtaining the SIB13 and the MCCH for the second frequency $f_2$ as described supra in relation to FIG. 18, the UE may determine to receive an eMBMS service on the second frequency $f_2$ through the second receive chain $RX_2$ based on the received SIB13 and the MCCH. Subsequently, the UE may receive the eMBMS service on the second frequency $f_2$ through the second receive chain $RX_2$. The UE then monitors for paging signals, a MIB, a SIB1, and the SIB13 on the second frequency $f_2$ through the second receive chain $RX_2$. The UE monitors for the MIB, a SIB1, and the SIB13 on the second frequency $f_2$ through the second receive chain $RX_2$ in order to continue receiving the eMBMS service on the second frequency $f_2$ without disruption.

In LTE Rel. 11 and later releases, the UE may send an MBMS interest indication message to the serving eNB specifying at least one frequency of interest. If the UE specifies the second frequency $f_2$ corresponding to a second cell, but not the first frequency $f_1$ as a frequency of interest, the serving eNB may send to the UE a message instructing the UE to do an inter-frequency handover to the second cell. The serving eNB then reconfigures the second cell, which is carrying an eMBMS service of interest, as a paging cell. Upon receiving the message, the UE may perform the inter-frequency handover to the second cell.

Figure 20:
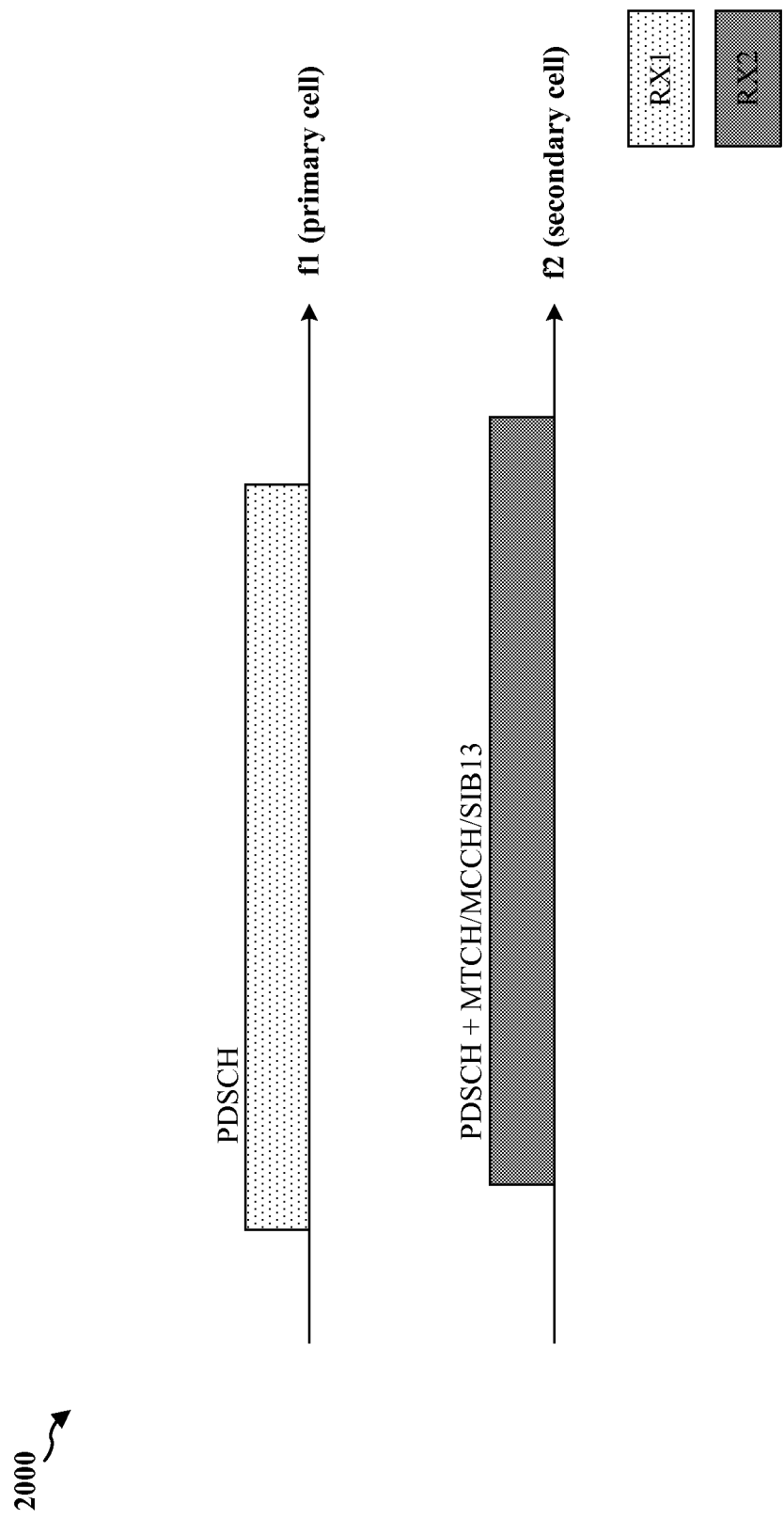
FIG. 20 is a diagram illustrating a seventh configuration of the third exemplary method.

FIG. 20 is a diagram 2000 illustrating a seventh configuration of the third exemplary method. As shown in FIG. 20, a UE is in an RRC connected mode and is configured with aggregated carriers including a primary carrier from a primary cell corresponding to $f_1$ and a secondary carrier from a secondary cell corresponding to $f_2$. The UE is receiving unicast signals in a PDSCH on the first frequency $f_1$ through the first receive chain $RX_1$. If the UE would like to determine available eMBMS services (e.g., obtain a TMGI list) on a second frequency $f_2$, the UE monitors paging signals, a MIB, a SIB1, and the SIB13 on the second frequency $f_2$ through the second receive chain $RX_2$. The UE receives SIB13 information (e.g., a SIB13) and an MCCH on the second frequency $f_2$ through the second receive chain $RX_2$. Based on the SIB13 information, the UE obtains information for acquiring the MCCH. Based on the obtained MCCH, the UE may receive an eMBMS service on the MTCH carrying the eMBMS service. In one configuration, the UE may obtain the SIB13 information on the first frequency $f_1$ as discussed supra in relation to FIG. 9.

The UE may send an MBMS interest indication message to the serving eNB specifying a frequency of interest. If the UE specifies a third frequency $f_3$, the serving eNB may configure the primary cell or a secondary cell to provide the third frequency $f_3$.

Figure 21:
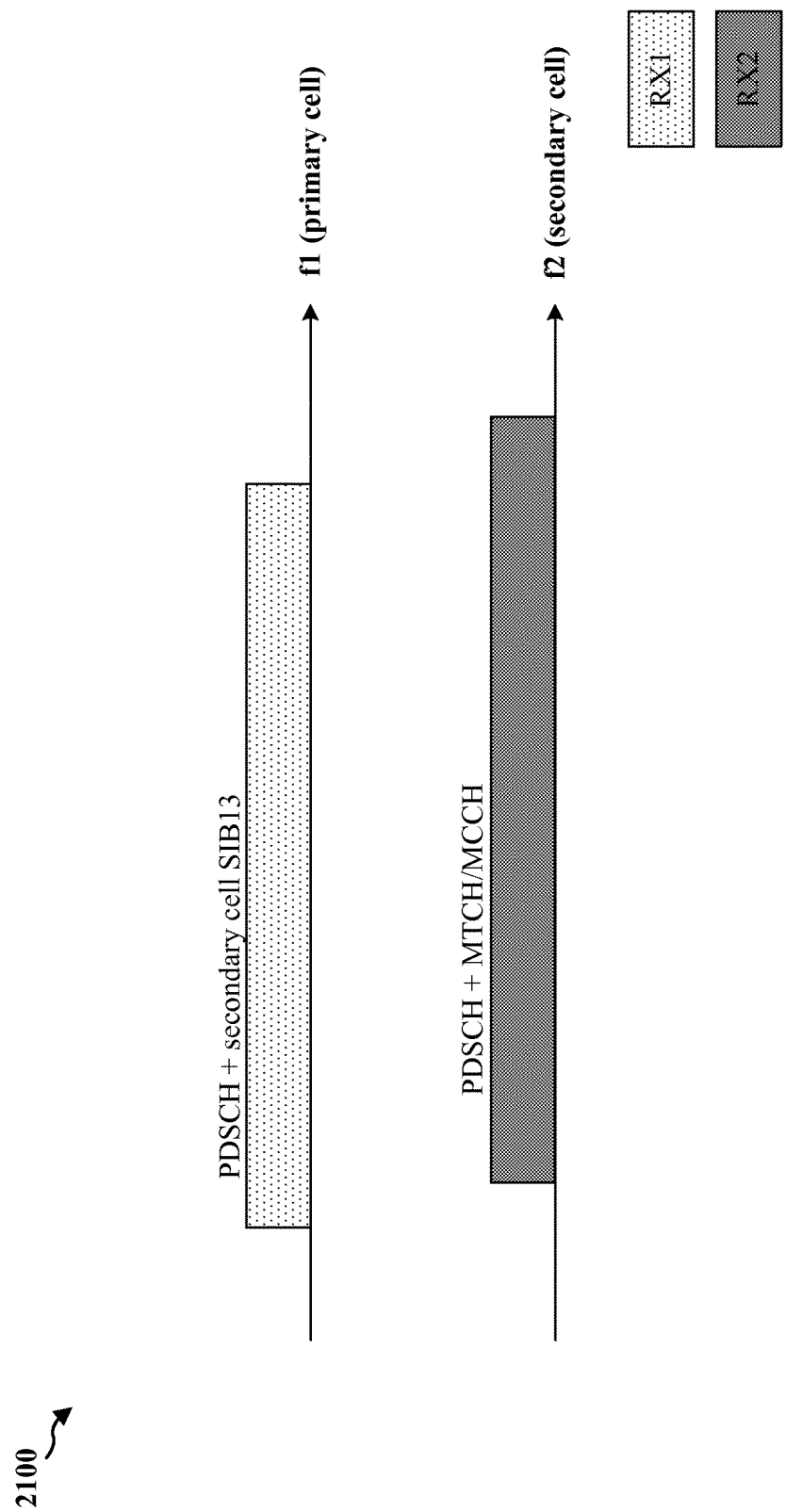
FIG. 21 is a diagram illustrating a eighth configuration of the third exemplary method.

FIG. 21 is a diagram 2100 illustrating a eighth configuration of the third exemplary method. As shown in FIG. 21, a UE is in an RRC connected mode and is configured with aggregated carriers including a primary carrier from a primary cell corresponding to $f_1$ and a secondary carrier from a secondary cell corresponding to $f_2$. The UE is receiving unicast signals on a PDSCH transmitted on the first frequency $f_1$ through the first receive chain $RX_1$. If the UE would like to determine available eMBMS services (e.g., obtain a TMGI list) on a second frequency $f_2$, the UE monitors paging signals, a MIB, and a SIB1 on the second frequency $f_2$ through the second receive chain $RX_2$. The UE also monitors for a SIB13 on the first frequency $f_1$ through the first receive chain $RX_1$. The UE may receive the SIB13 in a radio resource configuration common secondary cell information element within an RRC connection reconfiguration message as discussed supra in relation to FIG. 9. Based on the SIB13 information, the UE obtains information for acquiring the MCCH. Based on the obtained MCCH, the UE may receive an eMBMS service on the MTCH carrying the eMBMS service.

Figure 22:
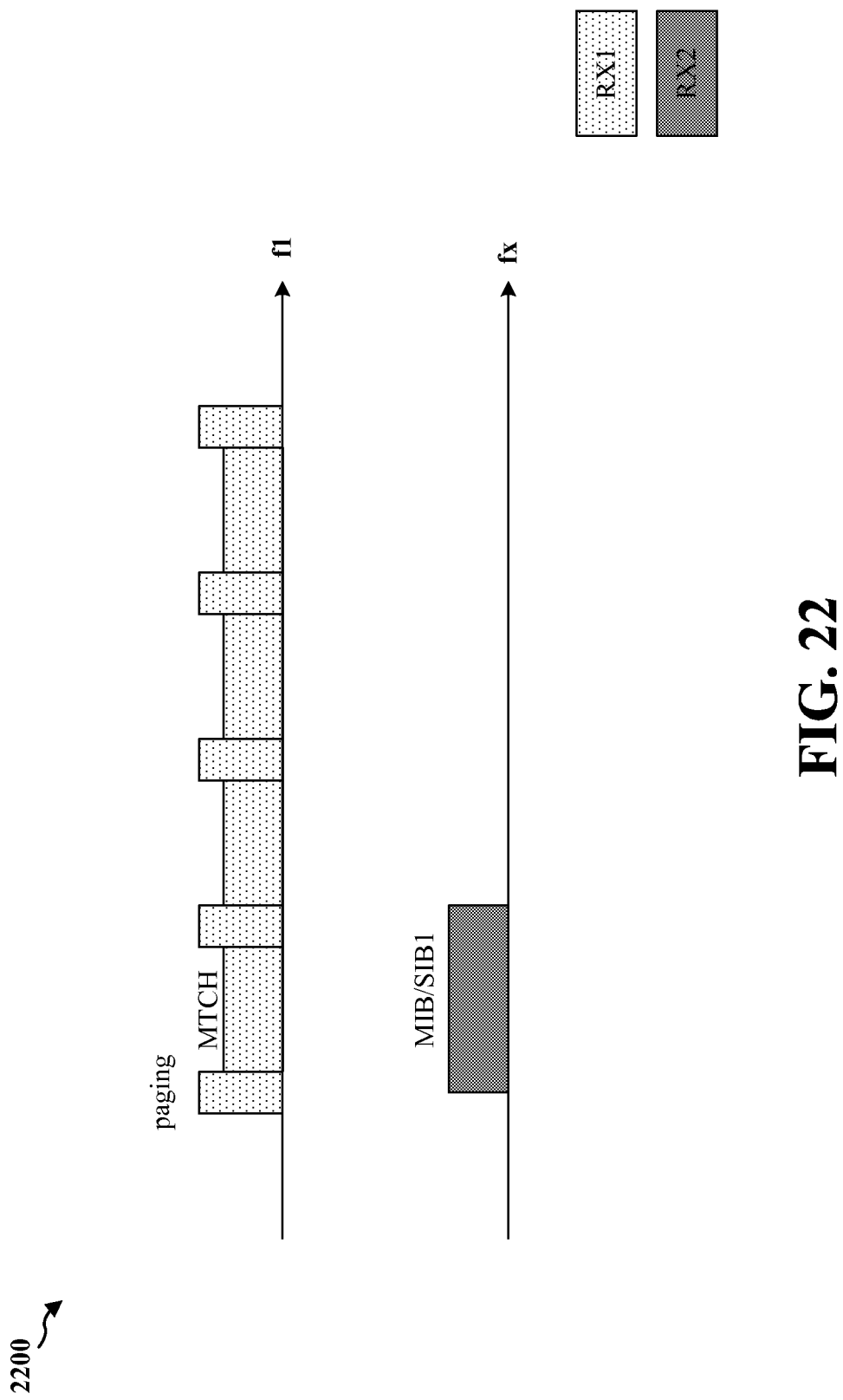
FIG. 22 is a diagram illustrating a ninth configuration of the third exemplary method.

FIG. 22 is a diagram 2200 illustrating a ninth configuration of the third exemplary method. As shown in FIG. 22, a UE in an RRC idle mode and receiving an eMBMS service, may receive paging signals on a first frequency $f_1$ through the first receive chain $RX_1$. Assume the second receive chain $RX_2$ is not configured for carrier aggregation, is camped on a visited public land mobile network (VPLMN) through which the first frequency $f_1$ is received, and that the UE determines to search for a public land mobile network (PLMN) with a higher priority than the VPLMN. The UE may determine autonomously to use the second receive chain $RX_2$ to search for a PLMN with a higher priority than the VPLMN. When searching for a PLMN, the UE may receive a MIB and SIB1 on the frequency $f_x$ through the second receive chain $RX_2$.

Figure 23:
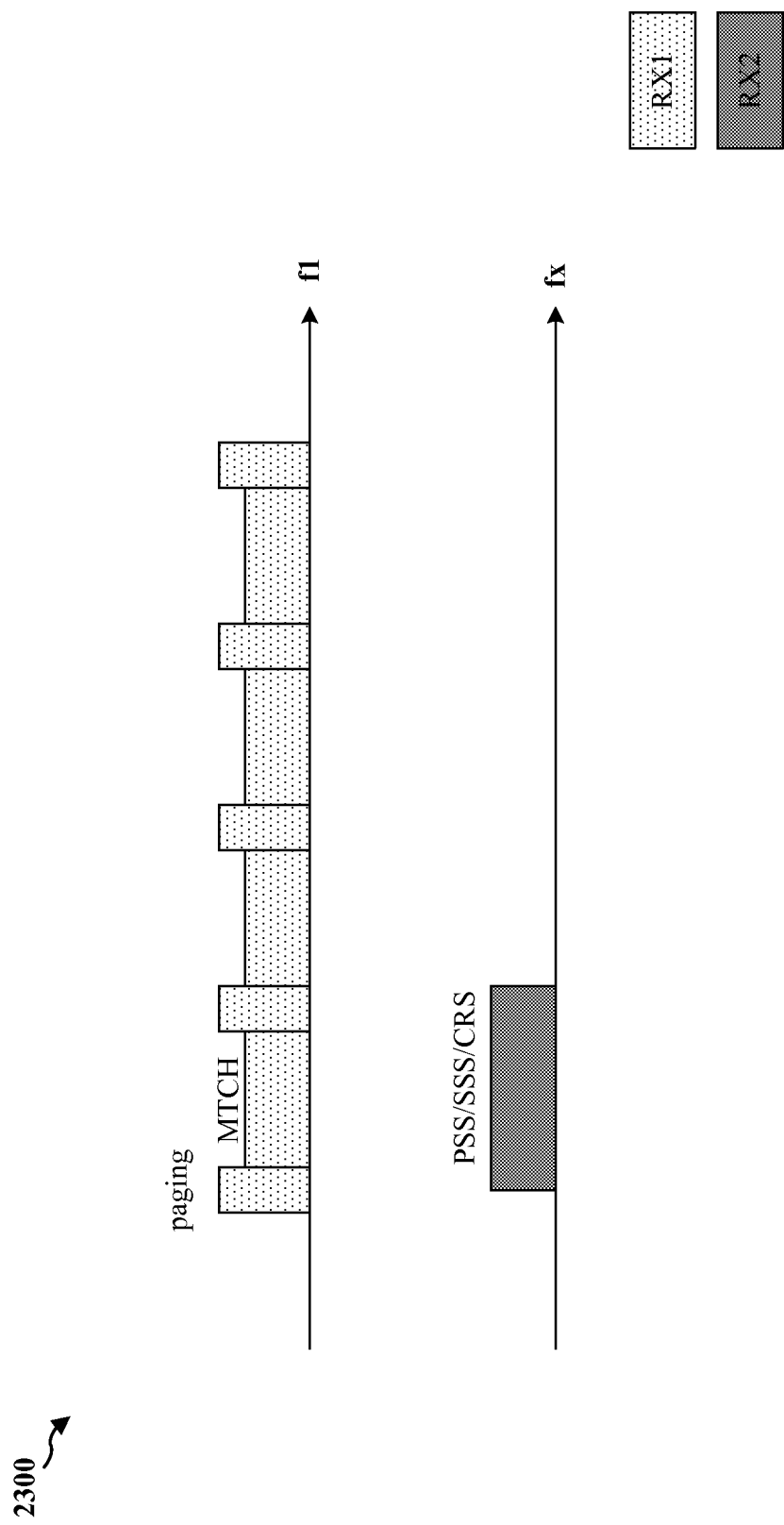
FIG. 23 is a diagram illustrating a tenth configuration of the third exemplary method.

FIG. 23 is a diagram 2300 illustrating a tenth configuration of the third exemplary method. As shown in FIG. 23, a UE in an RRC idle mode and receiving an eMBMS service, may receive paging signals on a first frequency $f_1$ through the first receive chain $RX_1$. Assume the second receive chain $RX_2$ is not configured for carrier aggregation and that the UE is requested to perform an inter-frequency measurement or an inter radio access network (inter-RAT) measurement. Upon the determination to perform the inter-frequency measurement or the inter-RAT measurement, the UE may determine autonomously to use the second receive chain $RX_2$ to receive a primary synchronization signal (PSS), a secondary synchronization signal (SSS), and CRS on the frequency $f_x$. The UE then performs an inter-frequency measurement or an inter-RAT measurement based on the CRS.

Figure 24:
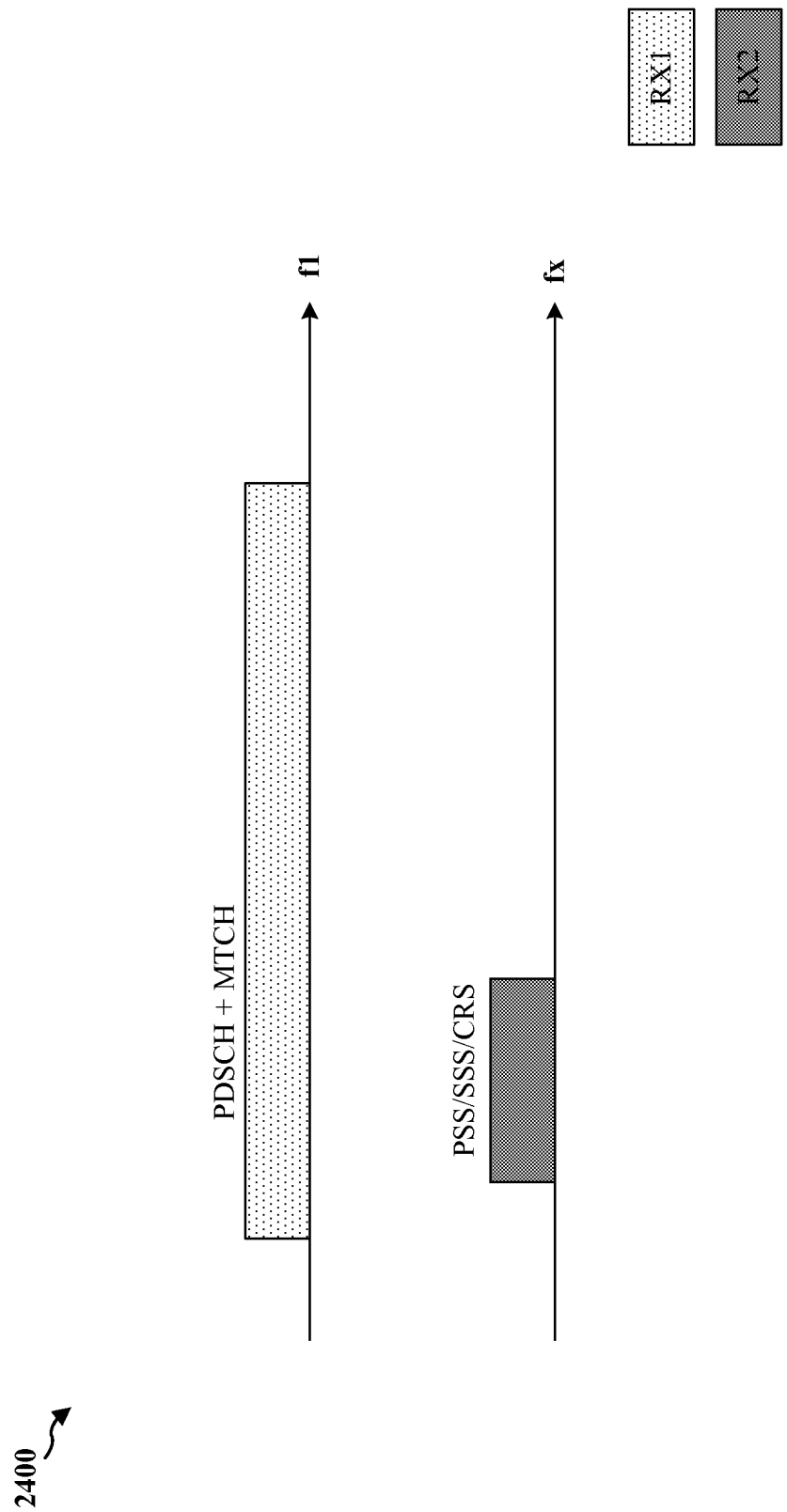
FIG. 24 is a diagram illustrating a eleventh configuration of the third exemplary method.

FIG. 24 is a diagram 2400 illustrating a eleventh configuration of the third exemplary method. Assume the second receive chain $RX_2$ is not configured for carrier aggregation and that the UE is requested to perform an inter-frequency measurement or an inter-RAT measurement. As shown in FIG. 24, the UE in an RRC connected mode and receiving an eMBMS service, may continuously receive unicast/eMBMS service on a first frequency $f_1$ through the first receive chain $RX_1$ without needing any measurement gap or connected discontinuous reception (CDRX). Upon the determination to perform the inter-frequency measurement or the inter-RAT measurement, the UE may determine autonomously to use the second receive chain $RX_2$ to receive a PSS, an SSS, and CRS on the frequency $f_x$. The UE then performs an inter-frequency measurement or an inter-RAT measurement based on the CRS.

Figure 25:
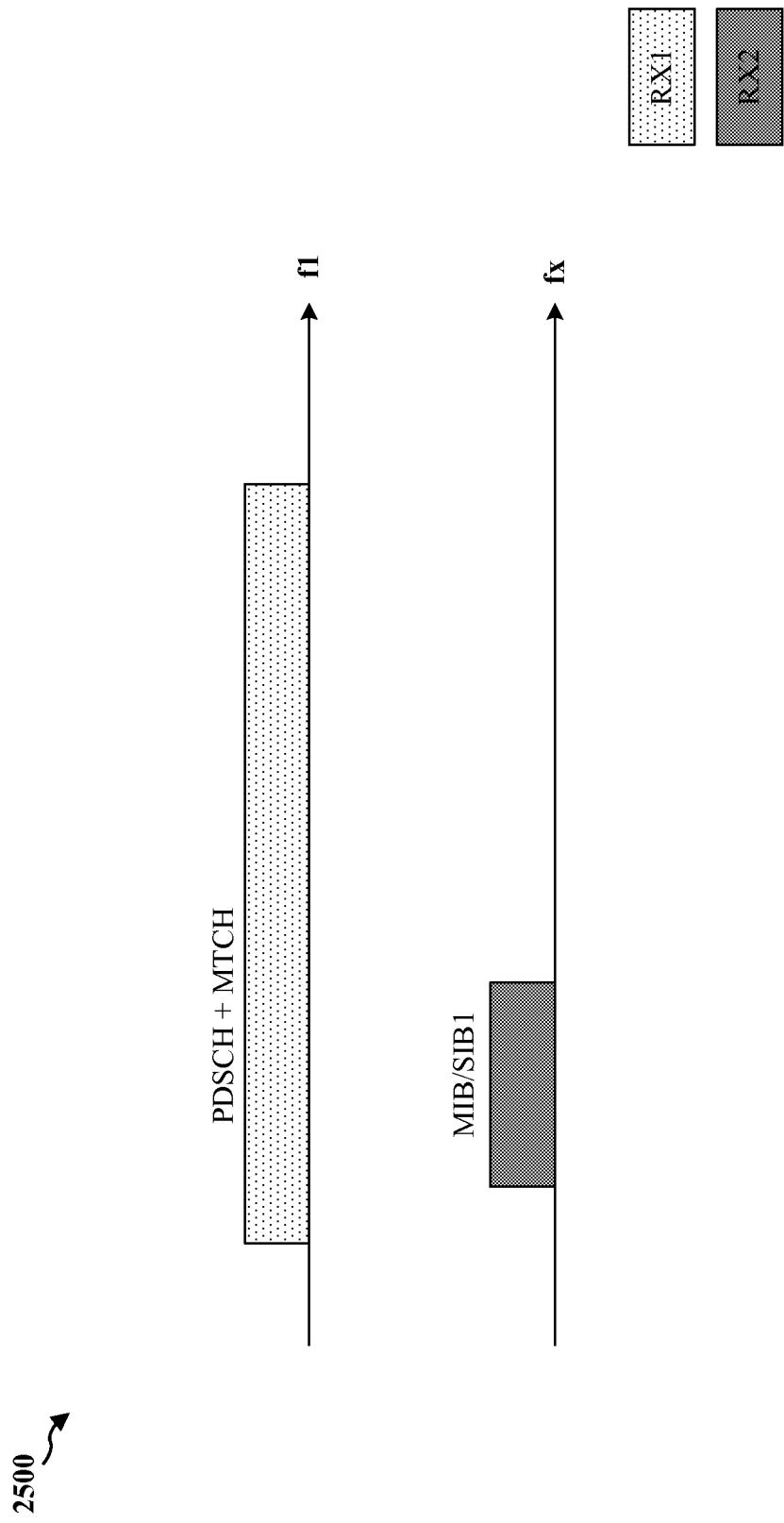
FIG. 25 is a diagram illustrating a twelfth configuration of the third exemplary method.

FIG. 25 is a diagram 2500 illustrating a twelfth configuration of the third exemplary method. Assume the second receive chain $RX_2$ is not configured for carrier aggregation and that the UE is requested by an eNB to perform an automatic neighbor relation (ANR) measurement. As shown in FIG. 24, the UE in an RRC connected mode and receiving an eMBMS service, may continuously receive unicast/eMBMS service on a first frequency $f_1$ through the first receive chain $RX_1$ without needing any measurement gap or CDRX. Upon the determination to perform the ANR measurement, the UE performs the ANR measurement on the frequency $f_x$ through the second receive chain $RX_2$ and reports a physical cell identifier (PCI) to the eNB. Based on the received PCI, the eNB may request the UE to obtain a cell global identity (CGI). The UE may then obtain a MIB and a SIB1 in order to obtain the CGI. The UE may then report the CGI to the eNB.

Figure 26:
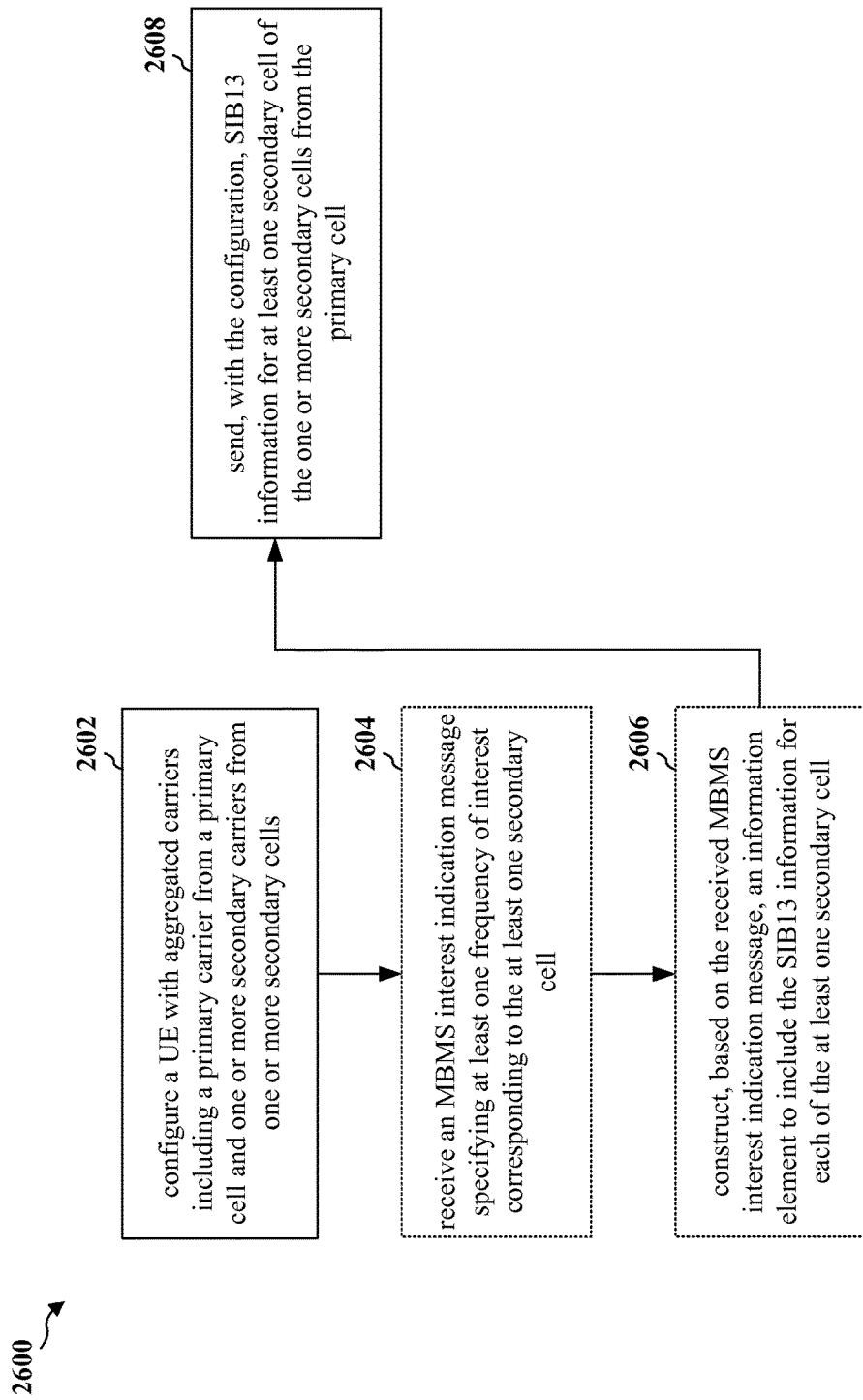
FIG. 26 is a flow chart of a first method of wireless communication.

FIG. 26 is a flow chart 2600 of a first method of wireless communication. The method may be performed by an eNB. As shown in FIG. 26, in step 2602, the eNB configures a UE with aggregated carriers including a primary carrier from a primary cell and one or more secondary carriers from one or more secondary cells. In step 2608, the eNB sends, with the configuration, SIB13 information for at least one secondary cell of the one or more secondary cells from the primary cell. For example, as described in relation to FIG. 9 and FIG. 21, an eNB may send an RRC connection reconfiguration message configuring a UE with aggregated carriers. The RRC connection reconfiguration is sent on a primary carrier from a primary cell. The RRC connection reconfiguration message may include a radio resource configuration common secondary cell information element that contains SIB13 information for a secondary cell. Accordingly, the UE receives SIB13 information for a secondary cell from a primary cell.

The SIB13 information may be sent on a PDSCH. The SIB13 information may be sent to the UE in an information element with the configuration. The information element may be a radio resource configuration common secondary cell information element. The SIB13 information may include an MBSFN area information list including information for acquiring MBMS control information associated with one or more MBSFN areas, and an MBMS notification configuration including MBMS notification related configuration parameters applicable for all MBSFN areas. The SIB13 information may be sent in an RRC connection reconfiguration message. Before step 2608, in step 2604, the eNB may receive an MBMS interest indication message specifying at least one frequency of interest corresponding to the at least one secondary cell. In step 2606, the eNB may construct, based on the received MBMS interest indication message, an information element to include the SIB13 information for each of the at least one secondary cell. The SIB13 information may be sent in the information element.

Figure 27:
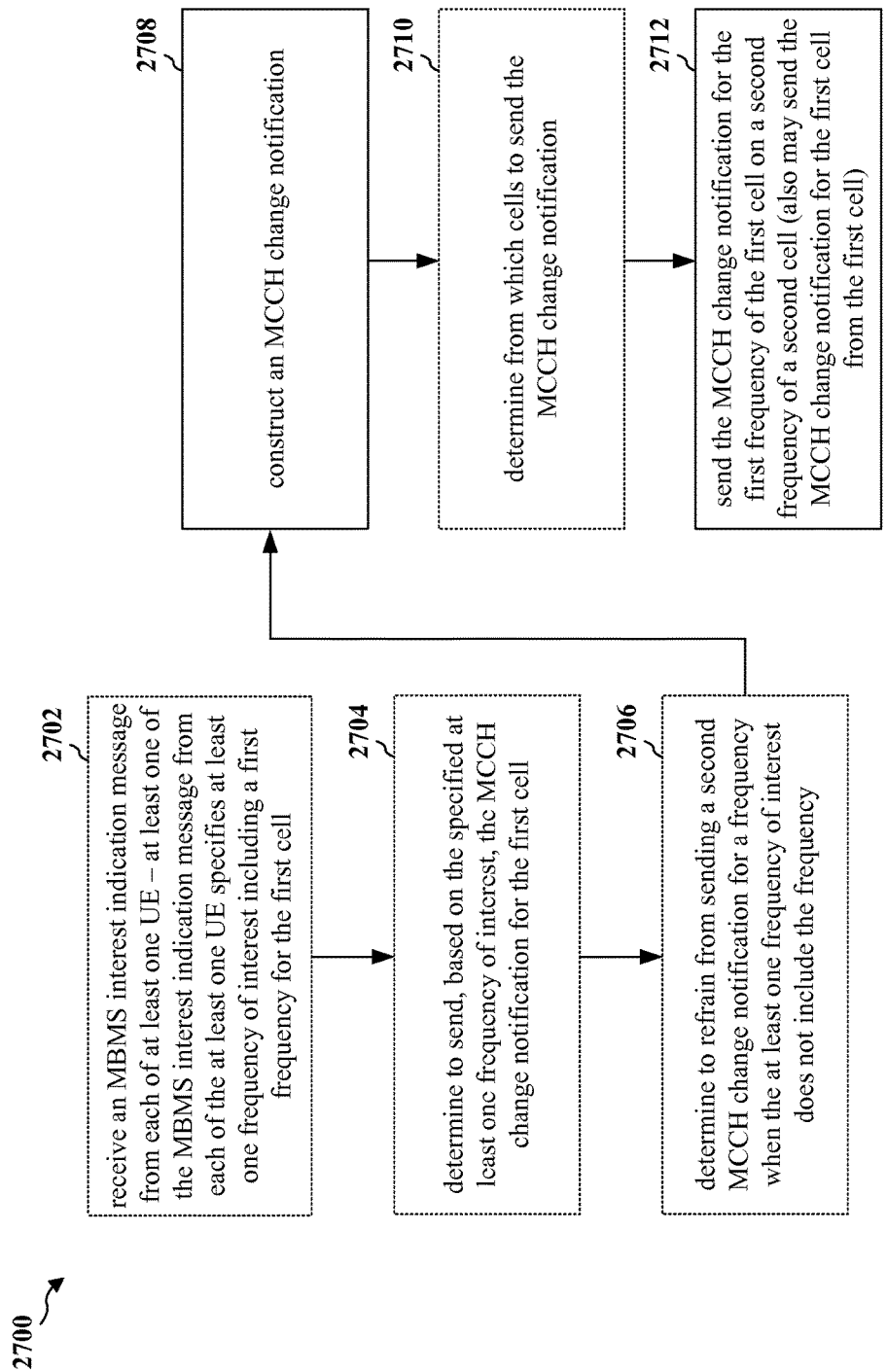
FIG. 27 is a flow chart of a second method of wireless communication.

FIG. 27 is a flow chart 2700 of a second method of wireless communication. The method may be performed by an eNB. As shown in FIG. 27, in step 2708, the eNB constructs an MCCH change notification. In step 2712, the eNB sends the MCCH change notification for a first frequency of a first cell on a second frequency of a second cell. For example, as described in relation to FIG. 11, an eNB creates a PDCCH DCI format 1C message including a notification of MCCH change. The eNB may send the PDCCH DCI format 1C message for the frequency $f_2$ of a secondary cell on the frequency $f_1$ of the primary cell.

The MCCH change notification may be sent on a PDCCH. The MCCH change notification may be sent in DCI. The DCI may be sent in a DCI format 1C message. The DCI may further include a CFI identifying a frequency index of the first cell to which the MCCH change notification applies. In step 2712, the eNB may also send the MCCH change notification for the first cell from the first cell. As described in relation to FIG. 12, the MCCH change notification for the first cell may be sent concurrently from the first cell and the second cell.

In step 2702, the eNB may receive an MBMS interest indication message from each of at least one UE. At least one of the MBMS interest indication message from each of the at least one UE specifies at least one frequency of interest including the first frequency. In step 2704, the eNB determines to send, based on the specified at least one frequency of interest, the MCCH change notification for the first cell. In step 2706, the eNB may determine to refrain from sending a second MCCH change notification for a frequency when the at least one frequency of interest does not include the frequency. In step 2710, the eNB may determine that a UE is able to receive a communication from the second cell (e.g., because the UE is configured to receive from the second cell), and determine to send the MCCH change notification from the second cell based on the determination that a UE is able to receive a communication from the second cell. Alternatively, the eNB may send the MCCH change notification on each frequency transmitted by the eNB. For example, assume the eNB transmits frequencies $f_1$, $f_2$, and $f_3$. The eNB may transmit the MCCH change notification for $f_1$ on $f_2$ and/or $f_3$. The eNB may also transmit the MCCH change notification on $f_1$. In another configuration, if the eNB determines that UEs served by the eNB are not receiving on $f_3$, the eNB may transmit the MCCH change notification for $f_1$ on $f_2$ or on both $f_1$ and $f_2$.

Figure 28:
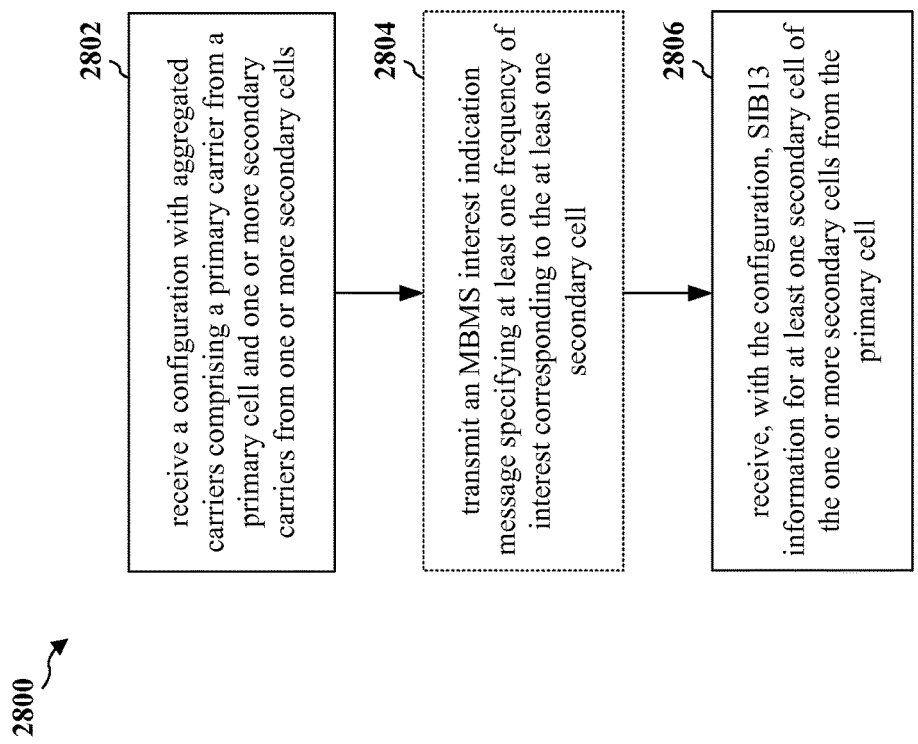
FIG. 28 is a flow chart of a third method of wireless communication.

FIG. 28 is a flow chart 2800 of a third method of wireless communication. The method may be performed by a UE. As shown in FIG. 28, in step 2802, a UE receives a configuration with aggregated carriers including a primary carrier from a primary cell and one or more secondary carriers from one or more secondary cells. In step 2806, the UE receives, with the configuration, SIB13 information for at least one secondary cell of the one or more secondary cells from the primary cell. The SIB13 information may be received on a PDSCH. The SIB13 information may be received in an information element with the configuration. The information element may be a radio resource configuration common secondary cell information element. The SIB13 information may include an MBSFN area information list including information for acquiring MBMS control information associated with one or more MBSFN areas, and an MBMS notification configuration including MBMS notification related configuration parameters applicable for all MBSFN areas. The SIB13 information may be received in an RRC connection reconfiguration message. In step 2804, the UE may transmit an MBMS interest indication message specifying at least one frequency of interest corresponding to the at least one secondary cell. In such a configuration, the SIB13 information in step 2806 may be received for the at least one secondary cell in response to the MBMS interest indication message.

Figure 29:
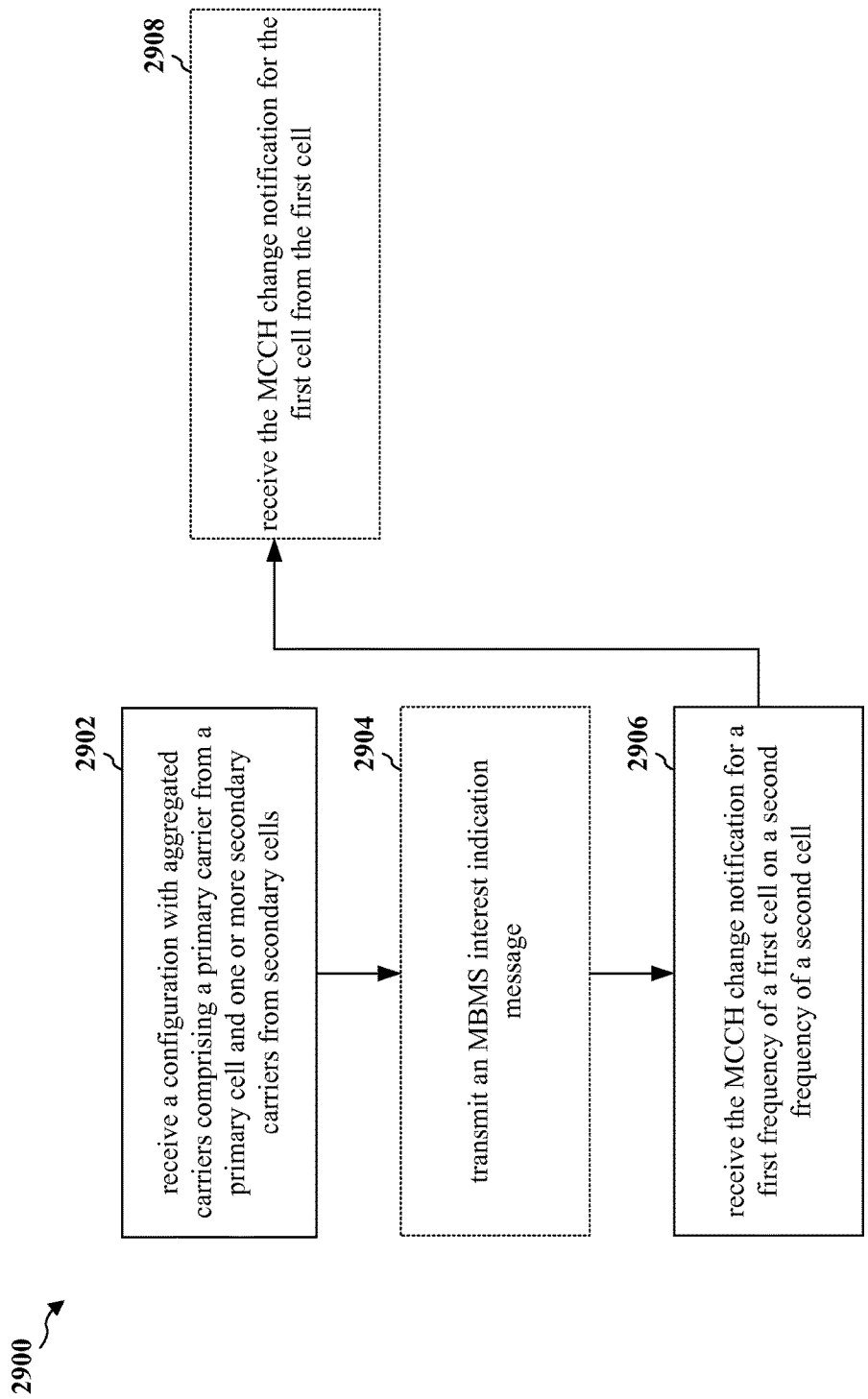
FIG. 29 is a flow chart of a fourth method of wireless communication.

FIG. 29 is a flow chart 2900 of a fourth method of wireless communication. The method may be performed by a UE. As shown in FIG. 29, in step 2902, a UE receives a configuration with aggregated carriers including a primary carrier from a primary cell and one or more secondary carriers from one or more corresponding secondary cells. In step 2906, the UE receives the MCCH change notification for a first frequency of a first cell on a second frequency of a second cell. The MCCH change notification may be received on a PDCCH. The MCCH change notification may be received in DCI. The DCI may be received in a DCI format 1C message. The DCI may further include a CFI identifying a frequency index of the first cell to which the MCCH change notification applies. In step 2908, the UE may also receive the MCCH change notification for the first cell from the first cell. The MCCH change notification for the first cell may be received concurrently from the first cell and the second cell. In step 2904, the UE may transmit an MBMS interest indication message. The MBMS interest indication message may specify at least one frequency of interest including the first frequency. In such a configuration, the MCCH change notification for the first cell in step 2906 may be received in response to the MBMS interest indication message.

Figure 30:
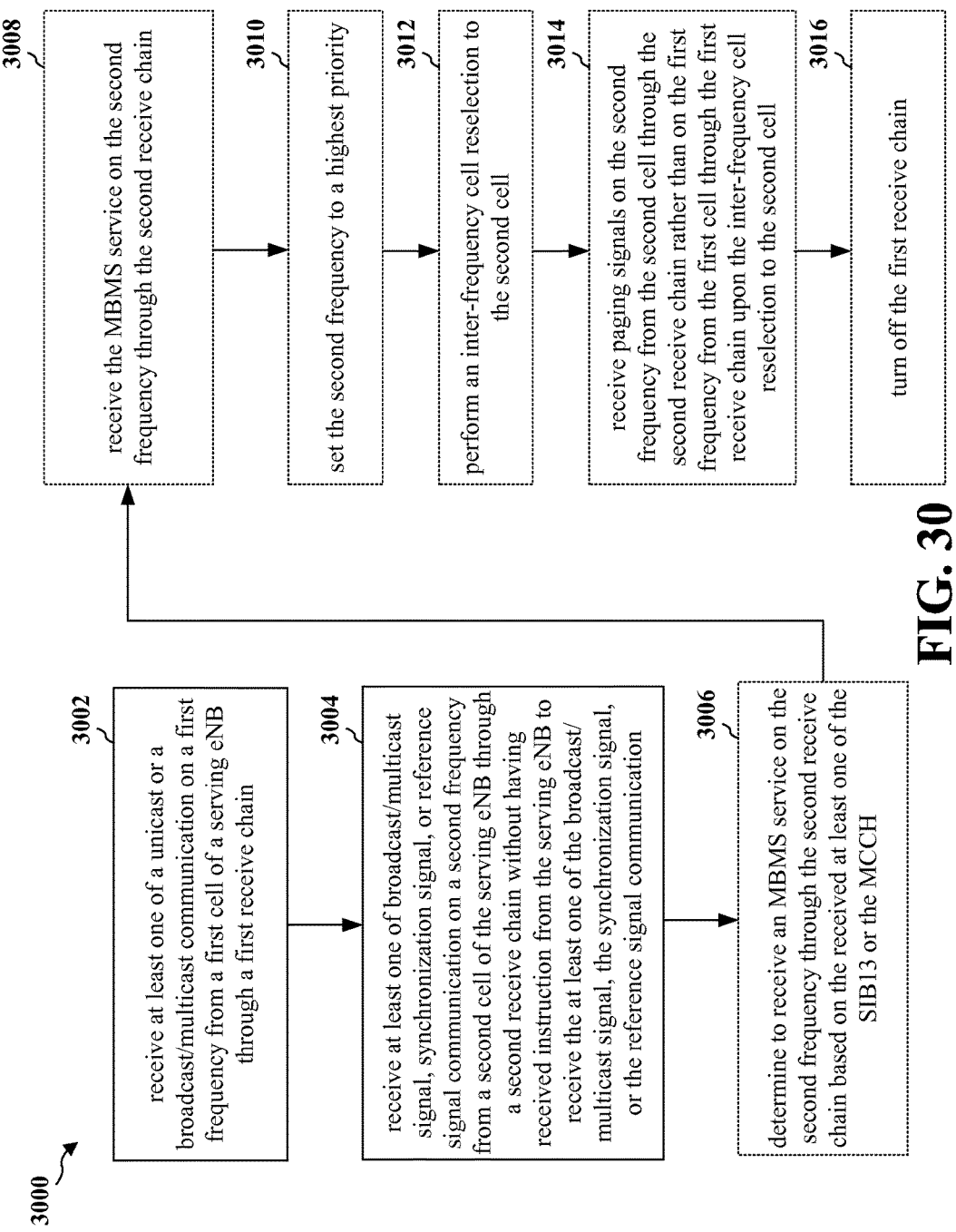
FIG. 30 is a flow chart of a fifth method of wireless communication.

FIG. 30 is a flow chart 3000 of a fifth method of wireless communication. The method may be performed by a UE. As shown in FIG. 30, in step 3002, the UE receives at least one of a unicast or a broadcast/multicast communication on a first frequency from a first cell of a serving eNB through a first receive chain. In step 3004, the UE receives at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In a first configuration, as described in relation to FIG. 14, the UE may be in an RRC idle mode, paging signals on the first frequency may be received through the first receive chain, and at least one of a SIB13 or an MCCH on the second frequency may be received through the second receive chain. In a second configuration, as described in relation to FIG. 15, the UE may be in an RRC idle mode, paging signals on the first frequency may be received through the first receive chain, and at least one of a SIB13 or an MCCH on the second frequency may be received through the second receive chain. In addition, in step 3006, the UE may determine to receive an MBMS service on the second frequency through the second receive chain based on the received at least one of the SIB13 or the MCCH. In step 3008, the UE may receive the MBMS service on the second frequency through the second receive chain prior to performing an inter-frequency cell reselection to the second cell. In step 3010, the UE may set the second frequency to a highest priority. In step 3012, the UE may perform an inter-frequency cell reselection to the second cell. In step 3014, the UE may receive paging signals on the second frequency from the second cell through the second receive chain rather than on the first frequency from the first cell through the first receive chain upon the inter-frequency cell reselection to the second cell. In step 3016, the UE may turn off the first receive chain to save power. In a third configuration, as described in relation to FIG. 16, the UE may be in an RRC idle mode, paging signals on the first frequency may be received through the first receive chain, and at least one of a SIB13 or an MCCH on the second frequency may be received through the second receive chain. In addition, the UE may receive an MBMS service on the first frequency through the first receive chain.

Figure 31:
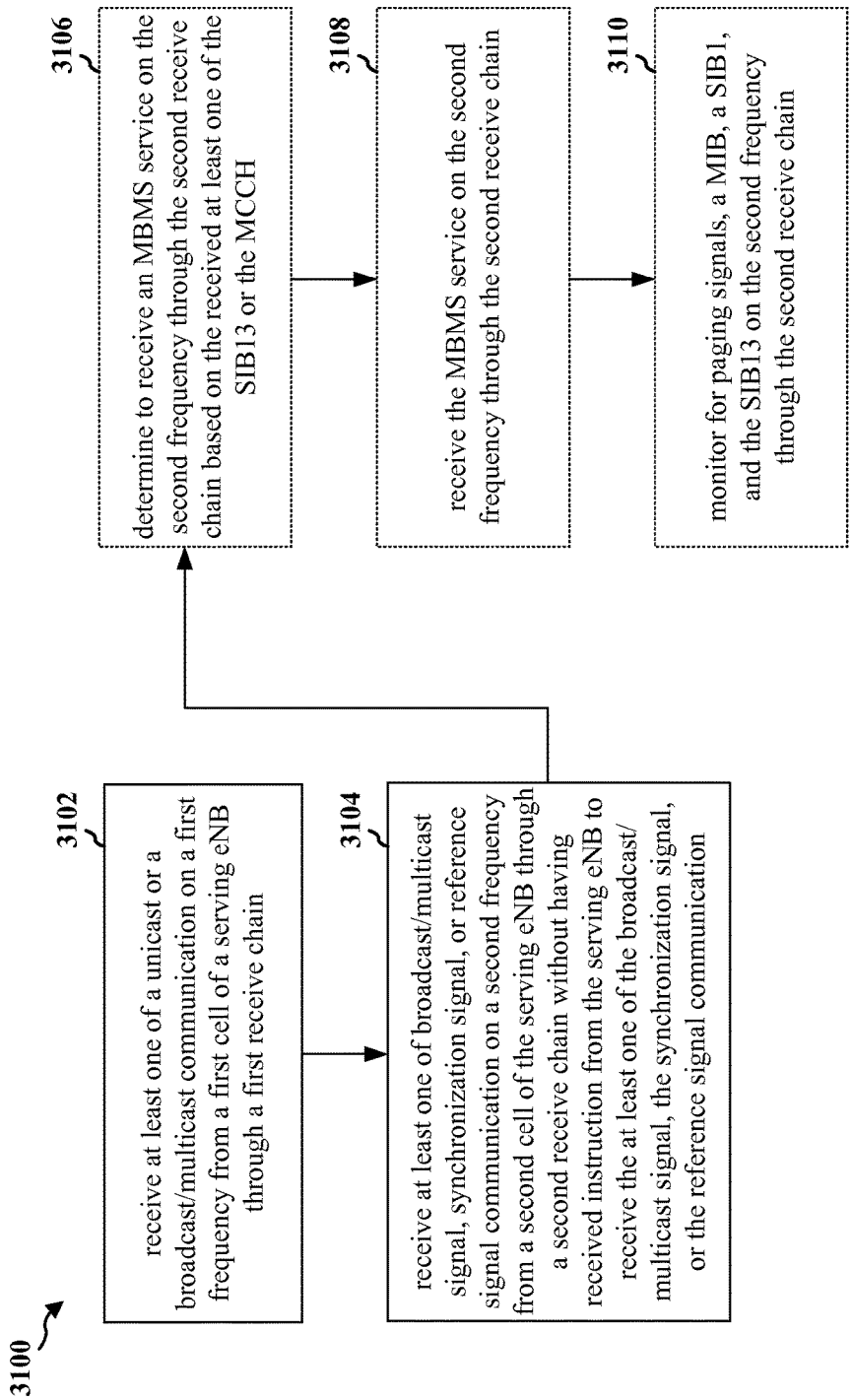
FIG. 31 is a flow chart of a sixth method of wireless communication.

FIG. 31 is a flow chart 3100 of a sixth method of wireless communication. The method may be performed by a UE. As shown in FIG. 31, in step 3102, the UE receives at least one of a unicast or a broadcast/multicast communication on a first frequency from a first cell of a serving eNB through a first receive chain. In step 3104, the UE receives at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In a fourth configuration, as described in relation to FIG. 17, the UE may be in an RRC idle mode, paging signals on the first frequency may be received through the first receive chain, and at least one of a SIB13 or an MCCH on the second frequency may be received through the second receive chain. In addition, the UE may receive an MBMS service on the first frequency through the first receive chain. Furthermore, in step 3106, the UE may determine to receive a second MBMS service on the second frequency through the second receive chain based on the received at least one of the SIB13 or the MCCH. In step 3108, the UE may receive the second MBMS service on the second frequency through the second receive chain. In step 3110, the UE may monitor for paging signals, a MIB, a SIB1, and the SIB13 on the second frequency through the second receive chain. The UE may obtain the MIB in order to obtain information for acquiring the SIB1. The UE may acquire the SIB1 in order to obtain information for acquiring the SIB13. The UE may acquire the SIB13 in order to obtain information associated with the eMBMS service in order to receive the eMBMS service through the second receive chain without disruption.

In a fifth configuration, as described in relation to FIG. 18, the UE may be in an RRC connected mode, unicast signals on the first frequency may be received through the first receive chain, and at least one of a SIB13 or an MCCH on the second frequency may be received through the second receive chain. In a sixth configuration, as described in relation to FIG. 19, the UE may be in an RRC connected mode, unicast signals on the first frequency may be received through the first receive chain, and at least one of a SIB13 or an MCCH on the second frequency may be received through the second receive chain. In addition, in step 3106, the UE may determine to receive an MBMS service on the second frequency through the second receive chain based on the received at least one of the SIB13 or the MCCH. In step 3108, the UE may receive the MBMS service on the second frequency through the second receive chain. In step 3110, the UE may monitor for paging signals, a MIB, a SIB1, and a SIB13 on the second frequency through the second receive chain. The UE may obtain the MIB in order to obtain information for acquiring the SIB1. The UE may acquire the SIB1 in order to obtain information for acquiring the SIB13. The UE may acquire the SIB13 in order to obtain information associated with the eMBMS service in order to receive the eMBMS service through the second receive chain without disruption.

Figure 32:
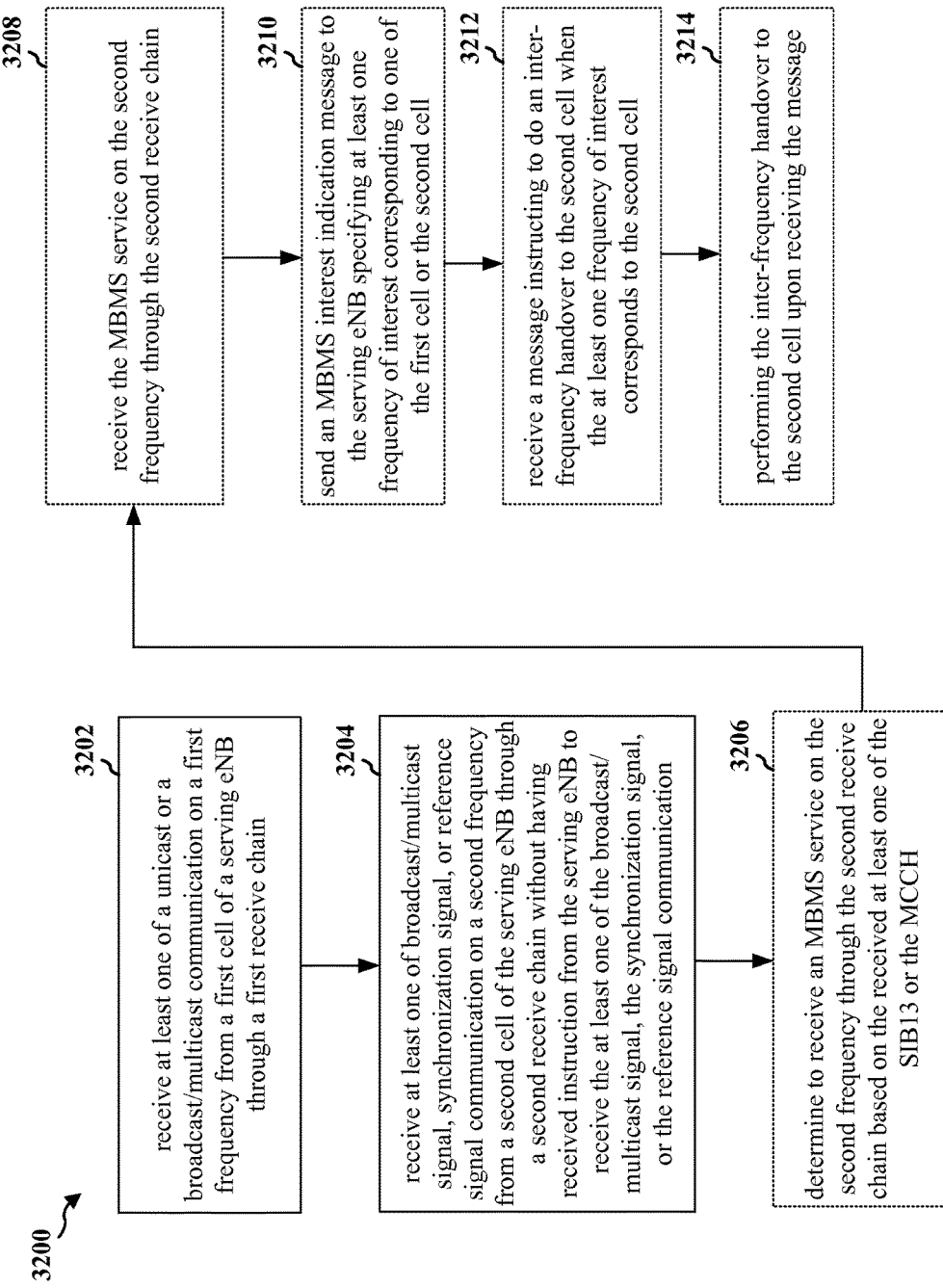
FIG. 32 is a flow chart of a seventh method of wireless communication.

FIG. 32 is a flow chart 3200 of a seventh method of wireless communication. The method may be performed by a UE. As shown in FIG. 32, in step 3202, the UE receives at least one of a unicast or a broadcast/multicast communication on a first frequency from a first cell of a serving eNB through a first receive chain. In step 3204, the UE receives at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In the sixth configuration, as described in relation to FIG. 19, the UE may be in an RRC connected mode, unicast signals on the first frequency may be received through the first receive chain, and at least one of a SIB13 or an MCCH on the second frequency may be received through the second receive chain. In addition, in step 3206, the UE may determine to receive an MBMS service on the second frequency through the second receive chain based on the received at least one of the SIB13 or the MCCH. In step 3208, the UE may receive the MBMS service on the second frequency through the second receive chain. In step 3210, the UE may send an MBMS interest indication message to the serving eNB specifying at least one frequency of interest corresponding to one of the first cell or the second cell. In step 3212, the UE may receive a message instructing the UE to do an inter-frequency handover to the second cell when the at least one frequency of interest corresponds to the second cell. In step 3214, the UE may perform the inter-frequency handover to the second cell upon receiving the message.

Figure 33:
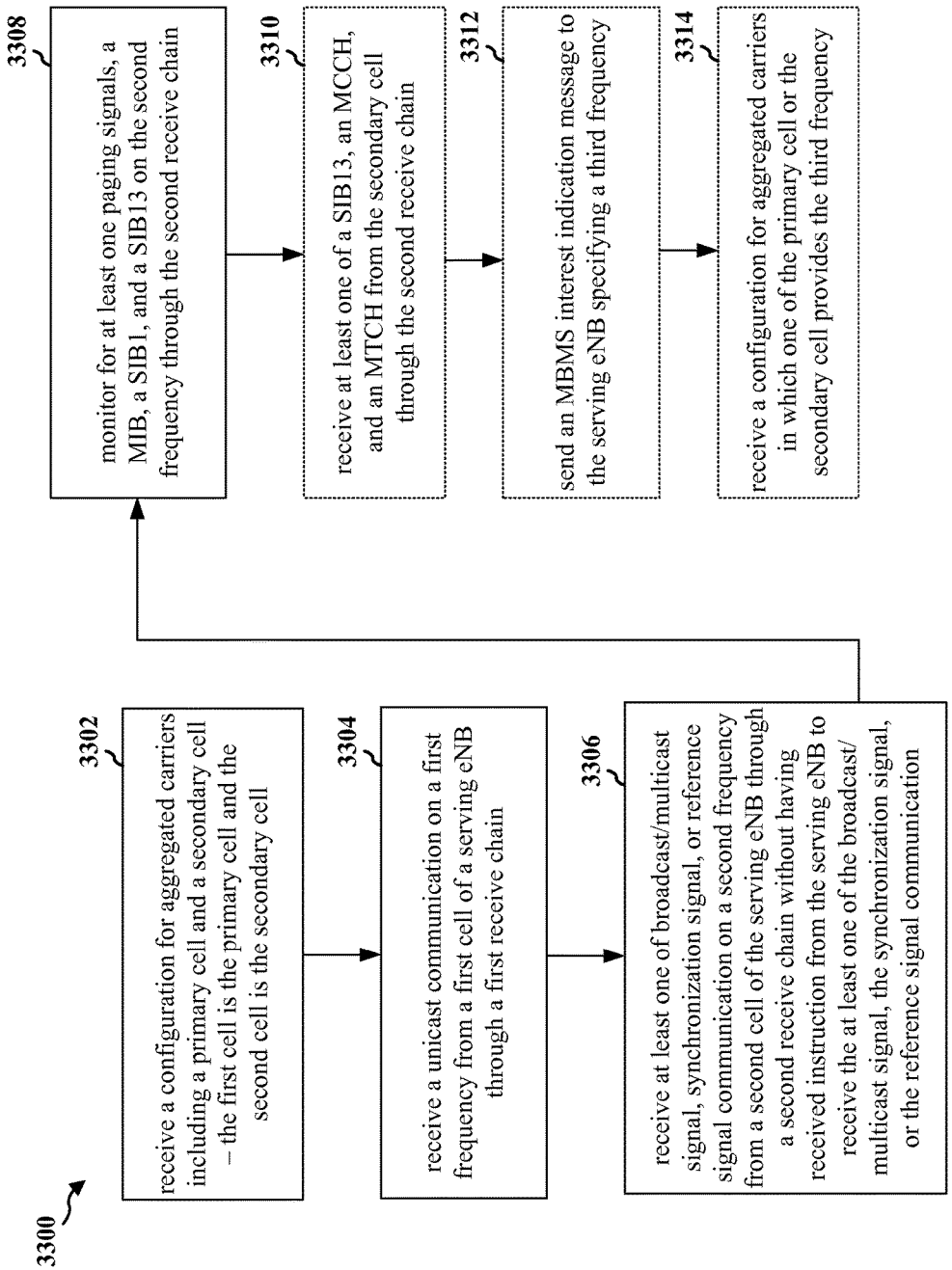
FIG. 33 is a flow chart of an eighth method of wireless communication.

FIG. 33 is a flow chart 3300 of an eighth method of wireless communication. The method may be performed by a UE. As shown in FIG. 33, in step 3304, the UE receives at least one of a unicast or a broadcast/multicast communication on a first frequency from a first cell of a serving eNB through a first receive chain. In step 3306, the UE receives at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In a seventh configuration, as described in relation to FIG. 20, in step 3302, the UE receives a configuration for aggregated carriers including a primary cell and a secondary cell. The first cell is the primary cell and the second cell is the secondary cell. In step 3304, unicast signals are received from the primary cell through the first receive chain. In step 3308, the UE monitors for at least one of paging signals, a MIB, a SIB1, and a SIB13 on the second frequency through the second receive chain. In step 3310, the UE may receive at least one of a SIB13, an MCCH, and an MTCH from the secondary cell through the second receive chain. In step 3312, the UE may send an MBMS interest indication message to the serving eNB specifying a third frequency. In step 3314, the UE may receive a configuration for aggregated carriers in which one of the primary cell or the secondary cell provides the third frequency.

Figure 34:
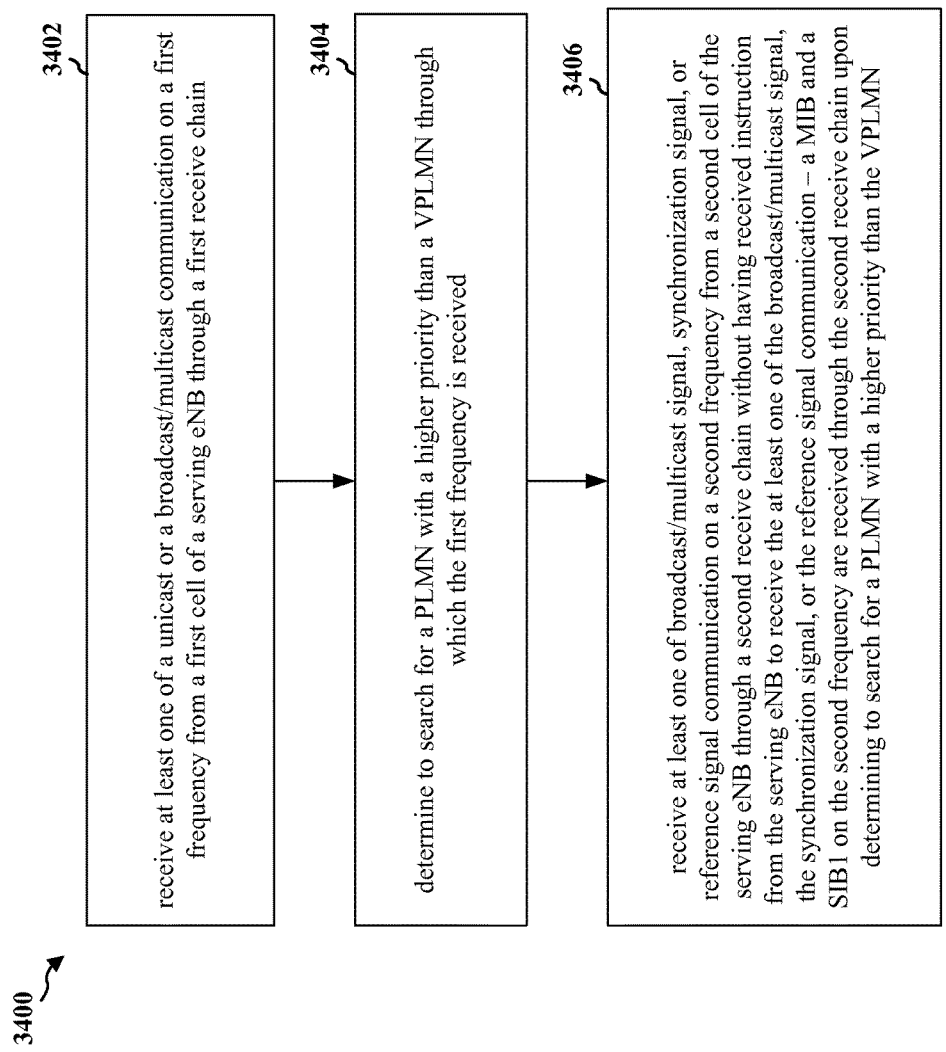
FIG. 34 is a flow chart of a ninth method of wireless communication.

FIG. 34 is a flow chart 3400 of a ninth method of wireless communication. The method may be performed by a UE. As shown in FIG. 34, in step 3402, the UE receives at least one of a unicast or a broadcast/multicast communication on a first frequency from a first cell of a serving eNB through a first receive chain. In step 3406, the UE receives at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In a ninth configuration, as described in relation to FIG. 22, in step 3402, the UE receives paging signals and an MBMS service on the first frequency through the first receive chain. In step 3404, the UE determines to search for a PLMN with a higher priority than a VPLMN through which the first frequency is received. In such a configuration, in step 3406, the UE receives a MIB and a SIB1 on the second frequency through the second receive chain upon determining to search for a PLMN with a higher priority than the VPLMN.

Figure 35:
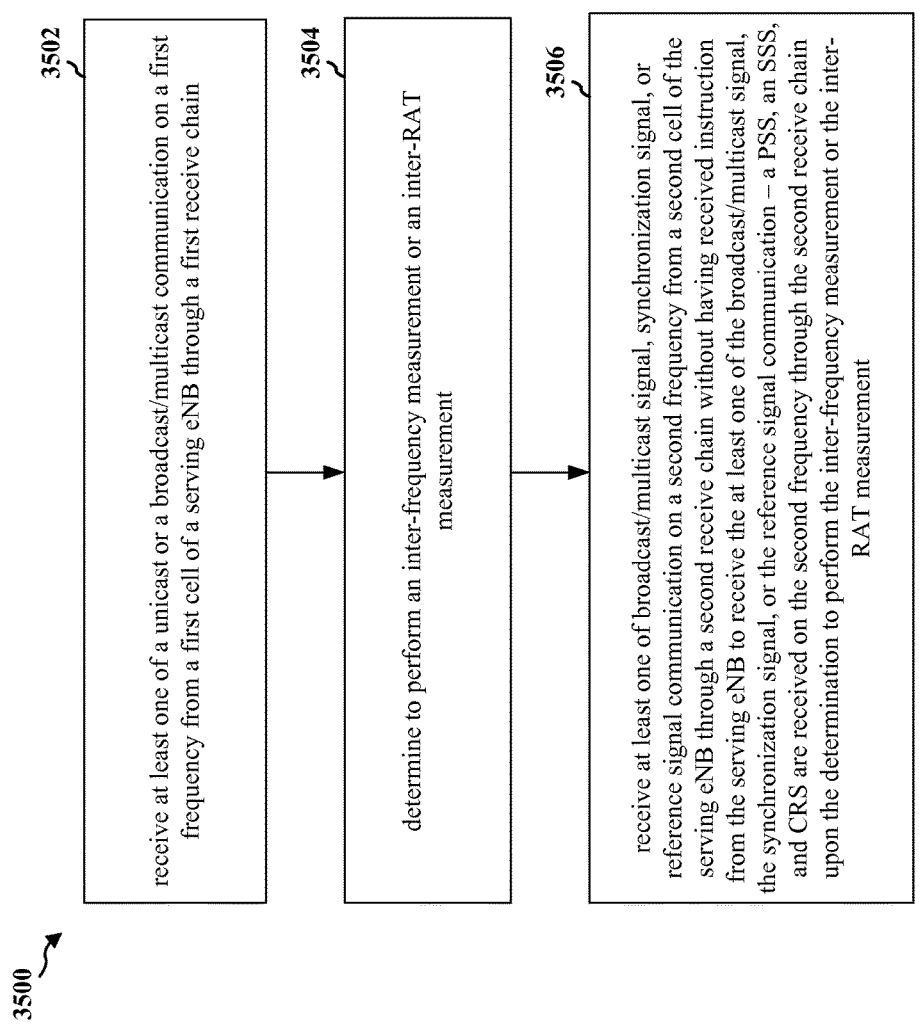
FIG. 35 is a flow chart of a tenth method of wireless communication.

FIG. 35 is a flow chart 3500 of a tenth method of wireless communication. The method may be performed by a UE. As shown in FIG. 35, in step 3502, the UE receives at least one of a unicast or a broadcast/multicast communication on a first frequency from a first cell of a serving eNB through a first receive chain. In step 3506, the UE receives at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In a tenth configuration, as described in relation to FIG. 23, in step 3502, the UE in an RRC idle mode receives paging signals and an MBMS service on the first frequency through the first receive chain. In step 3504, the UE determines to perform an inter-frequency measurement or an inter-RAT measurement. In such a configuration, in step 3506, the UE receives a PSS, an SSS, and CRS on the second frequency through the second receive chain upon the determination to perform the inter-frequency measurement or the inter-RAT measurement.

In an eleventh configuration, as described in relation to FIG. 24, in step 3502, a unicast service and an MBMS service on the first frequency are received through the first receive chain. Accordingly, the UE is in an RRC connected mode. In step 3504, the UE determines to perform an inter-frequency measurement or an inter-RAT measurement. In such a configuration, in step 3506, the UE receives a PSS, an SSS, and CRS on the second frequency through the second receive chain upon the determination to perform the inter-frequency measurement or the inter-RAT measurement.

Figure 36:
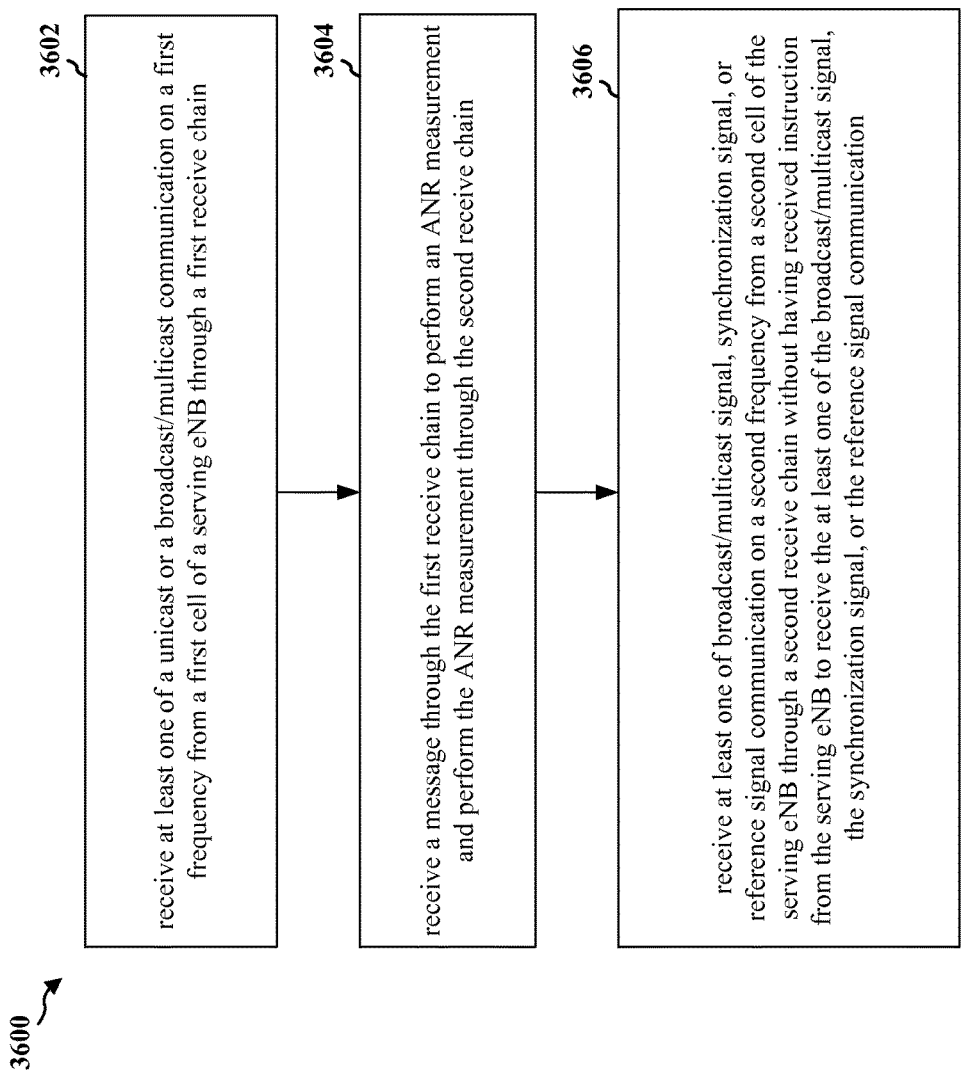
FIG. 36 is a flow chart of an eleventh method of wireless communication.

FIG. 36 is a flow chart 3600 of an eleventh method of wireless communication. The method may be performed by a UE. As shown in FIG. 36, in step 3602, the UE receives at least one of a unicast or a broadcast/multicast communication on a first frequency from a first cell of a serving eNB through a first receive chain. In step 3606, the UE receives at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In a twelfth configuration, as described in relation to FIG. 25, in step 3602, a UE receives a unicast service and an MBMS service on the first frequency through the first receive chain. In step 3604, the UE receives a message through the first receive chain to perform an ANR measurement, and performs the ANR measurement through the second receive chain.

Figure 37:
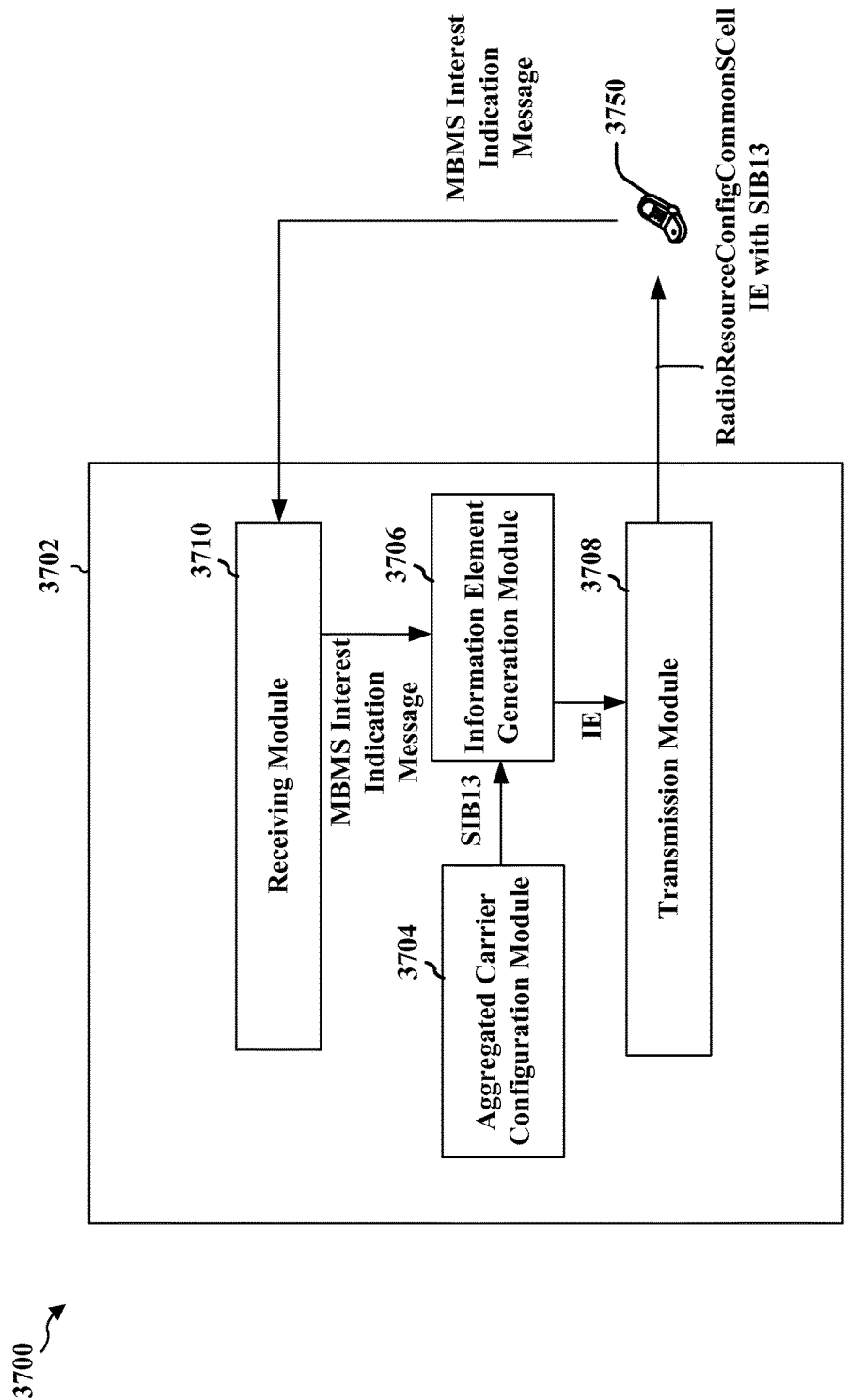
FIG. 37 is a conceptual data flow diagram illustrating the data flow between different modules/means/components in an exemplary apparatus.

FIG. 37 is a conceptual data flow diagram 3700 illustrating the data flow between different modules/means/components in an exemplary apparatus 3702. The apparatus includes an aggregated carrier configuration module 3704 that is configured to communicate with an information element generation module 3706 in order to configure a UE with aggregated carriers including a primary carrier from a primary cell and one or more secondary carriers from one or more secondary cells. The apparatus 3702 further includes a transmission module 3708 that is configured to communicate with the information element generation module 3706 to obtain the information element (IE) and to send, with the configuration, SIB13 information for at least one secondary cell of the one or more secondary cells from the primary cell. The transmission module 3708 may be configured to send the SIB13 information on a PDSCH. The transmission module 3708 may be configured to send the SIB13 information to the UE 3750 in an information element with the configuration. The information element may be a radio resource configuration common secondary cell information element. The SIB13 information may include an MBSFN area information list including information for acquiring MBMS control information associated with one or more MBSFN areas, and an MBMS notification configuration including MBMS notification related configuration parameters applicable for all MBSFN areas. The transmission module 3708 may be configured to send the SIB13 information in an RRC connection reconfiguration message. The apparatus 3702 may further include a receiving module 3710 that is configured to receive an MBMS interest indication message specifying at least one frequency of interest corresponding to the at least one secondary cell. The information element generation module 3706 is configured to receive the MBMS interest indication message from the receiving module 3710 and to construct, based on the received MBMS interest indication message, an information element to include the SIB13 information for each of the at least one secondary cell of interest. The transmission module 3708 is configured to send the SIB13 information in the information element.

The apparatus may include additional modules that perform each of the steps of the algorithm in the aforementioned flow chart of FIG. 26. As such, each step in the aforementioned flow chart of FIG. 26 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 38:
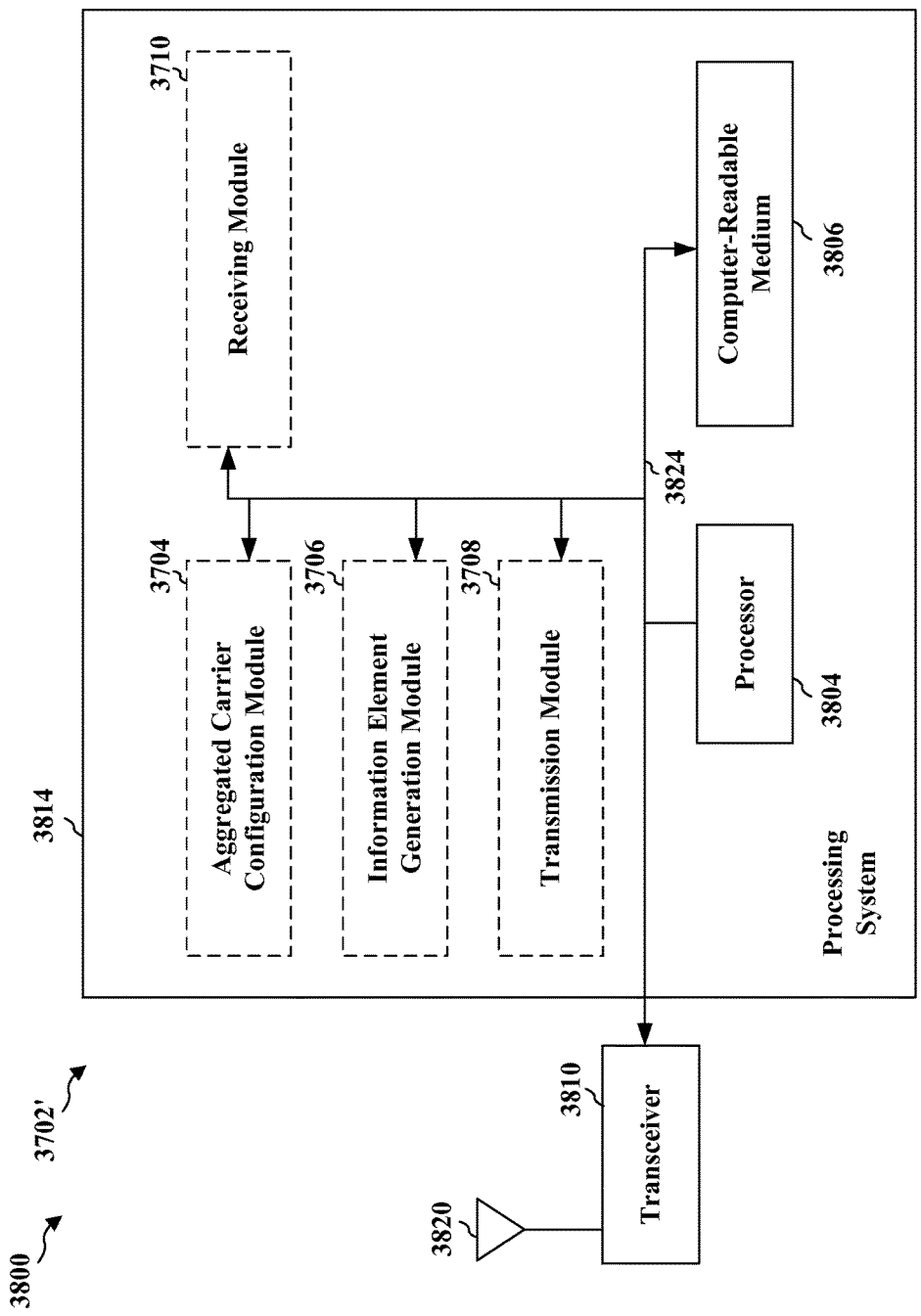
FIG. 38 is a diagram illustrating an example of a hardware implementation for an apparatus employing a processing system.

FIG. 38 is a diagram 3800 illustrating an example of a hardware implementation for an apparatus 3702' employing a processing system 3814. The processing system 3814 may be implemented with a bus architecture, represented generally by the bus 3824. The bus 3824 may include any number of interconnecting buses and bridges depending on the specific application of the processing system 3814 and the overall design constraints. The bus 3824 links together various circuits including one or more processors and/or hardware modules, represented by the processor 3804, the modules 3704, 3706, 3708, 3710, and the computer-readable medium 3806. The bus 3824 may also link various other circuits such as timing sources, peripherals, voltage regulators, and power management circuits, which are well known in the art, and therefore, will not be described any further.

The processing system 3814 may be coupled to a transceiver 3810. The transceiver 3810 is coupled to one or more antennas 3820. The transceiver 3810 provides a means for communicating with various other apparatus over a transmission medium. The processing system 3814 includes a processor 3804 coupled to a computer-readable medium 3806. The processor 3804 is responsible for general processing, including the execution of software stored on the computer-readable medium 3806. The software, when executed by the processor 3804, causes the processing system 3814 to perform the various functions described supra for any particular apparatus. The computer-readable medium 3806 may also be used for storing data that is manipulated by the processor 3804 when executing software. The processing system further includes at least one of the modules 3704, 3706, 3708, and 3710. The modules may be software modules running in the processor 3804, resident/stored in the computer readable medium 3806, one or more hardware modules coupled to the processor 3804, or some combination thereof. The processing system 3814 may be a component of the eNB 610 and may include the memory 676 and/or at least one of the TX processor 616, the RX processor 670, and the controller/processor 675.

In one configuration, the apparatus 3702/3702' for wireless communication includes means for configuring a UE with aggregated carriers including a primary carrier from a primary cell and one or more secondary carriers from one or more secondary cells. The apparatus further includes means for sending, with the configuration, SIB13 information for at least one secondary cell of the one or more secondary cells from the primary cell. The apparatus may further include means for receiving an MBMS interest indication message specifying at least one frequency of interest corresponding to the at least one secondary cell, and means for constructing, based on the received MBMS interest indication message, an information element to include the SIB13 information for each of the at least one secondary cell. The SIB13 information is sent in the information element.

The aforementioned means may be one or more of the aforementioned modules of the apparatus 3702 and/or the processing system 3814 of the apparatus 3702' configured to perform the functions recited by the aforementioned means. As described supra, the processing system 3814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 39:
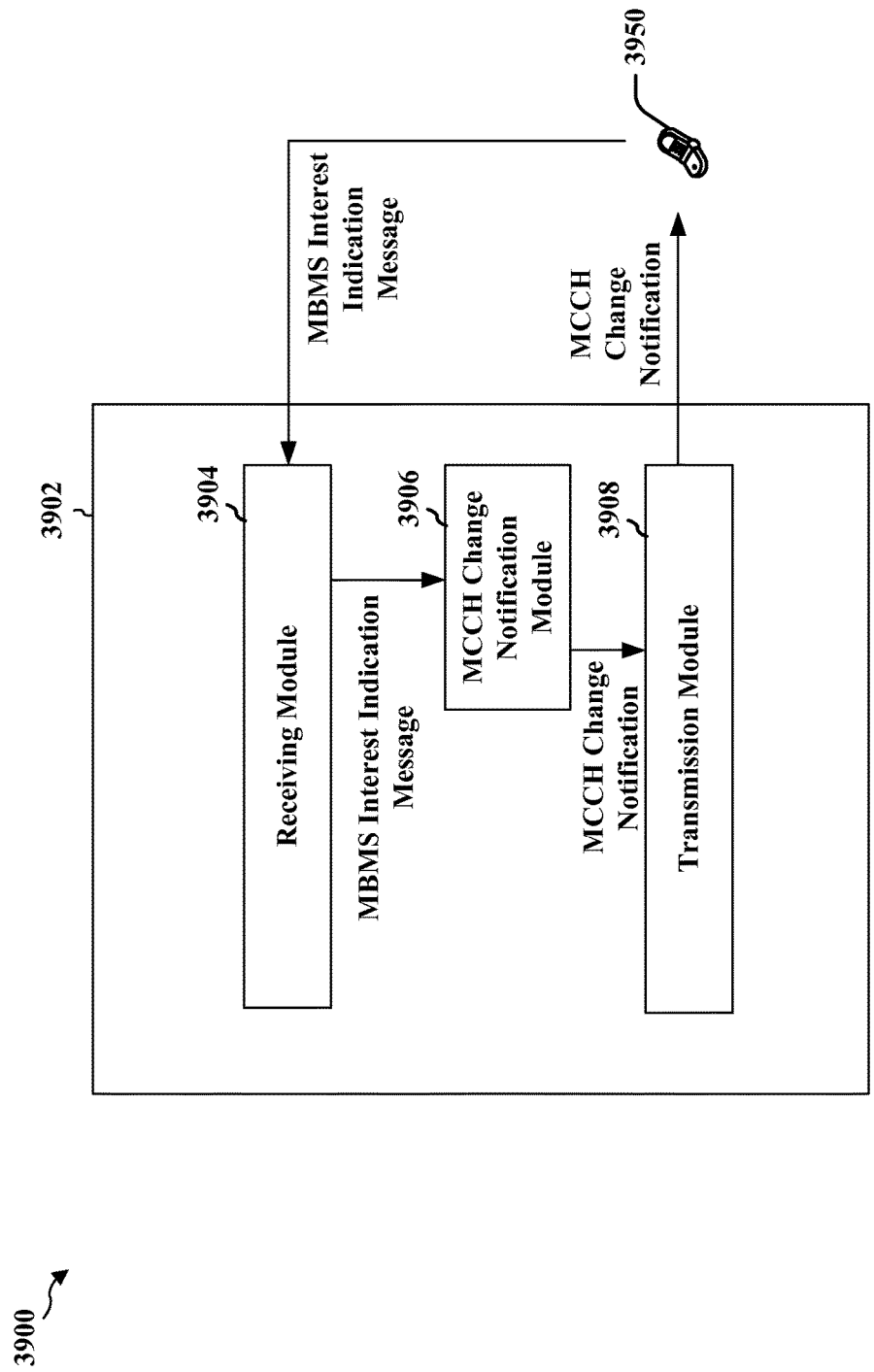
FIG. 39 is a conceptual data flow diagram illustrating the data flow between different modules/means/components in an exemplary apparatus.

FIG. 39 is a conceptual data flow diagram 3900 illustrating the data flow between different modules/means/components in an exemplary apparatus 3902. The apparatus 3902 includes an MCCH change notification module 3906 that is configured to construct an MCCH change notification. The apparatus 3902 further includes a transmission module 3908 that is configured to receive the MCCH change notification from the MCCH change notification module 3906, and to send the MCCH change notification to the UE 3950 for a first frequency of a first cell on a second frequency of a second cell. The transmission module 3908 may be configured to send the MCCH change notification on a PDCCH. The transmission module 3908 may be configured to send the MCCH change notification in DCI. The transmission module 3908 may be configured to send the DCI in a DCI format 1C message. The MCCH change notification module 3906 may be configured to include within the DCI a carrier frequency index identifying a frequency index of the first cell to which the MCCH change notification applies. The transmission module 3908 may be configured to send the MCCH change notification for the first cell from the first cell. The transmission module 3908 may be configured to send the MCCH change notification for the first cell concurrently from the first cell and the second cell. The apparatus 3902 may further include a receiving module 3904 that is configured to receive an MBMS interest indication message from each of at least one UE. The at least one of the MBMS interest indication message from each of the at least one UE may specify at least one frequency of interest including the first frequency. The receiving module 3904 is configured to provide the MBMS interest indication message to the MCCH change notification module 3906, which is configured to communicate with the transmission module 3908 in order to determine to send, based on the specified at least one frequency of interest, the MCCH change notification for the first cell. The MCCH change notification module 3906 may be configured to determine to refrain from sending a second MCCH change notification for a frequency when the at least one frequency of interest does not include the frequency. The MCCH change notification module 3906 may be configured to determine that a UE is able to receive a communication from the second cell, and to determine to send the MCCH change notification from the second cell based on the determination that a UE is able to receive a communication from the second cell. The MCCH change notification module 3906 may be configured to communicate with the transmission module 3908 in order to send the MCCH change notification on each frequency transmitted by the eNB.

The apparatus may include additional modules that perform each of the steps of the algorithm in the aforementioned flow chart of FIG. 27. As such, each step in the aforementioned flow chart of FIG. 27 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 40:
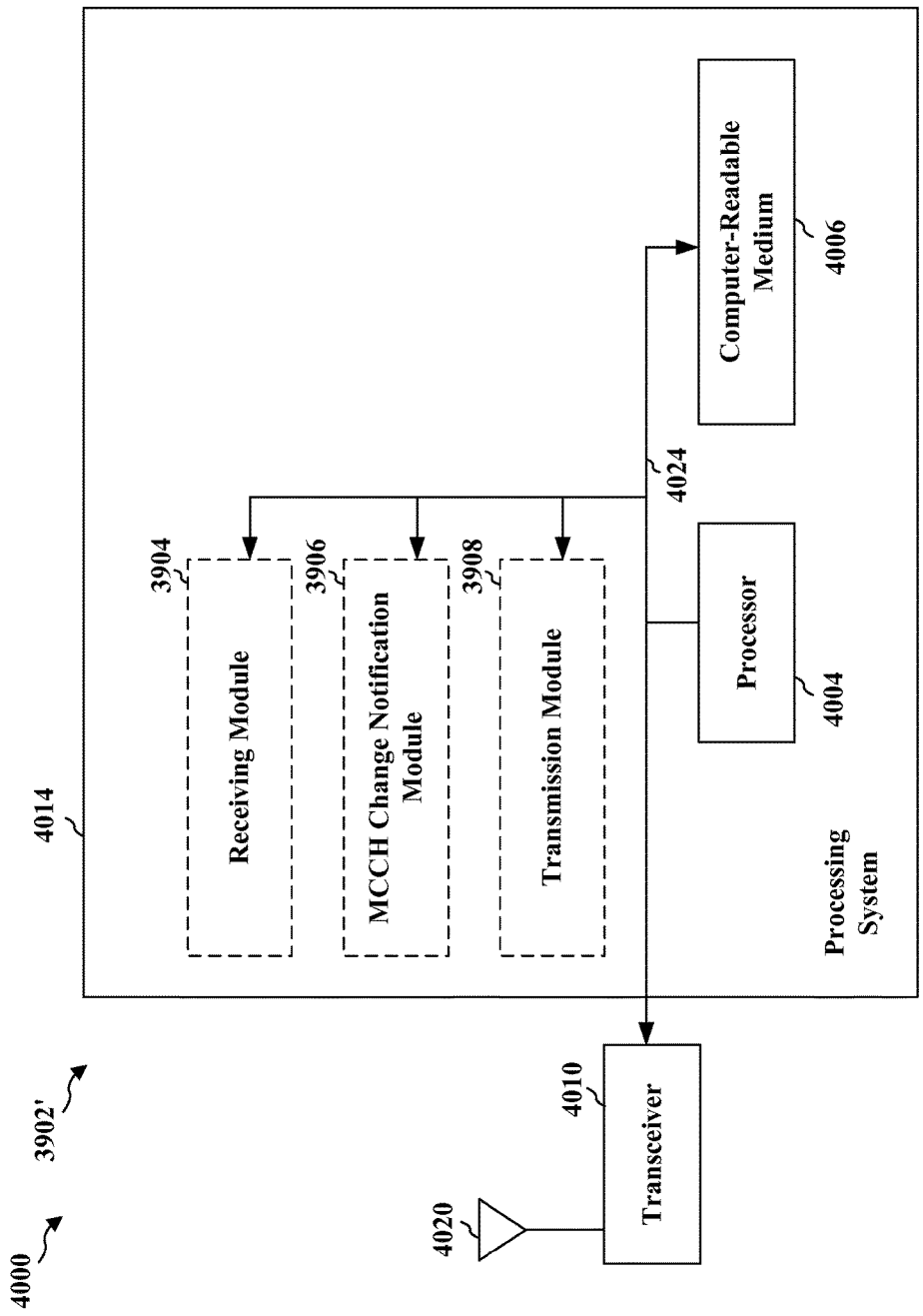
FIG. 40 is a diagram illustrating an example of a hardware implementation for an apparatus employing a processing system.

FIG. 40 is a diagram 4000 illustrating an example of a hardware implementation for an apparatus 3902' employing a processing system 4014. The processing system 4014 may be implemented with a bus architecture, represented generally by the bus 4024. The bus 4024 may include any number of interconnecting buses and bridges depending on the specific application of the processing system 4014 and the overall design constraints. The bus 4024 links together various circuits including one or more processors and/or hardware modules, represented by the processor 4004, the modules 3904, 3906, 3908, and the computer-readable medium 4006. The bus 4024 may also link various other circuits such as timing sources, peripherals, voltage regulators, and power management circuits, which are well known in the art, and therefore, will not be described any further.

The processing system 4014 may be coupled to a transceiver 4010. The transceiver 4010 is coupled to one or more antennas 4020. The transceiver 4010 provides a means for communicating with various other apparatus over a transmission medium. The processing system 4014 includes a processor 4004 coupled to a computer-readable medium 4006. The processor 4004 is responsible for general processing, including the execution of software stored on the computer-readable medium 4006. The software, when executed by the processor 4004, causes the processing system 4014 to perform the various functions described supra for any particular apparatus. The computer-readable medium 4006 may also be used for storing data that is manipulated by the processor 4004 when executing software. The processing system further includes at least one of the modules 3904, 3906, and 3908. The modules may be software modules running in the processor 4004, resident/ stored in the computer readable medium 4006, one or more hardware modules coupled to the processor 4004, or some combination thereof. The processing system 4014 may be a component of the eNB 610 and may include the memory 676 and/or at least one of the TX processor 616, the RX processor 670, and the controller/processor 675.

In one configuration, the apparatus 3902/3902' for wireless communication includes means for constructing an MCCH change notification, and means for sending the MCCH change notification for a first frequency of a first cell on a second frequency of a second cell. The apparatus may further include means for sending the MCCH change notification for the first cell from the first cell. The apparatus may further include means for receiving an MBMS interest indication message from each of at least one UE. The at least one of the MBMS interest indication message from each of the at least one UE may specify at least one frequency of interest including the first frequency. The apparatus may further include means for determining to send, based on the specified at least one frequency of interest, the MCCH change notification for the first cell. The apparatus may further include means for determining to refrain from sending a second MCCH change notification for a frequency when the at least one frequency of interest does not include the frequency. The apparatus may further include means for determining that a UE is able to receive a communication from the second cell, and means for determining to send the MCCH change notification from the second cell based on the determination that a UE is able to receive a communication from the second cell. The apparatus may further include means for sending the MCCH change notification on each frequency transmitted by the eNB.

The aforementioned means may be one or more of the aforementioned modules of the apparatus 3902 and/or the processing system 4014 of the apparatus 3902' configured to perform the functions recited by the aforementioned means. As described supra, the processing system 4014 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 41:
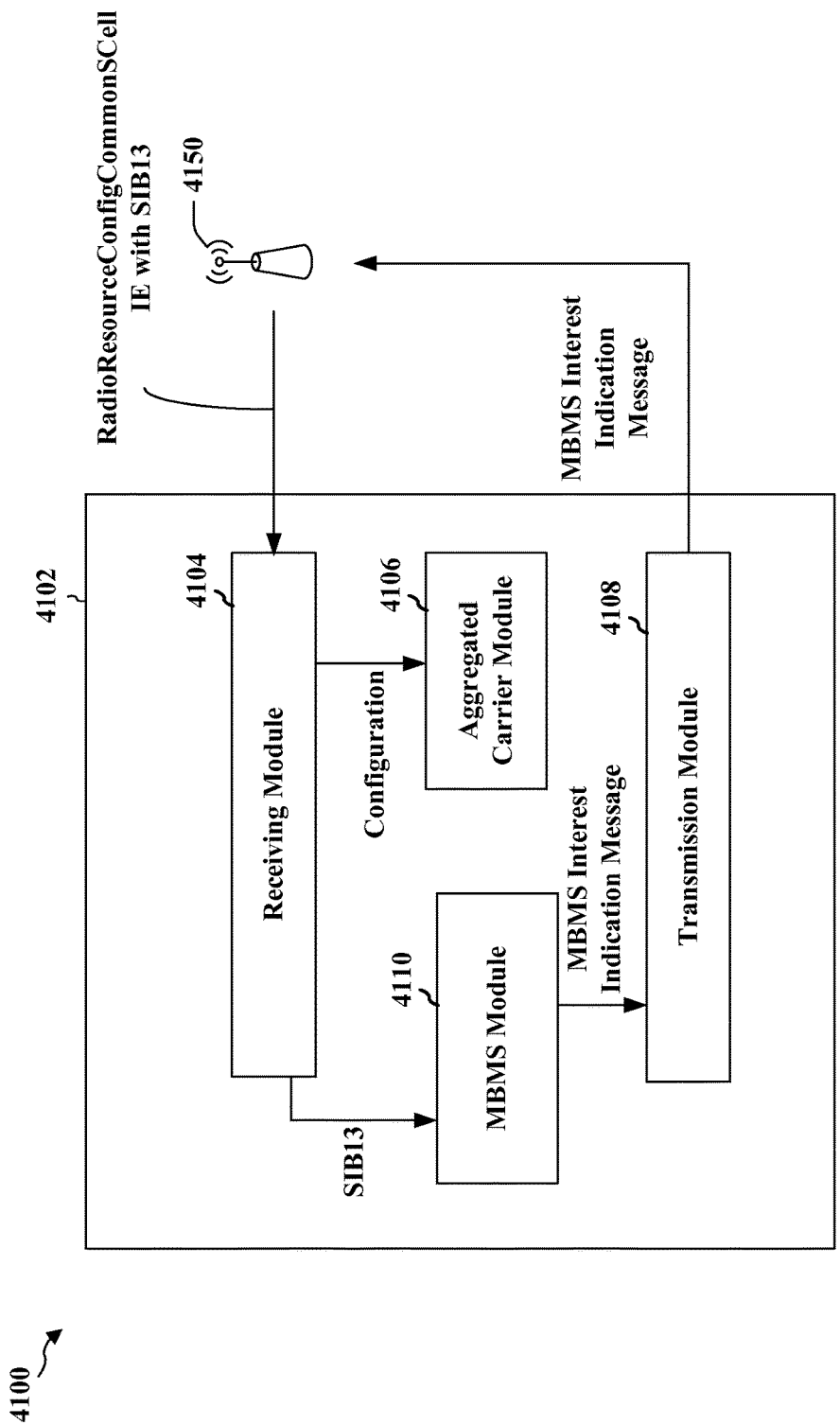
FIG. 41 is a conceptual data flow diagram illustrating the data flow between different modules/means/components in an exemplary apparatus.

FIG. 41 is a conceptual data flow diagram 4100 illustrating the data flow between different modules/means/components in an exemplary apparatus 4102. The apparatus 4102 includes a receiving module 4104 that is configured to receive, from the eNB 4150, a configuration with aggregated carriers including a primary carrier from a primary cell and one or more secondary carriers from one or more secondary cells. The receiving module 4104 is configured to provide the received configuration to an aggregated carrier module 4106. The receiving module 4104 is also configured to receive, with the configuration, SIB13 information for at least one secondary cell of the one or more secondary cells from the primary cell. The receiving module 4104 is configured to provide the SIB13 information to the MBMS module 4110. The receiving module 4104 may be configured to receive the SIB13 information in a PDSCH. The receiving module 4104 may be configured to receive the SIB13 information in an information element with the configuration. The information element may be a radio resource configuration common secondary cell information element. The SIB13 information may include an MBSFN area information list including information for acquiring MBMS control information associated with one or more MBSFN areas, and an MBMS notification configuration including MBMS notification related configuration parameters applicable for all MBSFN areas. The receiving module 4104 may be configured to receive the SIB13 information in an RRC connection reconfiguration message. The apparatus 4102 may further include a transmission module 4108 that is configured to transmit an MBMS interest indication message specifying at least one frequency of interest corresponding to the at least one secondary cell. The SIB13 information may be received for the at least one secondary cell in response to the MBMS interest indication message.

The apparatus may include additional modules that perform each of the steps of the algorithm in the aforementioned flow chart of FIG. 28. As such, each step in the aforementioned flow chart of FIG. 28 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 42:
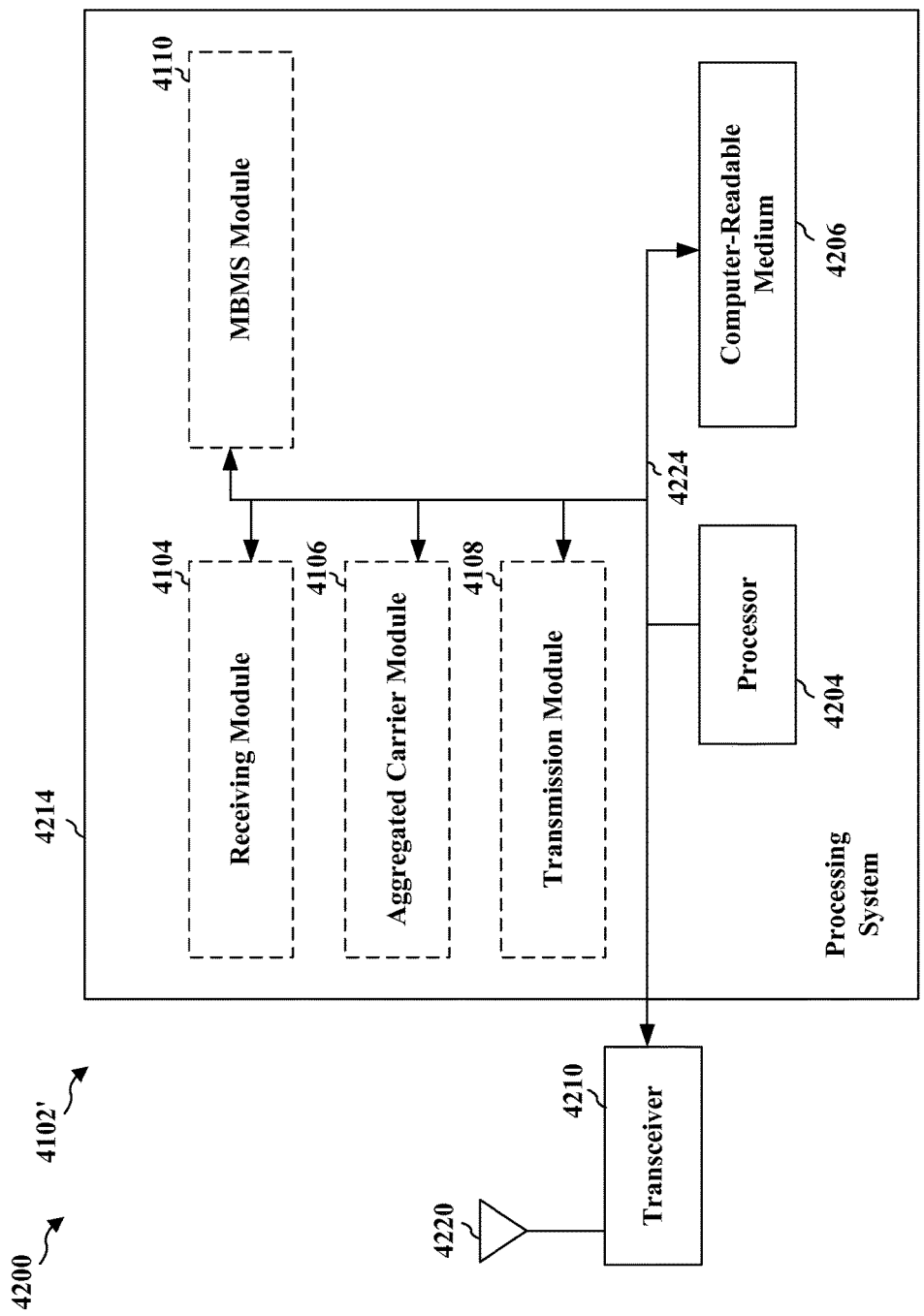
FIG. 42 is a diagram illustrating an example of a hardware implementation for an apparatus employing a processing system.

FIG. 42 is a diagram 4200 illustrating an example of a hardware implementation for an apparatus 4102' employing a processing system 4214. The processing system 4214 may be implemented with a bus architecture, represented generally by the bus 4224. The bus 4224 may include any number of interconnecting buses and bridges depending on the specific application of the processing system 4214 and the overall design constraints. The bus 4224 links together various circuits including one or more processors and/or hardware modules, represented by the processor 4204, the modules 4104, 4106, 4108, 4110, and the computer-readable medium 4206. The bus 4224 may also link various other circuits such as timing sources, peripherals, voltage regulators, and power management circuits, which are well known in the art, and therefore, will not be described any further.

The processing system 4214 may be coupled to a transceiver 4210. The transceiver 4210 is coupled to one or more antennas 4220. The transceiver 4210 provides a means for communicating with various other apparatus over a transmission medium. The processing system 4214 includes a processor 4204 coupled to a computer-readable medium 4206. The processor 4204 is responsible for general processing, including the execution of software stored on the computer-readable medium 4206. The software, when executed by the processor 4204, causes the processing system 4214 to perform the various functions described supra for any particular apparatus. The computer-readable medium 4206 may also be used for storing data that is manipulated by the processor 4204 when executing software. The processing system further includes at least one of the modules 4104, 4106, 4108, and 4110. The modules may be software modules running in the processor 4204, resident/stored in the computer readable medium 4206, one or more hardware modules coupled to the processor 4204, or some combination thereof. The processing system 4214 may be a component of the UE 650 and may include the memory 660 and/or at least one of the TX processor 668, the RX processor 656, and the controller/processor 659.

In one configuration, the apparatus 4102/4102' for wireless communication includes means for receiving a configuration with aggregated carriers including a primary carrier from a primary cell and one or more secondary carriers from one or more secondary cells. The apparatus further includes means for receiving, with the configuration, SIB13 information for at least one secondary cell of the one or more secondary cells from the primary cell. The apparatus may further include means for transmitting an MBMS interest indication message specifying at least one frequency of interest corresponding to the at least one secondary cell. The SIB13 information may be received for the at least one secondary cell in response to the MBMS interest indication message.

The aforementioned means may be one or more of the aforementioned modules of the apparatus 4102 and/or the processing system 4214 of the apparatus 4102' configured to perform the functions recited by the aforementioned means. As described supra, the processing system 4214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 43:
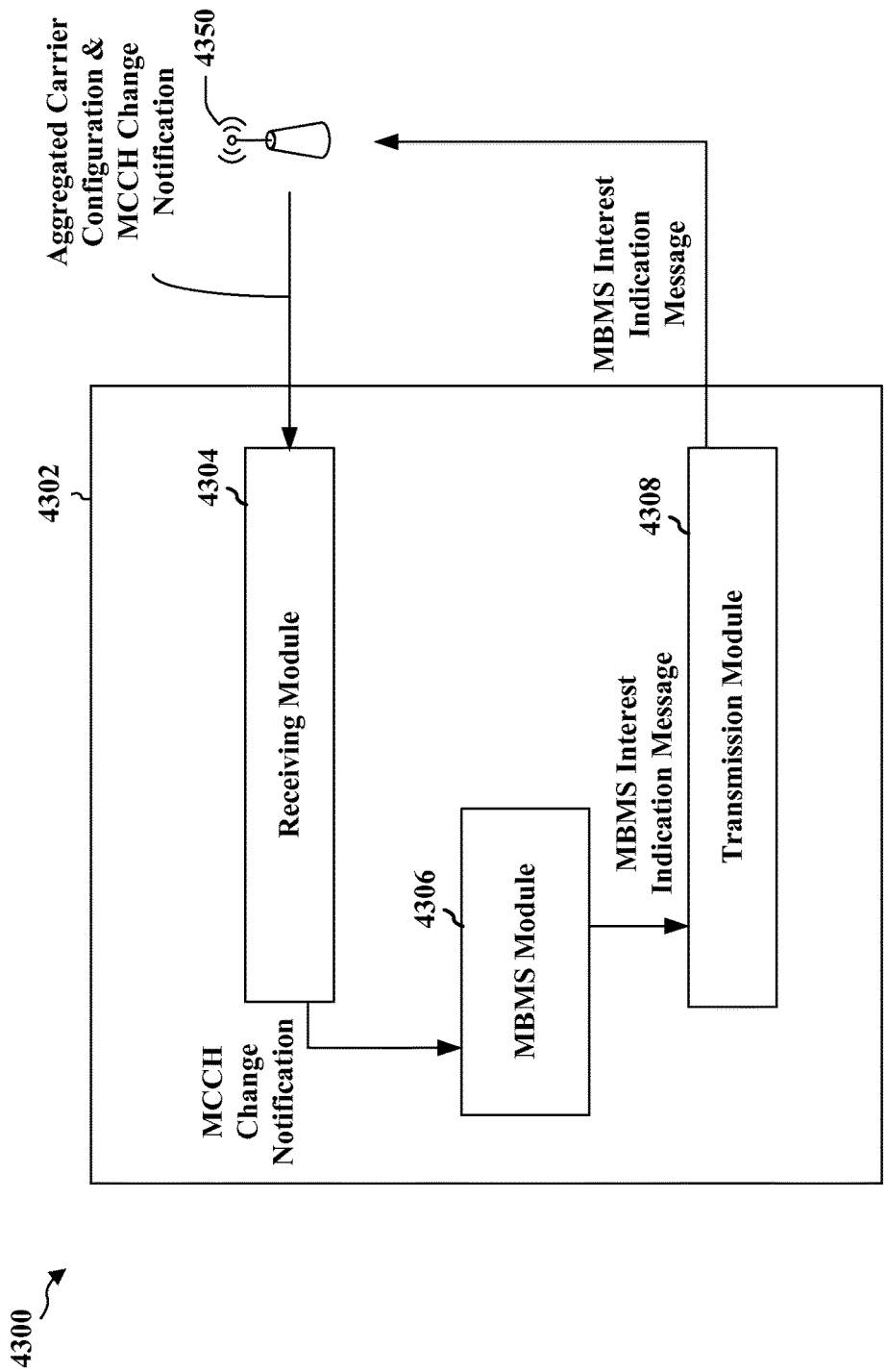
FIG. 43 is a conceptual data flow diagram illustrating the data flow between different modules/means/components in an exemplary apparatus.

FIG. 43 is a conceptual data flow diagram 4300 illustrating the data flow between different modules/means/components in an exemplary apparatus 4302. The apparatus 4302 includes a receiving module 4304 that is configured to receive a configuration with aggregated carriers including a primary carrier from a primary cell and one or more secondary carriers from one or more corresponding secondary cells of an eNB 4350. The receiving module 4304 is also configured to receive the MCCH change notification for a first frequency of a first cell on a second frequency of a second cell. The receiving module 4304 may be configured to receive the MCCH change notification on a PDCCH. The receiving module 4304 may be configured to receive the MCCH change notification in DCI. The receiving module 4304 may be configured to receive the DCI in a DCI format 1C message. The DCI may include a carrier frequency index identifying a frequency index of the first cell to which the MCCH change notification applies. The receiving module 4304 may be configured to receive the MCCH change notification for the first cell from the first cell. The receiving module 4304 may be configured to receive the MCCH change notification for the first cell concurrently from the first cell and the second cell. The receiving module 4304 may be configured to provide the MCCH change notification to an MBMS module 4306. The MBMS module 4306 may be configured to generate an MBMS interest indication message specifying at least one frequency of interest including the first frequency, and to provide the generated message to a transmission module 4308. The transmission module 4308 may be configured to transmit the MBMS interest indication message. The MCCH change notification for the first cell may be received in response to the MBMS interest indication message.

The apparatus may include additional modules that perform each of the steps of the algorithm in the aforementioned flow chart of FIG. 29. As such, each step in the aforementioned flow chart of FIG. 29 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 44:
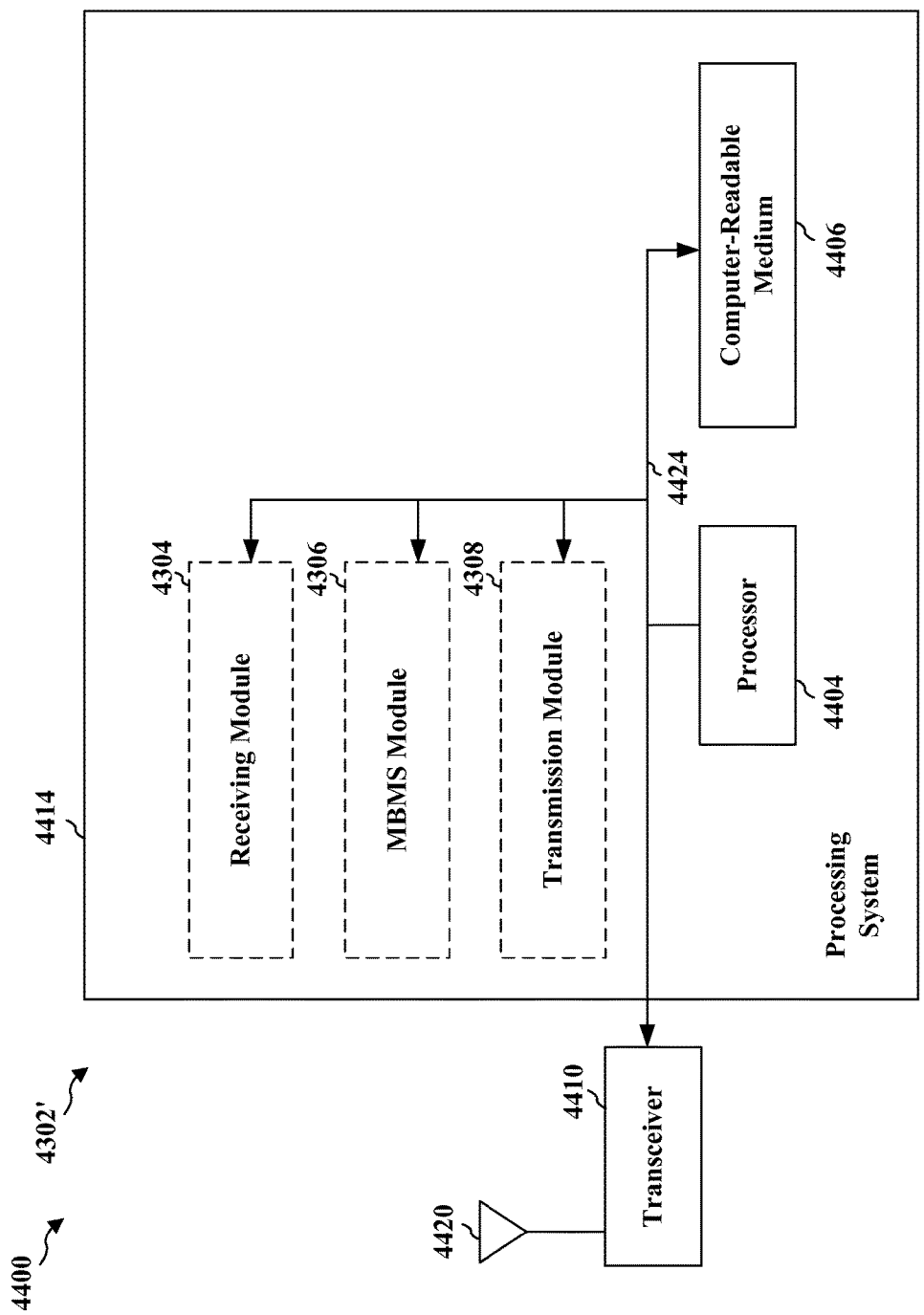
FIG. 44 is a diagram illustrating an example of a hardware implementation for an apparatus employing a processing system.

FIG. 44 is a diagram 4400 illustrating an example of a hardware implementation for an apparatus 4302' employing a processing system 4414. The processing system 4414 may be implemented with a bus architecture, represented generally by the bus 4424. The bus 4424 may include any number of interconnecting buses and bridges depending on the specific application of the processing system 4414 and the overall design constraints. The bus 4424 links together various circuits including one or more processors and/or hardware modules, represented by the processor 4404, the modules 4304, 4306, 4308, and the computer-readable medium 4406. The bus 4424 may also link various other circuits such as timing sources, peripherals, voltage regulators, and power management circuits, which are well known in the art, and therefore, will not be described any further.

The processing system 4414 may be coupled to a transceiver 4410. The transceiver 4410 is coupled to one or more antennas 4420. The transceiver 4410 provides a means for communicating with various other apparatus over a transmission medium. The processing system 4414 includes a processor 4404 coupled to a computer-readable medium 4406. The processor 4404 is responsible for general processing, including the execution of software stored on the computer-readable medium 4406. The software, when executed by the processor 4404, causes the processing system 4414 to perform the various functions described supra for any particular apparatus. The computer-readable medium 4406 may also be used for storing data that is manipulated by the processor 4404 when executing software. The processing system further includes at least one of the modules 4304, 4306, and 4308. The modules may be software modules running in the processor 4404, resident/stored in the computer readable medium 4406, one or more hardware modules coupled to the processor 4404, or some combination thereof. The processing system 4414 may be a component of the UE 650 and may include the memory 660 and/or at least one of the TX processor 668, the RX processor 656, and the controller/processor 659.

In one configuration, the apparatus 4302/4302' for wireless communication includes means for receiving a configuration with aggregated carriers including a primary carrier from a primary cell and one or more secondary carriers from one or more corresponding secondary cells, and means for receiving the MCCH change notification for a first frequency of a first cell on a second frequency of a second cell. The apparatus may further include means for receiving the MCCH change notification for the first cell from the first cell. The apparatus may further include means for transmitting an MBMS interest indication message. The MBMS interest indication message may specify at least one frequency of interest including the first frequency. The MCCH change notification for the first cell may be received in response to the MBMS interest indication message.

The aforementioned means may be one or more of the aforementioned modules of the apparatus 4302 and/or the processing system 4414 of the apparatus 4302' configured to perform the functions recited by the aforementioned means. As described supra, the processing system 4414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 45:
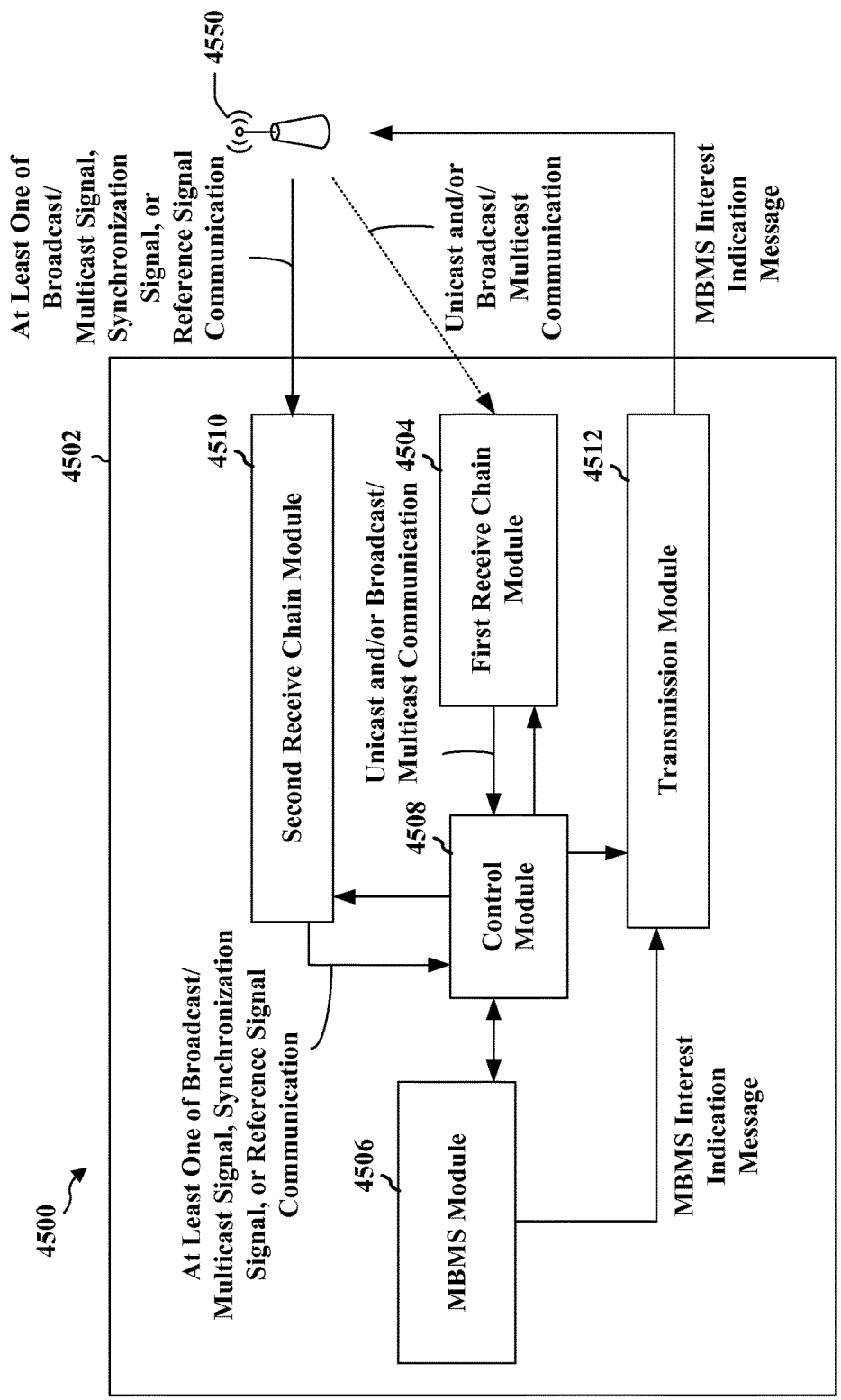
FIG. 45 is a conceptual data flow diagram illustrating the data flow between different modules/means/components in an exemplary apparatus.

FIG. 45 is a conceptual data flow diagram 4500 illustrating the data flow between different modules/means/components in an exemplary apparatus 4502. The apparatus 4502 includes a first receive chain module 4504 that is configured to receive at least one of a unicast or a broadcast/multicast communication on a first frequency from a first cell of a serving eNB 4550 through a first receive chain. The apparatus 4502 further includes a second receive chain module 4510 that is configured to receive at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication.

In one configuration, the UE is in an RRC idle mode, paging signals on the first frequency are received through the first receive chain, and at least one of a SIB13 or an MCCH on the second frequency is received through the second receive chain. In one configuration, the apparatus 4502 further includes a control module 4508 that is configured to determine to receive an MBMS service on the second frequency through the second receive chain based on the received at least one of the SIB13 or the MCCH. The control module 4508 is further configured to communicate with the second receive chain module 4510 in order to receive the MBMS service on the second frequency through the second receive chain prior to the control module 4508 performing an inter-frequency cell reselection to the second cell. The control module 4508 is configured to provide the received MBMS service to the MBMS module 4506. The control module 4508 is configured to set the second frequency to a highest priority, to perform an inter-frequency cell reselection to the second cell, and to communicate with the second receive chain module 4510 in order to receive paging signals on the second frequency from the second cell through the second receive chain rather than on the first frequency from the first cell through the first receive chain upon the inter-frequency cell reselection to the second cell. The control module 4508 is further configured to communicate with the second receive chain module 4510 in order to turn off the first receive chain.

In one configuration, an MBMS service is received on the first frequency through the first receive chain. In one configuration, the control module 4508 is configured to determine to receive a second MBMS service on the second frequency through the second receive chain based on the received at least one of the SIB13 or the MCCH, and to communicate with the second receive chain module 4510 in order to receive the second MBMS service on the second frequency through the second receive chain. The control module 4508 is configured to provide the received MBMS service to the MBMS module 4506. The control module 4508 is further configured to communicate with the second receive chain module 4510 in order to monitor for paging signals, a MIB, a SIB1, and the SIB13 on the second frequency through the second receive chain. In one configuration, the UE is in an RRC connected mode, unicast signals on the first frequency are received through the first receive chain, and at least one of a SIB13 or an MCCH on the second frequency is received through the second receive chain. In one configuration, the control module 4508 is configured to determine to receive an MBMS service on the second frequency through the second receive chain based on the received at least one of the SIB13 or the MCCH, and to communicate with the second receive chain module 4510 in order to receive the MBMS service on the second frequency through the second receive chain. The control module 4508 is configured to provide the received MBMS service to the MBMS module 4506. In one configuration, the control module 4508 is further configured to communicate with the second receive chain module 4510 in order to monitor for paging signals, a MIB, a SIB1, and a SIB13 on the second frequency through the second receive chain.

In one configuration, the MBMS module 4506 is configured to generate an MBMS interest indication message specifying at least one frequency of interest corresponding to one of the first cell or the second cell and to communicate with the transmission module 4512 in order to send the MBMS interest indication message to the serving eNB 4550. The control module 4508 is configured to receive a message instructing to do an inter-frequency handover to the second cell when the at least one frequency of interest corresponds to the second cell, and to perform the inter-frequency handover to the second cell upon receiving the message. In one configuration, the control module 4508 is configured to receive a configuration for aggregated carriers including a primary cell and a secondary cell. The first cell is the primary cell and the second cell is the secondary cell. Unicast signals are received from the primary cell through the first receive chain. The control module 4508 is configured to communicate with the second receive chain module 4510 in order to monitor for at least one of paging signals, a MIB, a SIB1, and a SIB13 on the second frequency through the second receive chain. In one configuration, the control module 4508 is configured to receive at least one of a SIB13, an MCCH, and an MTCH from the secondary cell through the second receive chain. In one configuration, the MBMS module 4506 is configured to generate an MBMS interest indication message specifying a third frequency, and to communicate with the transmission module 4512 in order to send the MBMS interest indication message to the serving eNB 4550. The control module 4508 is configured to receive a configuration for aggregated carriers in which one of the primary cell or the secondary cell provides the third frequency.

In one configuration, paging signals and an MBMS service on the first frequency are received through the first receive chain. In one configuration, the control module 4508 is configured to determine to search for a PLMN with a higher priority than a VPLMN through which the first frequency is received. A MIB and a SIB1 on the second frequency are received through the second receive chain upon determining to search for a PLMN with a higher priority than the VPLMN. In one configuration, the control module 4508 is configured to determine to perform an inter-frequency measurement or an inter-RAT measurement. A PSS, an SSS, and CRS are received on the second frequency through the second receive chain upon the determination to perform the inter-frequency measurement or the inter-RAT measurement.

In one configuration, a unicast service and an MBMS service on the first frequency are received through the first receive chain. In one configuration, the control module 4508 is configured to determine to perform an inter-frequency measurement or an inter-RAT measurement. A PSS, an SSS, and CRS are received on the second frequency through the second receive chain upon the determination to perform the inter-frequency measurement or the inter-RAT measurement. In one configuration, the control module 4508 is configured to communicate with the first receive chain module 4504 in order to receive a message through the first receive chain to perform an ANR measurement, and to communicate with the second receive chain module 4510 in order to perform the ANR measurement through the second receive chain.

The apparatus may include additional modules that perform each of the steps of the algorithm in the aforementioned flow charts of FIGS. 30-36. As such, each step in the aforementioned flow charts of FIGS. 30-36 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 46:
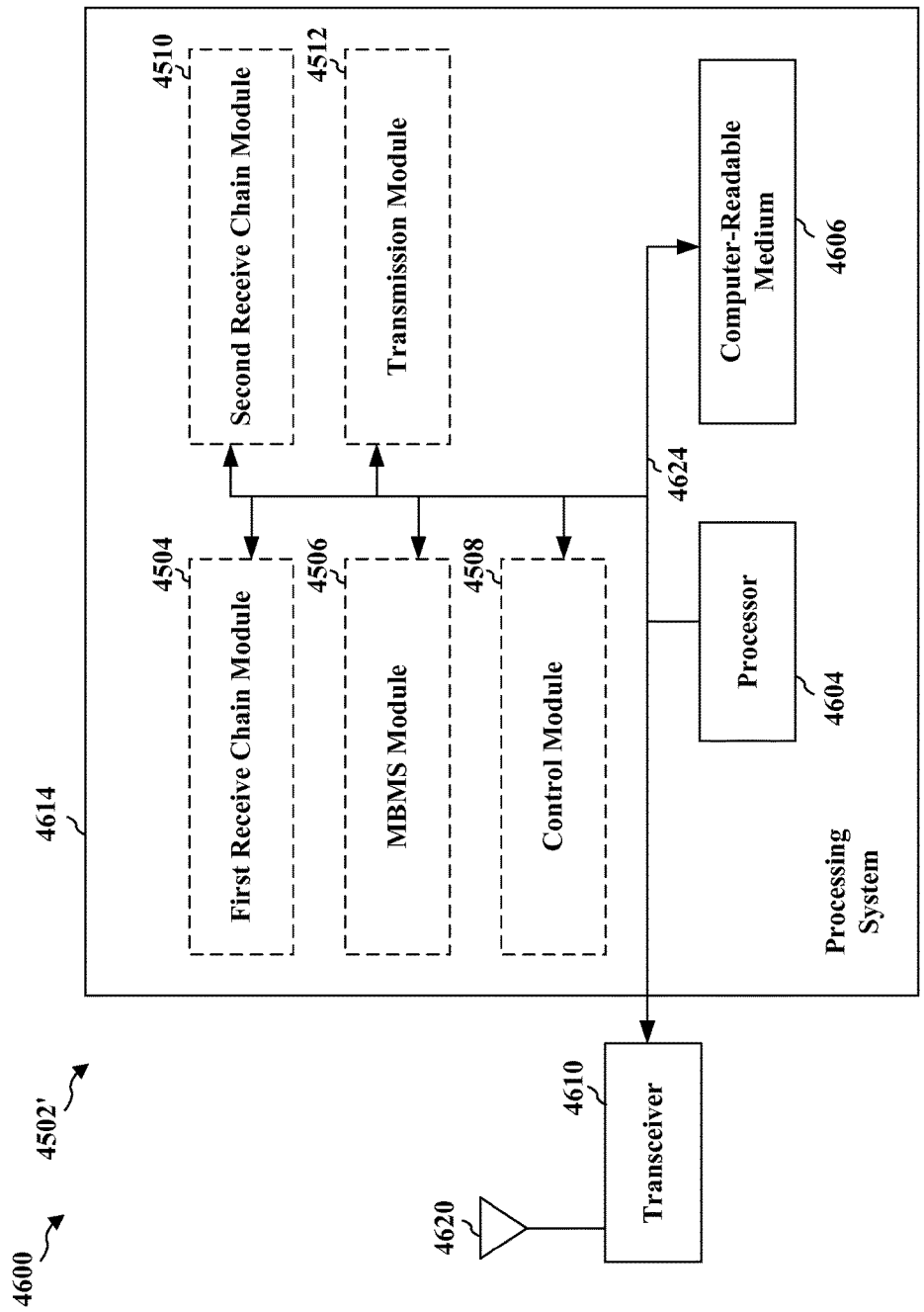
FIG. 46 is a diagram illustrating an example of a hardware implementation for an apparatus employing a processing system.

FIG. 46 is a diagram 4600 illustrating an example of a hardware implementation for an apparatus 4502' employing a processing system 4614. The processing system 4614 may be implemented with a bus architecture, represented generally by the bus 4624. The bus 4624 may include any number of interconnecting buses and bridges depending on the specific application of the processing system 4614 and the overall design constraints. The bus 4624 links together various circuits including one or more processors and/or hardware modules, represented by the processor 4604, the modules 4504, 4506, 4508, 4510, 4512, and the computer-readable medium 4606. The bus 4624 may also link various other circuits such as timing sources, peripherals, voltage regulators, and power management circuits, which are well known in the art, and therefore, will not be described any further.

The processing system 4614 may be coupled to a transceiver 4610. The transceiver 4610 is coupled to one or more antennas 4620. The transceiver 4610 provides a means for communicating with various other apparatus over a transmission medium. The processing system 4614 includes a processor 4604 coupled to a computer-readable medium 4606. The processor 4604 is responsible for general processing, including the execution of software stored on the computer-readable medium 4606. The software, when executed by the processor 4604, causes the processing system 4614 to perform the various functions described supra for any particular apparatus. The computer-readable medium 4606 may also be used for storing data that is manipulated by the processor 4604 when executing software.

The processing system further includes at least one of the modules 4504, 4506, 4508, 4510, and 4512. The modules may be software modules running in the processor 4604, resident/stored in the computer readable medium 4606, one or more hardware modules coupled to the processor 4604, or some combination thereof. The processing system 4614 may be a component of the UE 650 and may include the memory 660 and/or at least one of the TX processor 668, the RX processor 656, and the controller/processor 659.

In one configuration, the apparatus 4502/4502' for wireless communication includes means for receiving at least one of a unicast or a broadcast/multicast communication on a first frequency from a first cell of a serving eNB through a first receive chain. The apparatus further includes means for receiving at least one of broadcast/multicast signal communication, synchronization signal communication, or reference signal communication on a second frequency from a second cell of the serving eNB through a second receive chain without having received instruction from the serving eNB to receive the at least one of the broadcast/multicast signal, the synchronization signal, or the reference signal communication. In one configuration, the UE is in an RRC idle mode, paging signals on the first frequency are received through the first receive chain, and at least one of a SIB13 or an MCCH on the second frequency is received through the second receive chain. The apparatus may further include means for determining to receive an MBMS service on the second frequency through the second receive chain based on the received at least one of the SIB13 or the MCCH, and means for receiving the MBMS service on the second frequency through the second receive chain prior to performing an inter-frequency cell reselection to the second cell. The apparatus may further includes means for setting the second frequency to a highest priority, means for performing an inter-frequency cell reselection to the second cell, and means for receiving paging signals on the second frequency from the second cell through the second receive chain rather than on the first frequency from the first cell through the first receive chain upon the inter-frequency cell reselection to the second cell. The apparatus may further include means for turning off the first receive chain.

In one configuration, an MBMS service is received on the first frequency through the first receive chain. The apparatus may further include means for determining to receive a second MBMS service on the second frequency through the second receive chain based on the received at least one of the SIB13 or the MCCH, means for receiving the second MBMS service on the second frequency through the second receive chain, and means for monitoring for paging signals, a MIB, a SIB1, and the SIB13 on the second frequency through the second receive chain.

In one configuration, the UE is in an RRC connected mode, unicast signals on the first frequency are received through the first receive chain, and at least one of a SIB13 or an MCCH on the second frequency is received through the second receive chain. The apparatus may further include means for determining to receive an MBMS service on the second frequency through the second receive chain based on the received at least one of the SIB13 or the MCCH, and means for receiving the MBMS service on the second frequency through the second receive chain. The apparatus may further include means for monitoring for paging signals, a MIB, a SIB1, and a SIB13 on the second frequency through the second receive chain. The apparatus may further include means for sending an MBMS interest indication message to the serving eNB specifying at least one frequency of interest corresponding to one of the first cell or the second cell, means for receiving a message instructing to do an inter-frequency handover to the second cell when the at least one frequency of interest corresponds to the second cell, and means for performing the inter-frequency handover to the second cell upon receiving the message.

In one configuration, the apparatus may further include means for receiving a configuration for aggregated carriers including a primary cell and a secondary cell. The first cell is the primary cell and the second cell is the secondary cell.

Unicast signals are received from the primary cell through the first receive chain. The apparatus may further include means for monitoring for at least one of paging signals, a MIB, a SIB1, and a SIB13 on the second frequency through the second receive chain. The apparatus may further include means for receiving at least one of a SIB13, an MCCH, and an MTCH from the secondary cell through the second receive chain. The apparatus may further include means for sending an MBMS interest indication message to the serving eNB specifying a third frequency, and means for receiving a configuration for aggregated carriers in which one of the primary cell or the secondary cell provides the third frequency.

In one configuration, paging signals and an MBMS service on the first frequency are received through the first receive chain. The apparatus may further include means for determining to search for a PLMN with a higher priority than a VPLMN through which the first frequency is received. A MIB and a SIB1 on the second frequency are received through the second receive chain upon determining to search for a PLMN with a higher priority than the VPLMN. The apparatus may further include means for determining to perform an inter-frequency measurement or an inter-RAT measurement. A PSS, an SSS, and CRS may be received on the second frequency through the second receive chain upon the determination to perform the inter-frequency measurement or the inter-RAT measurement.

In one configuration, a unicast service and an MBMS service on the first frequency are received through the first receive chain. In such a configuration, the apparatus may further include means for determining to perform an inter-frequency measurement or an inter-RAT measurement. A PSS, an SSS, and CRS may be received on the second frequency through the second receive chain upon the determination to perform the inter-frequency measurement or the inter-RAT measurement. The apparatus may further include means for receiving a message through the first receive chain to perform an ANR measurement, and means for performing the ANR measurement through the second receive chain.

The aforementioned means may be one or more of the aforementioned modules of the apparatus 4502 and/or the processing system 4614 of the apparatus 4502' configured to perform the functions recited by the aforementioned means. As described supra, the processing system 4614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   receiving at least one of paging signals or a unicast communication on a first frequency from a first cell of a serving evolved Node B (eNB) through a first receive chain;
   receiving, autonomously by the UE, at least one of a system information block 13 (SIB13) or a multicast control channel (MCCH) on a second frequency from a second cell of the serving eNB through a second receive chain;
   determining to receive a multimedia broadcast multicast service (MBMS) service on the second frequency through the second receive chain based on at least one of the SIB13 or the MCCH received from the second cell of the serving eNB on the second frequency;
   receiving, autonomously by the UE, the MBMS service on the second frequency through the second receive chain; and
   performing, after the receiving autonomously the at least one of the SIB13 or MCCH and the receiving autonomously the MBMS service, a mobility procedure from the first cell of the serving eNB to the second cell of the serving eNB, wherein the UE receives the at least one of the paging signals or the unicast communication on the second cell of the serving eNB following the mobility procedure.

2. The method of claim 1, wherein the UE is in a radio resource control (RRC) idle mode prior to performing the mobility procedure, paging signals on the first frequency are received through the first receive chain, and the at least one of the SIB13 or the MCCH on the second frequency is received through the second receive chain.

3. The method of claim 2, wherein the MBMS service is received on the second frequency through the second receive chain prior to performing the mobility procedure, and wherein the mobility procedure comprises an inter-frequency cell reselection from the first cell to the second cell.

4. The method of claim 3, further comprising:
setting the second frequency to a highest priority;
performing the inter-frequency cell reselection to the second cell; and
receiving paging signals on the second frequency from the second cell through the second receive chain rather than on the first frequency from the first cell through the first receive chain upon the inter-frequency cell reselection to the second cell.

5. The method of claim 4, further comprising turning off the first receive chain following the inter-frequency cell reselection from the first cell to the second cell.

6. The method of claim 2, wherein a second MBMS service is received on the first frequency through the first receive chain.

7. The method of claim 1, wherein the UE is in a radio resource control (RRC) connected mode prior to performing the mobility procedure, unicast signals on the first frequency are received through the first receive chain, and the at least one of the SIB13 or the MCCH on the second frequency is received through the second receive chain.

8. The method of claim 7, further comprising:
sending an MBMS interest indication message to the serving eNB specifying at least one frequency of interest corresponding to one of the first cell or the second cell;
receiving a message instructing to do an inter-frequency handover to the second cell when the at least one frequency of interest corresponds to the second cell; and
performing the inter-frequency handover to the second cell, wherein the mobility procedure comprises the inter-frequency handover.

9. The method of claim 1, wherein the UE receives the at least one of the SIB13 or the MCCH on the second frequency from the second cell of the serving eNB through the second receive chain without having received any instruction from the serving eNB.

10. The method of claim 1, further comprising:
monitoring for paging signals, a master information block (MIB), a SIB1, and the SIB13 on the second frequency through the second receive chain.

11. The method of claim 1, wherein the UE is configured for carrier aggregation on the first carrier on the first cell of the serving eNB and the second carrier on the second cell of the serving eNB.

12. A user equipment (UE) for wireless communication, comprising:
means for receiving at least one of paging signals or a unicast communication on a first frequency from a first cell of a serving evolved Node B (eNB) through a first receive chain;
means for receiving, autonomously by the UE, at least one of a system information block 13 (SIB13) or a multicast control channel (MCCH) on a second frequency from a second cell of the serving eNB through a second receive chain;
means for determining to receive a multimedia broadcast multicast service (MBMS) service on the second frequency through the second receive chain based on at least one of the SIB13 or the MCCH received from the second cell of the serving eNB on the second frequency; and
means for receiving, autonomously by the UE, the MBMS service on the second frequency through the second receive chain,
wherein the UE is configured to perform, after receiving autonomously the at least one of the SIB13 or MCCH and receiving autonomously the MBMS service, a mobility procedure from the first cell of the serving eNB to the second cell of the serving eNB, and wherein the UE receives the at least one of the paging signals or the unicast communication on the second cell of the serving eNB following the mobility procedure.

13. The UE of claim 12, wherein the UE is in a radio resource control (RRC) idle mode prior to performing the mobility procedure, paging signals on the first frequency are received through the first receive chain, and the at least one of the SIB13 or the MCCH on the second frequency is received through the second receive chain.

14. The UE of claim 13, wherein the MBMS service is received on the second frequency through the second receive chain prior to performing the mobility procedure, and wherein the mobility procedure comprises an inter-frequency cell reselection from the first cell to the second cell.

15. The UE of claim 14, further comprising:
means for setting the second frequency to a highest priority;
means for performing the inter-frequency cell reselection to the second cell; and
means for receiving paging signals on the second frequency from the second cell through the second receive chain rather than on the first frequency from the first cell through the first receive chain upon the inter-frequency cell reselection to the second cell.

16. The UE of claim 15, further comprising means for turning off the first receive chain following the inter-frequency cell reselection from the first cell to the second cell.

17. The UE of claim 13, wherein a second MBMS service is received on the first frequency through the first receive chain.

18. The UE of claim 12, wherein the UE is in a radio resource control (RRC) connected mode prior to performing the mobility procedure, unicast signals on the first frequency are received through the first receive chain, and the at least one of the SIB13 or the MCCH on the second frequency is received through the second receive chain.

19. The UE of claim 18, further comprising:
means for sending an MBMS interest indication message to the serving eNB specifying at least one frequency of interest corresponding to one of the first cell or the second cell;
means for receiving a message instructing to do an inter-frequency handover to the second cell when the at least one frequency of interest corresponds to the second cell; and
means for performing the inter-frequency handover to the second cell upon receiving the message, wherein the mobility procedure comprises the inter-frequency handover.

20. A user equipment (UE) for wireless communication, comprising:
a memory; and
at least one processor coupled to the memory and configured to:
receive at least one of paging signals or a unicast communication on a first frequency from a first cell of a serving evolved Node B (eNB) through a first receive chain;
receive, autonomously by the UE, at least one of a system information block 13 (SIB13) or a multicast control channel (MCCH) on a second frequency from a second cell of the serving eNB through a second receive chain;
determine to receive a multimedia broadcast multicast service (MBMS) service on the second frequency through the second receive chain based on at least one of the SIB13 or the MCCH received from the second cell of the serving eNB on the second frequency;
receive, autonomously by the UE, the MBMS service on the second frequency through the second receive chain; and
perform, after the receiving autonomously the at least one of the SIB13 or MCCH and the receiving autonomously the MBMS service, a mobility procedure from the first cell of the serving eNB to the second cell of the serving eNB, and wherein the UE receives the at least one of the paging, the unicast or the broadcast/multicast communication on the second cell of the serving eNB following the mobility procedure.

21. A non-transitory computer-readable medium associated with a user equipment (UE) and storing computer executable code for wireless communication, comprising code to:
receive at least one of paging signals or a unicast communication on a first frequency from a first cell of a serving evolved Node B (eNB) through a first receive chain;
receive, autonomously by the UE, at least one of a system information block 13 (SIB13) or a multicast control channel (MCCH) on a second frequency from a second cell of the serving eNB through a second receive chain;
determine to receive a multimedia broadcast multicast service (MBMS) service on the second frequency through the second receive chain based on at least one of the SIB13 or the MCCH received from the second cell of the serving eNB on the second frequency;
receive, autonomously by the UE, the MBMS service on the second frequency through the second receive chain; and
perform, after the receiving autonomously the at least one of the SIB13 or MCCH and the receiving autonomously the MBMS service, a mobility procedure from the first cell of the serving eNB to the second cell of the serving eNB, and wherein the UE receives the at least one of the paging signals or the unicast communication on the second cell of the serving eNB following the mobility procedure.

22. A method of wireless communication of a user equipment (UE), comprising:
receiving a first multimedia broadcast multicast service (MBMS) service on a first frequency from a first cell of a serving evolved Node B (eNB) through a first receive chain;
receiving, autonomously by the UE, at least one of a system information block 13 (SIB13) or a multicast control channel (MCCH) on a second frequency from a second cell of the serving eNB through a second receive chain;
determining, by the UE, to receive a second MBMS service on the second frequency through the second receive chain based on the received at least one of the SIB13 or the MCCH; and
receiving, autonomously by the UE, the second MBMS service on the second frequency through the second receive chain; and
monitoring for paging signals, a master information block (MIB), a system information block 1 (SIB1), and the SIB13 on the second frequency through the second receive chain in support of the second MBMS service, wherein the first frequency and the second frequency are configured for carrier aggregation.

* * * * *